(12) United States Patent
Hayashi

(10) Patent No.: US 10,324,323 B2
(45) Date of Patent: Jun. 18, 2019

(54) DISPLAY APPARATUS

(71) Applicant: Mitsubishi Electric Corporation, Tokyo (JP)

(72) Inventor: Masami Hayashi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 26 days.

(21) Appl. No.: 15/215,627

(22) Filed: Jul. 21, 2016

(65) Prior Publication Data

US 2017/0023817 A1 Jan. 26, 2017

(30) Foreign Application Priority Data

Jul. 24, 2015 (JP) ................. 2015-146394

(51) Int. Cl.
*G06F 3/041* (2006.01)
*G06F 3/044* (2006.01)
(Continued)

(52) U.S. Cl.
CPC .... *G02F 1/13338* (2013.01); *G02F 1/133528* (2013.01); *G02F 1/136286* (2013.01);
(Continued)

(58) Field of Classification Search
CPC .......... G02F 1/13338; G02F 1/133514; G02F 1/1339; G02F 1/134309; G02F 1/136286;
(Continued)

(56) References Cited

U.S. PATENT DOCUMENTS 8,269,744 B2   9/2012 Agari et al.
8,390,598 B2   3/2013 Agari et al.
(Continued)

FOREIGN PATENT DOCUMENTS

JP   10-171599 A    6/1998
JP   2003-295209 A   10/2003
(Continued)

OTHER PUBLICATIONS

Unpublished U.S. Appl. No. 15/096,299, filed Apr. 12, 2016.
(Continued)

*Primary Examiner* — Nathanael R Briggs
(74) *Attorney, Agent, or Firm* — Studebaker & Brackett PC

(57) ABSTRACT

A display apparatus according to the present invention includes a first polarizing film, a first insulating substrate, a second insulating substrate, and a second polarizing film that are located in the stated order in a light path from a light source toward a display surface. The second polarizing film has a polarization axis parallel or perpendicular to a polarization axis of the first polarizing film. The first insulating substrate and the second insulating substrate each include a transparent substrate having insulating properties. At least the first insulating substrate or the second insulating substrate includes lower wiring that is located on the transparent substrate and is opaque and a fine pattern that is located in a preceding stage or a subsequent stage of the lower wiring in the light path and is opposed to the lower wiring with a transparent insulating film therebetween.

21 Claims, 61 Drawing Sheets

(51) Int. Cl.
*G02F 1/1333* (2006.01)
*G02F 1/1335* (2006.01)
*G02F 1/1343* (2006.01)
*G02F 1/1362* (2006.01)

(52) U.S. Cl.
CPC ............ *G06F 3/044* (2013.01); *G06F 3/0412* (2013.01); *G02F 2001/134372* (2013.01); *G06F 2203/04103* (2013.01); *G06F 2203/04112* (2013.01)

(58) Field of Classification Search
CPC ....... G02F 1/1368; G02F 2001/133357; G02F 2001/134372; G02F 2201/121; G02F 2201/123; G06F 3/0412; G06F 3/044; G06F 2203/04103; G06F 2203/04112
See application file for complete search history.

(56) References Cited

U.S. PATENT DOCUMENTS

| | | | | |
|---|---|---|---|---|
| 8,462,129 B2* | 6/2013 | Miyayama | ............ | G06F 3/0418 345/173 |
| 2005/0140839 A1 | 6/2005 | Hong | | |
| 2006/0125986 A1* | 6/2006 | Choo | ................. | G02F 1/133555 349/114 |
| 2009/0290105 A1 | 11/2009 | Takada | | |
| 2016/0363812 A1* | 12/2016 | Li | ...................... | G02F 1/133514 |
| 2016/0377940 A1* | 12/2016 | Lee | ................... | G02F 1/133707 349/96 |

FOREIGN PATENT DOCUMENTS

| | | |
|---|---|---|
| JP | 2005-250430 A | 9/2005 |
| JP | 2006-171723 A | 6/2006 |
| JP | 2007-272016 A | 10/2007 |
| JP | 2008-513841 A | 5/2008 |
| JP | 2008-197757 A | 8/2008 |
| JP | 2009-282437 A | 12/2009 |
| JP | 2010-097536 A | 4/2010 |
| JP | 2010-277392 A | 12/2010 |
| WO | 2006/034051 A2 | 3/2006 |

OTHER PUBLICATIONS

An Office Action mailed by the Japanese Patent Office dated Feb. 26, 2019, which corresponds to Japanese Patent Application No. 2015-146394 and is related to U.S. Appl. No. 15/215,627; with English translation.

* cited by examiner

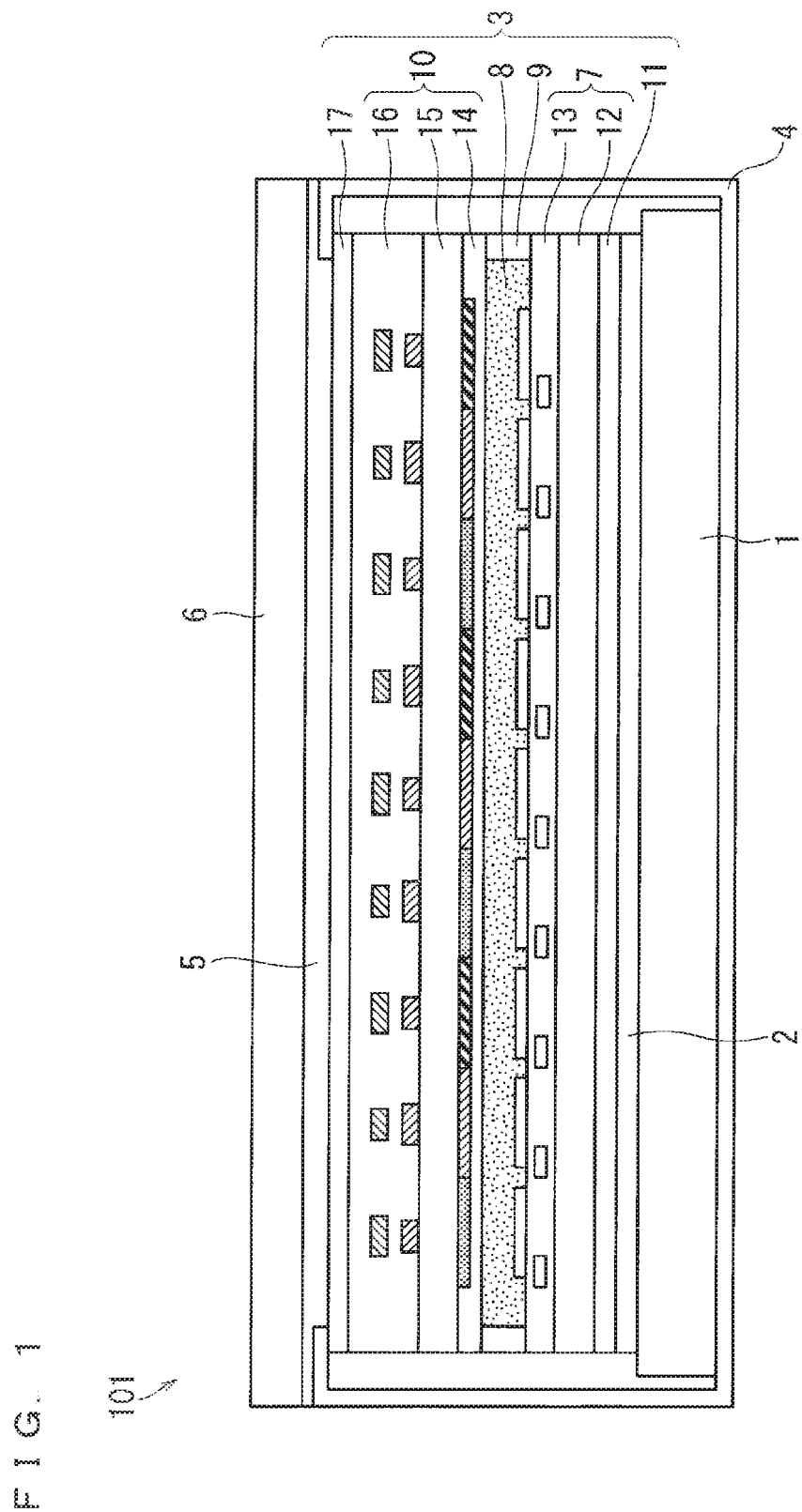

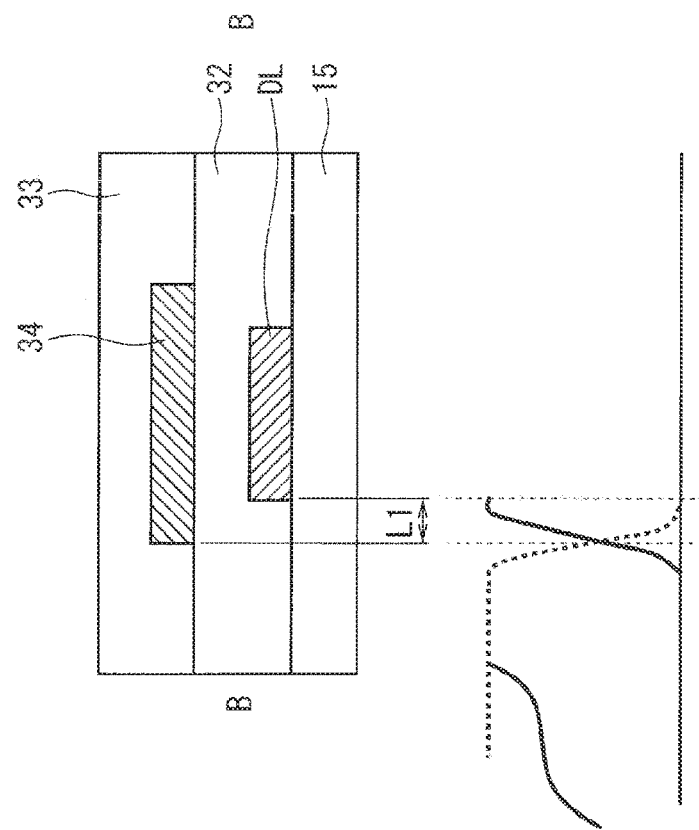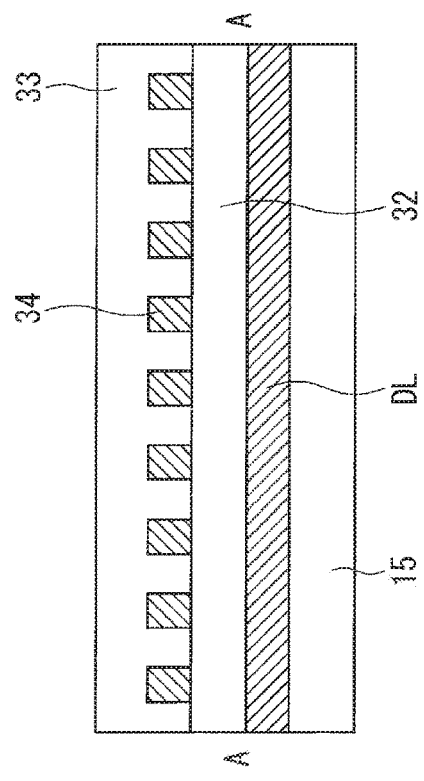

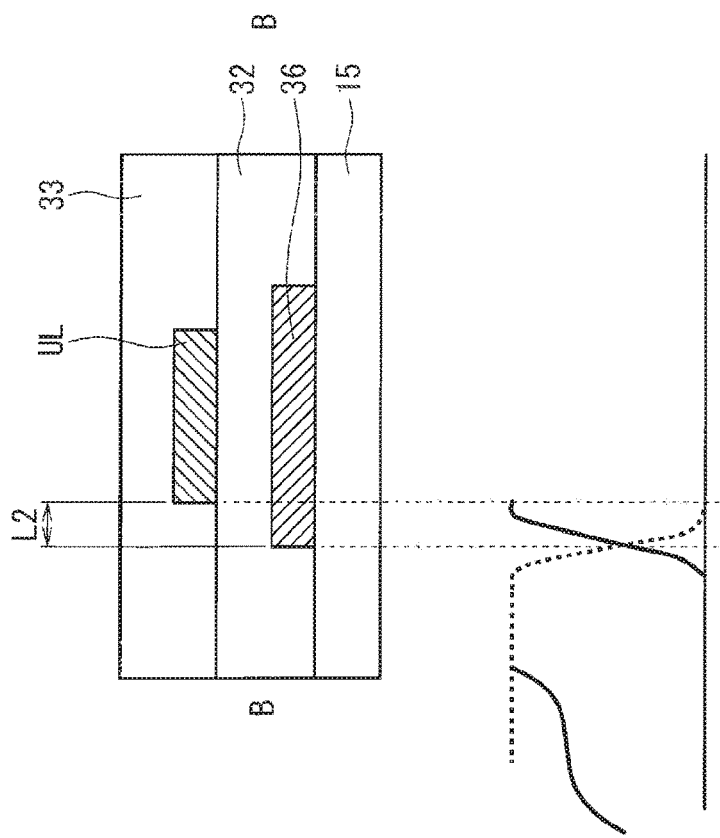
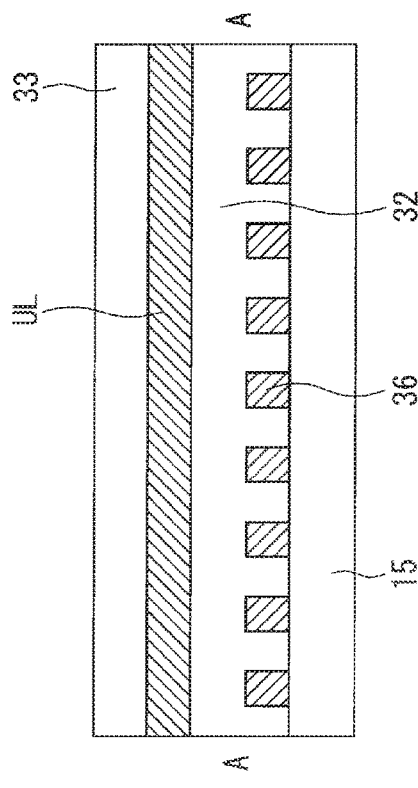
FIG. 10A
FIG. 10B

F I G. 1 1

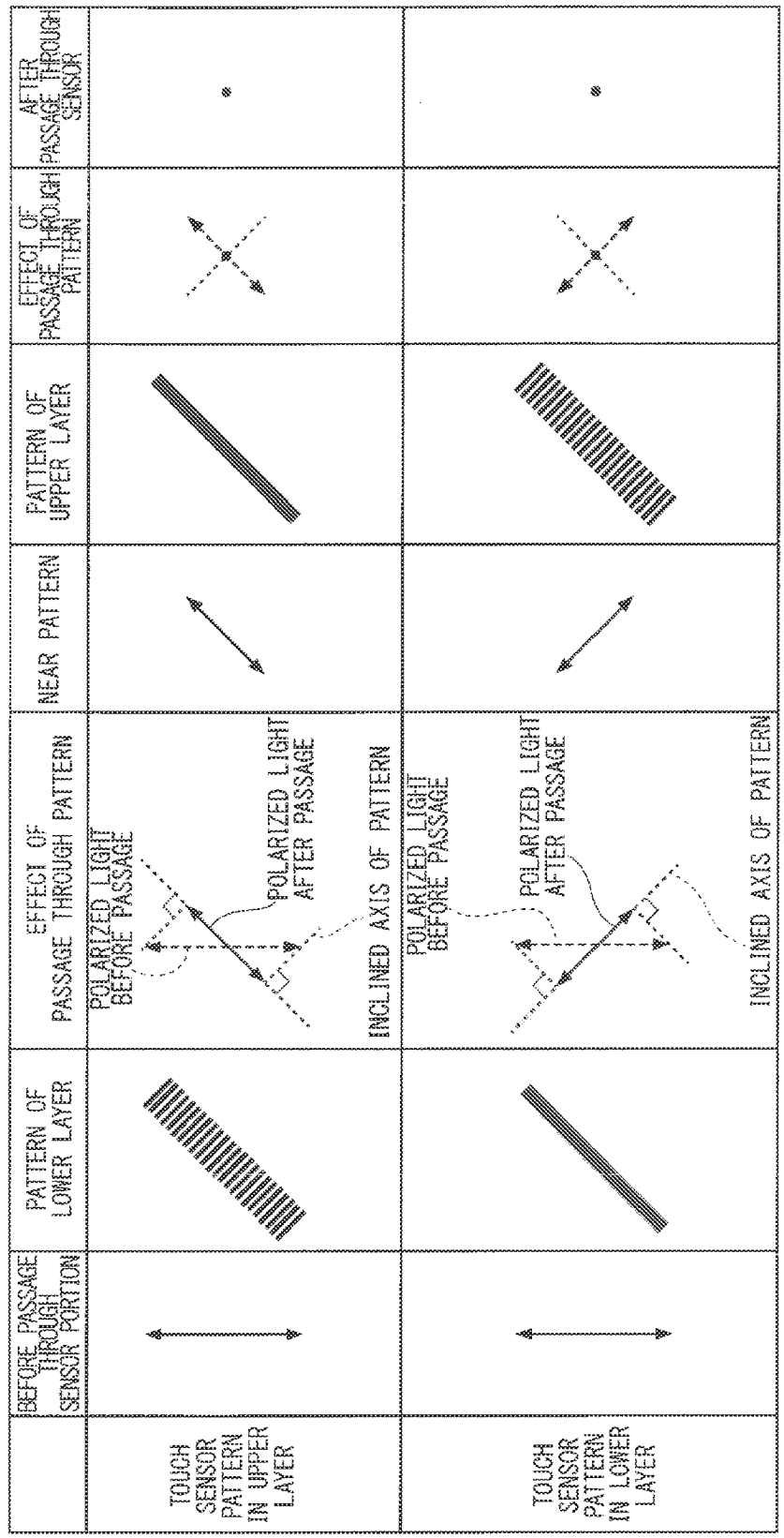

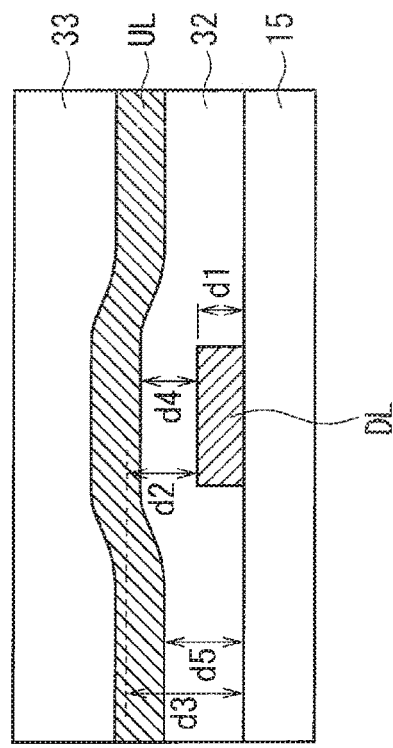
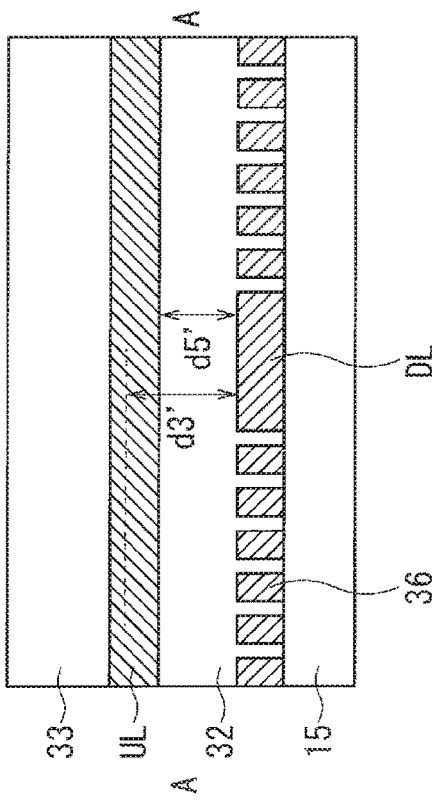
FIG. 14A
FIG. 14B

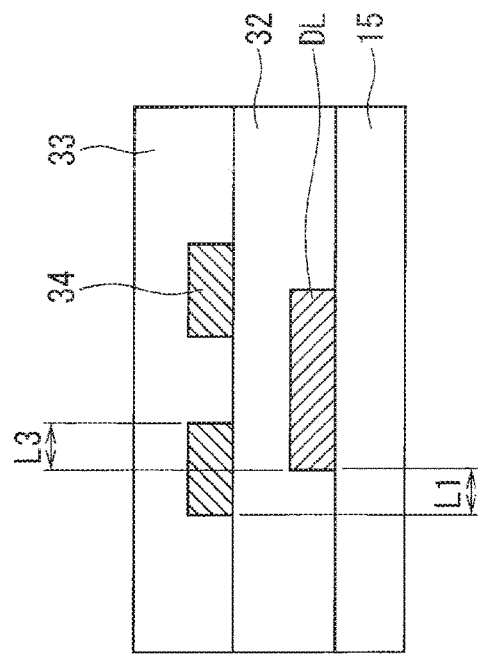
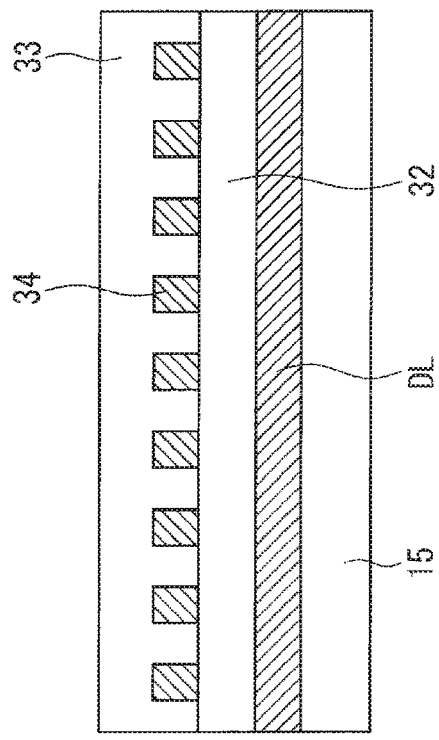
FIG. 15A
FIG. 15B

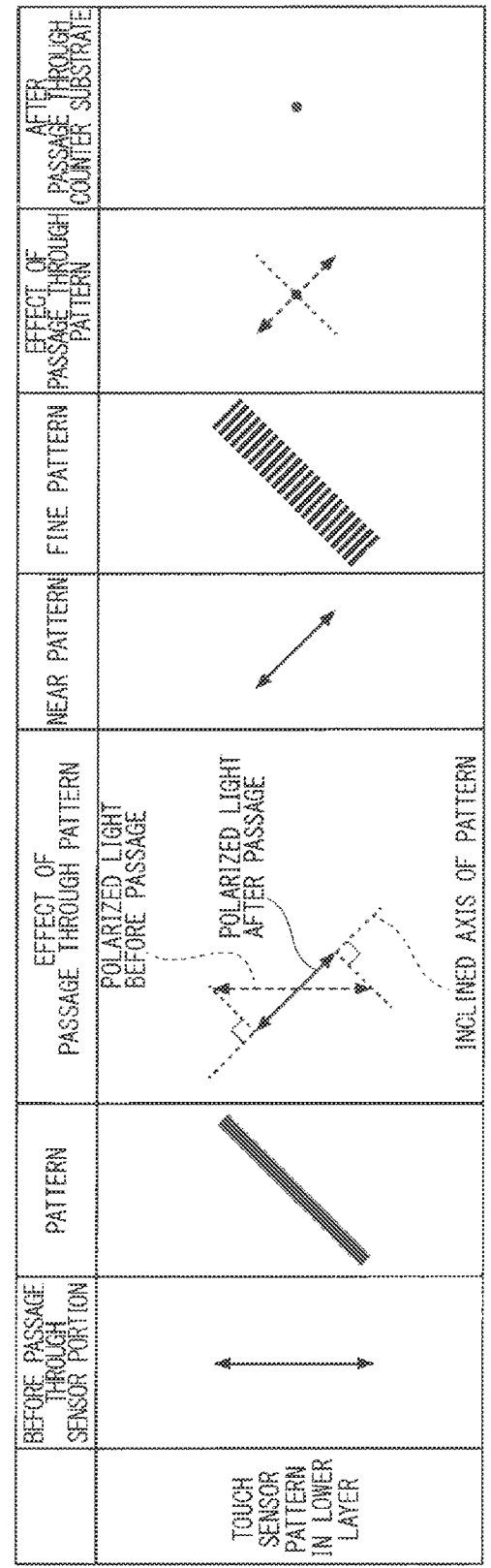
F I G. 23

F I G. 28
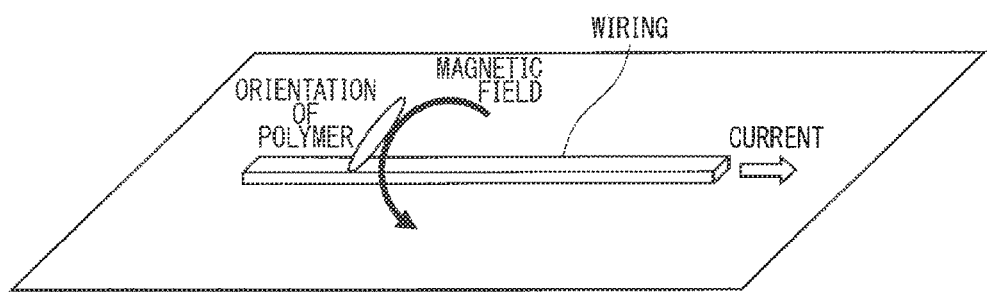
F I G. 29
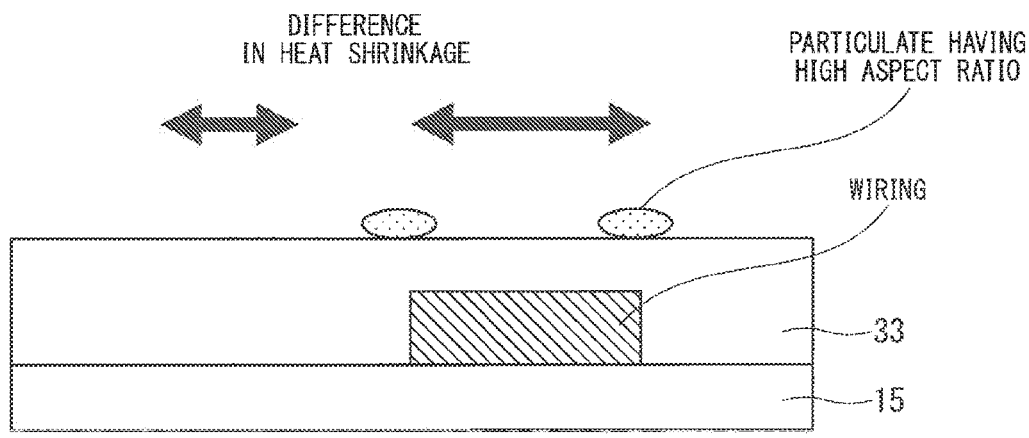

F I G. 4 7
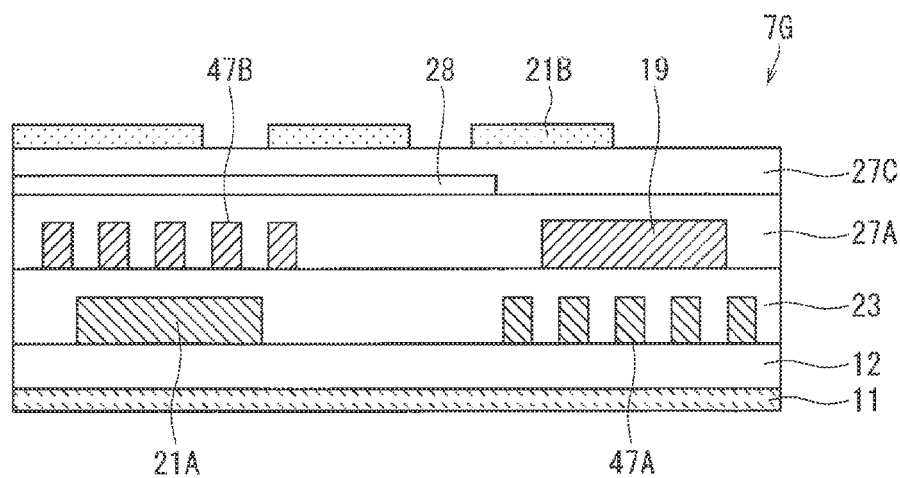
F I G. 4 8
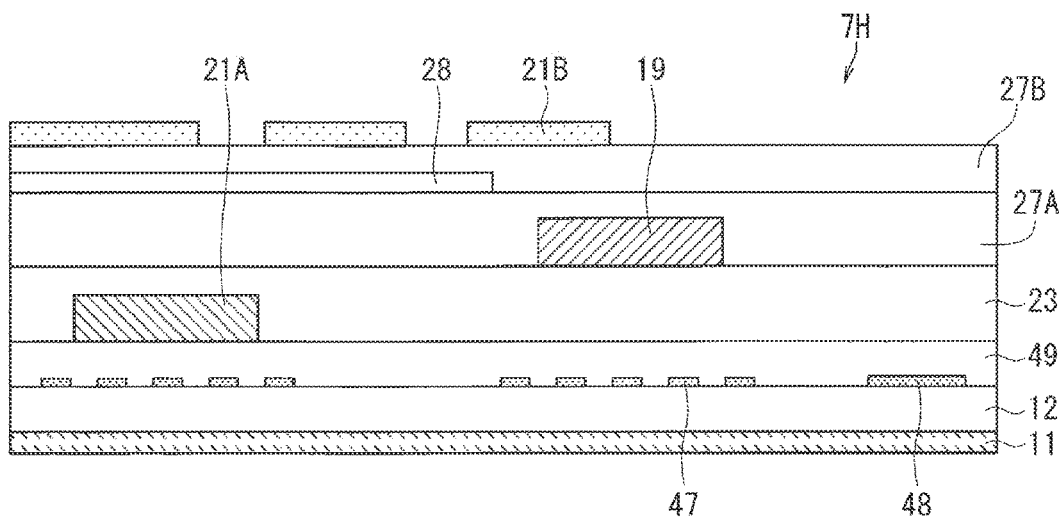

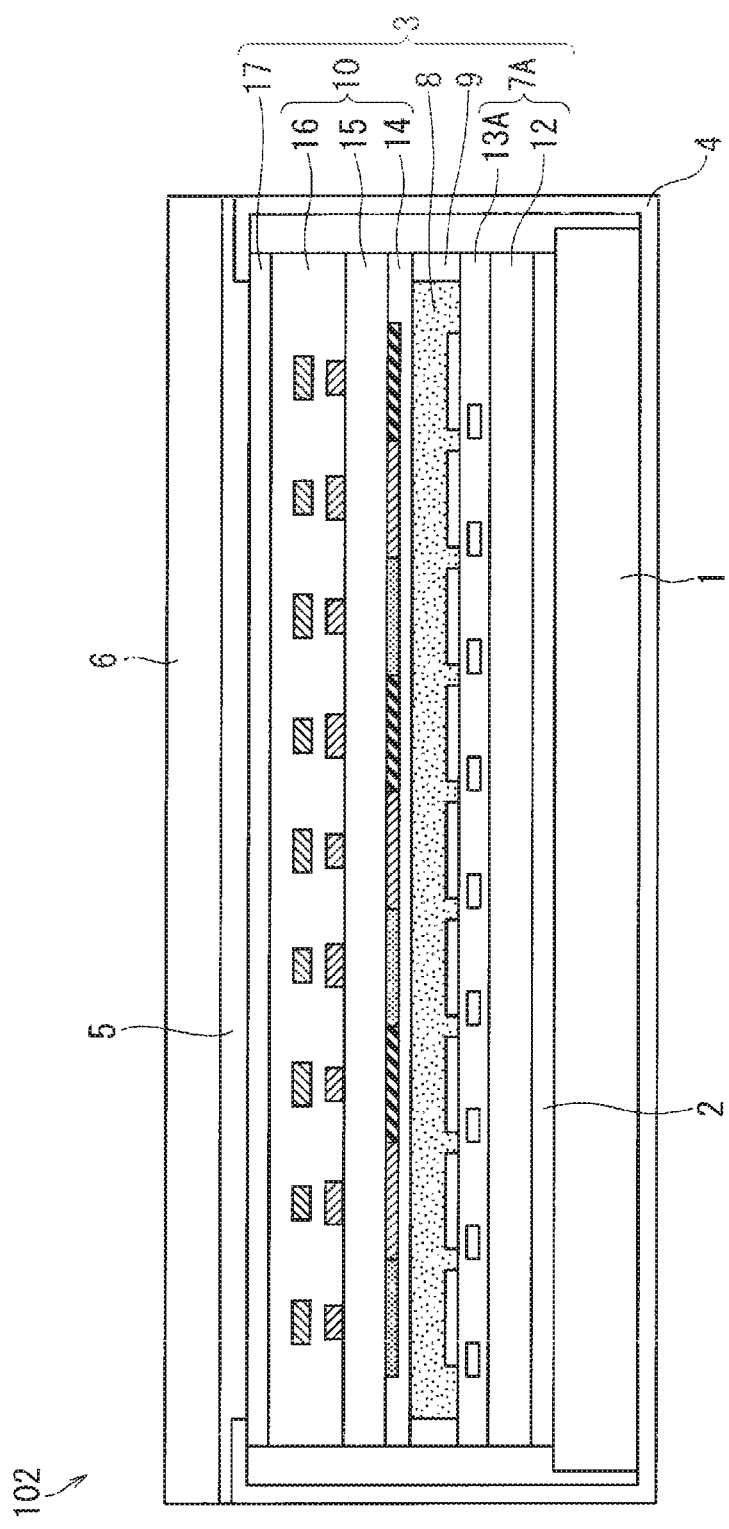

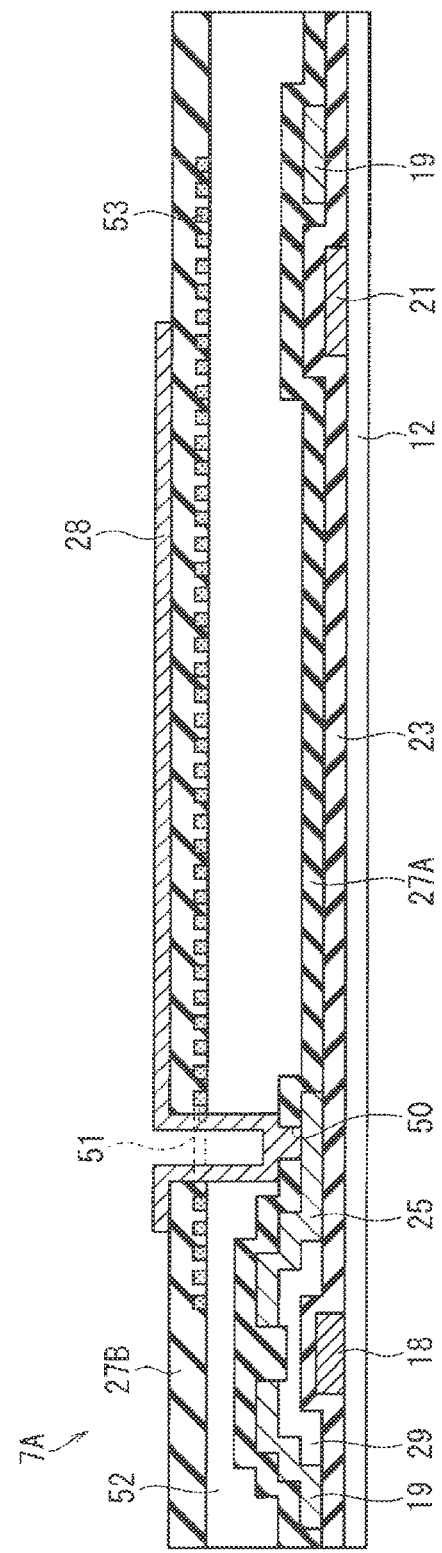
F I G. 52

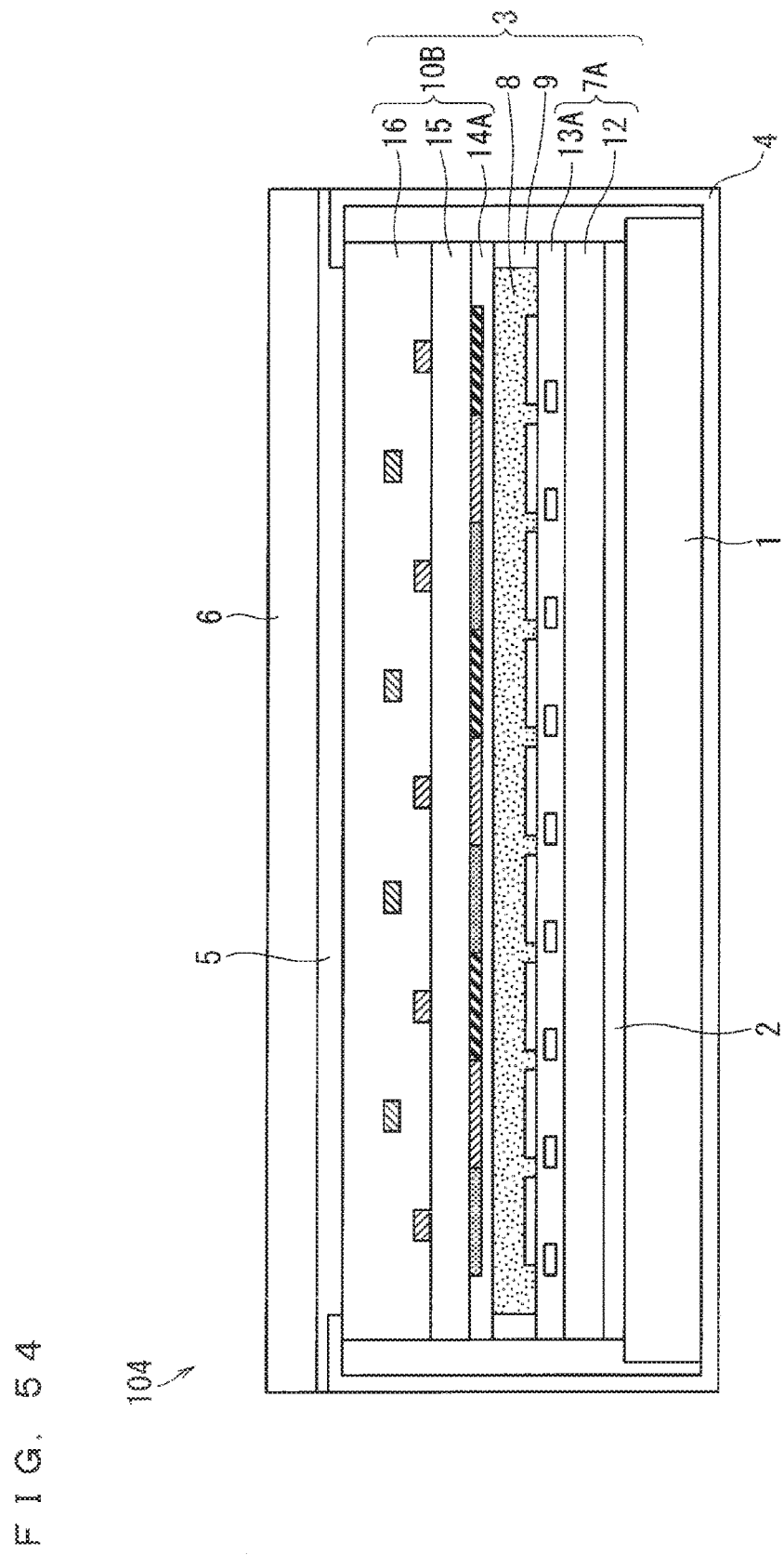
F I G. 5 4

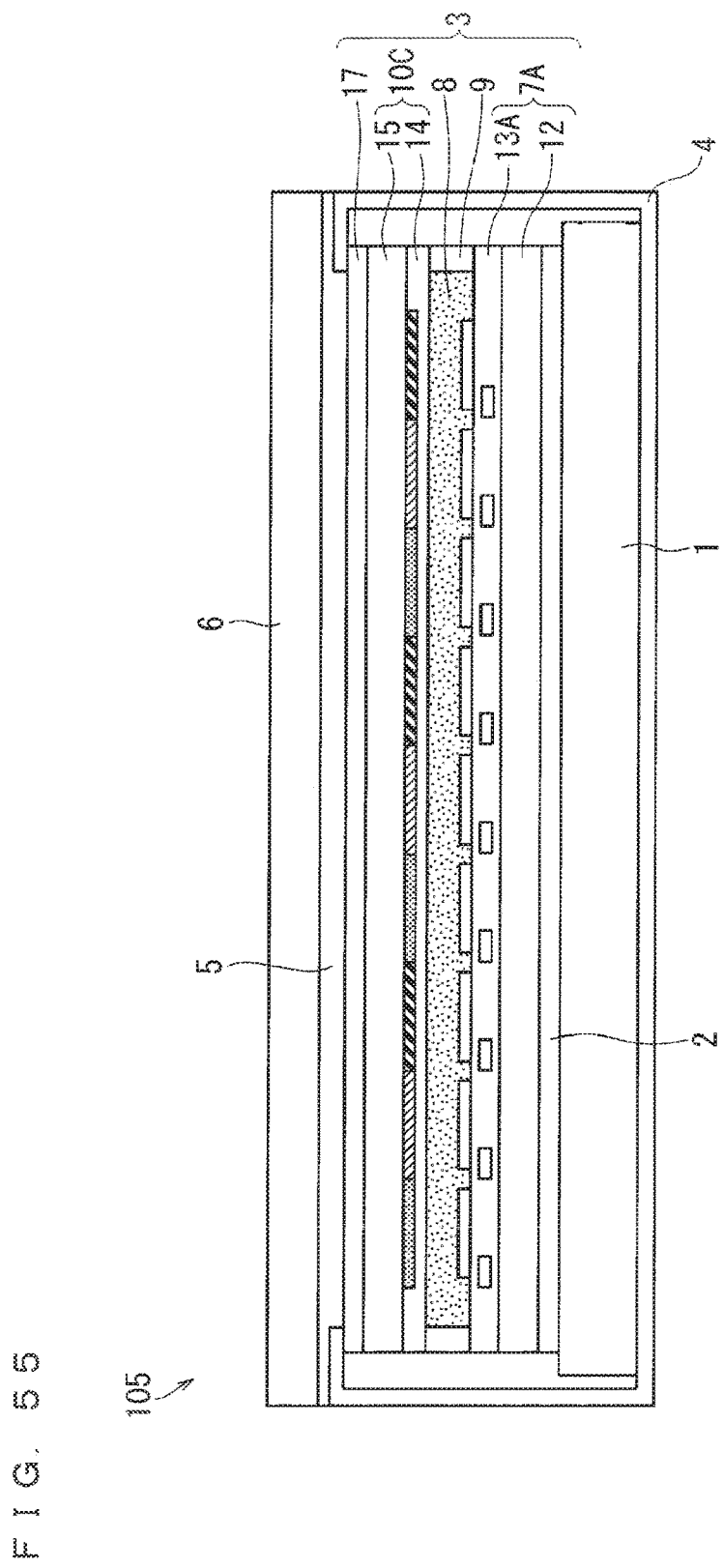

DISPLAY APPARATUS

BACKGROUND OF THE INVENTION

Field of the Invention

The present invention relates to a display apparatus such as a liquid crystal display apparatus.

Description of the Background Art

Display apparatuses including a touch sensor, which has an input function by a touch operation, located on a display surface thereof have often been used. Projected capacitive (PCAP) touch panels include a conductive film located on a transparent substrate and include a technique for detecting a change in capacitance formed in the conductive film. The touch panels are formed by bonding two substrates together after a conductive film is formed on each of the two substrates, by forming conductive films opposed to each other on both sides of one substrate, or by forming a conductive film in two layers on one side of one substrate.

The display apparatus having the input function by the touch operation can be obtained by bonding the touch panel to the liquid crystal display apparatus or the like, but the display apparatus has a great thickness, which needs to be reduced.

To fill the need, an on-cell structure in which a sensor pattern formed of the conductive film is directly located on liquid crystal cells of the liquid crystal display apparatus and a polarizing film is bonded outside the sensor pattern has been examined (Japanese Patent Application Laid-Open No. 10-171599 (1998)).

A transparent conductive film has mainly been used as a material for a sensor pattern in a touch panel. The touch panel for a large display apparatus needs to have a reduced resistance of sensor wiring, so that application of metal wiring has been examined (Japanese Patent Application Laid-Open No. 2010-277392 and Japanese Patent Application Laid-Open No. 2010-097536).

However, when the touch panel formed of the metal wiring has the on-cell structure, a polarization axis of light near the metal wiring is projected onto another axis due to the influence by the metal wiring. As a result, a light control state that needs to be controlled in the polarizing film changes. Particularly when polarized light perpendicular to the polarization axis of the polarizing film is projected onto another axis, part of the light that needs to be blocked under normal circumstances is allowed to pass. This causes black floating (phenomenon in which a black area of an image turns whitish), thereby reducing contrast.

The introduction of the sensor pattern of the metal wiring makes it difficult to simultaneously optimize the polarization axis of the polarizing filter set by viewing angle properties of an LCD and a polarizing direction of an edge of the sensor pattern set to prevent moiré of the sensor. Consequently, for the application of the on-cell structure to reduce the thickness of the display apparatus, the intensity of black increases due to the formation of the wiring pattern misaligned from the polarization axis of the polarizing filter, thereby reducing the contrast.

The problems do not occur only in the touch panel, and may similarly occur in, for example, an array substrate or a counter substrate of the liquid crystal display apparatus having patterns through which visible light is not allowed to pass, such as wiring including a metal film and a black matrix.

SUMMARY OF THE INVENTION

It is an object of the present invention to increase contrast of a display apparatus.

A first display apparatus of the present invention includes a first polarizer, a first insulating substrate, a second insulating substrate, and a second polarizer that are located in the stated order in a light path from a light source toward a display surface. The second polarizer has a polarization axis parallel or perpendicular to a polarization axis of the first polarizer. The first insulating substrate and the second insulating substrate each include a transparent substrate having insulating properties. At least the first insulating substrate or the second insulating substrate includes a first electrode wiring pattern being opaque and a third polarizer. The first electrode wiring pattern is located on the transparent substrate. The third polarizer is located in a preceding stage or a subsequent stage of the first electrode wiring pattern in the light path and is opposed to the first electrode wiring pattern with a transparent insulating film therebetween.

According to the first display apparatus of the present invention, the third polarizer cancels out a change of the polarization axis due to the first electrode wiring pattern. Thus, light leakage can be suppressed, and contrast can increase.

A second display apparatus of the present invention includes a pixel array substrate including a first polarizer, a counter substrate, and a second polarizer that are located in the stated order in a light path from a light source toward a display surface. The second polarizer has a polarization axis parallel or perpendicular to a polarization axis of the first polarizer. The pixel array substrate includes a plurality of gate wires, a plurality of source wires, and a pixel electrode. The plurality of source wires are orthogonal to the gate wires. The pixel electrode is located in an opening of a pixel that is a region divided by the gate wires and the source wires intersecting each other. The first polarizer has a plurality of patterns of fine wiring. The plurality of patterns of fine wiring are located in a subsequent stage of at least the gate wires or the source wires in the light path and overlap at least part of the pixel electrode with an insulating film therebetween.

According to the second display apparatus of the present invention, the patterns of the fine wiring allow the entry of the polarized light, which is not affected by the projection of the axis polarized by the gate wires and the source wires onto another axis, into the subsequent stage of the pixel array substrate. Thus, the light leakage near the wiring can be suppressed, and the contrast can increase.

A third display apparatus of the present invention includes a pixel array substrate including a first polarizer, a counter substrate, and a second polarizer that are located in the stated order in a light path from a light source toward a display surface. The second polarizer has a polarization axis parallel or perpendicular to a polarization axis of the first polarizer. The pixel array substrate includes a plurality of gate wires, a plurality of source wires orthogonal to the gate wires, and a pixel electrode. The pixel electrode is located in an opening of a pixel that is a region divided by the gate wires and the source wires intersecting each other. The pixel electrode is the first polarizer that is located in a subsequent stage of at least the gate wires or the source wires in the light path and that has a plurality of patterns of fine wiring.

According to the third display apparatus of the present invention, the patterns of the fine wiring allow the entry of the polarized light, which is not affected by the projection of the axis polarized by the gate wires and the source wires onto another axis, into the subsequent stage of the pixel array substrate. Thus, the light leakage near the wiring can be suppressed, and the contrast can increase. Further, the pixel electrode does not need to be formed of the transparent conductive film. Consequently, a decrease in transmittance due to the transparent conductive film can be prevented, allowing for increased intensity and reduced power consumption.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a cross-sectional view showing a configuration of a display apparatus 101 according to a first preferred embodiment;

FIGS. 8A and 8B are cross-sectional views of the touch sensor pattern;

FIGS. 10A and 10B are cross-sectional views of the touch sensor pattern;

FIG. 11 is a diagram for describing polarization effects of a conventional touch sensor pattern;

FIG. 12 is a diagram for describing polarization effects of the touch sensor pattern in the first preferred embodiment;

FIGS. 14A and 14B are cross-sectional views of touch sensor patterns;

FIGS. 15A, 15B, 16A, and 16B are cross-sectional views of a touch sensor pattern in a first modification of the first preferred embodiment;

FIG. 23 is a diagram for describing polarization effects of the touch sensor pattern in the second preferred embodiment;

FIGS. 28 and 29 are diagrams showing a method for positioning a long axis of a polarizer in a direction orthogonal to an extending direction of a wiring pattern;

FIG. 47 is a cross-sectional view of a pixel array substrate according to a sixth modification of the fourth preferred embodiment;

FIG. 48 is a cross-sectional view of a pixel array substrate according to a seventh modification of the fourth preferred embodiment;

FIG. 49 is a cross-sectional view exemplifying a configuration of a display apparatus according to a fifth preferred embodiment;

FIGS. 51 and 52 are cross-sectional views showing the pixel array substrate according to the fifth preferred embodiment;

FIG. 54 is a cross-sectional view showing a configuration of a display apparatus according to a second modification of the fifth preferred embodiment;

FIG. 55 is a cross-sectional view showing a configuration of a display apparatus according to a third modification of the fifth preferred embodiment;

DESCRIPTION OF THE PREFERRED EMBODIMENTS

Figure 2:
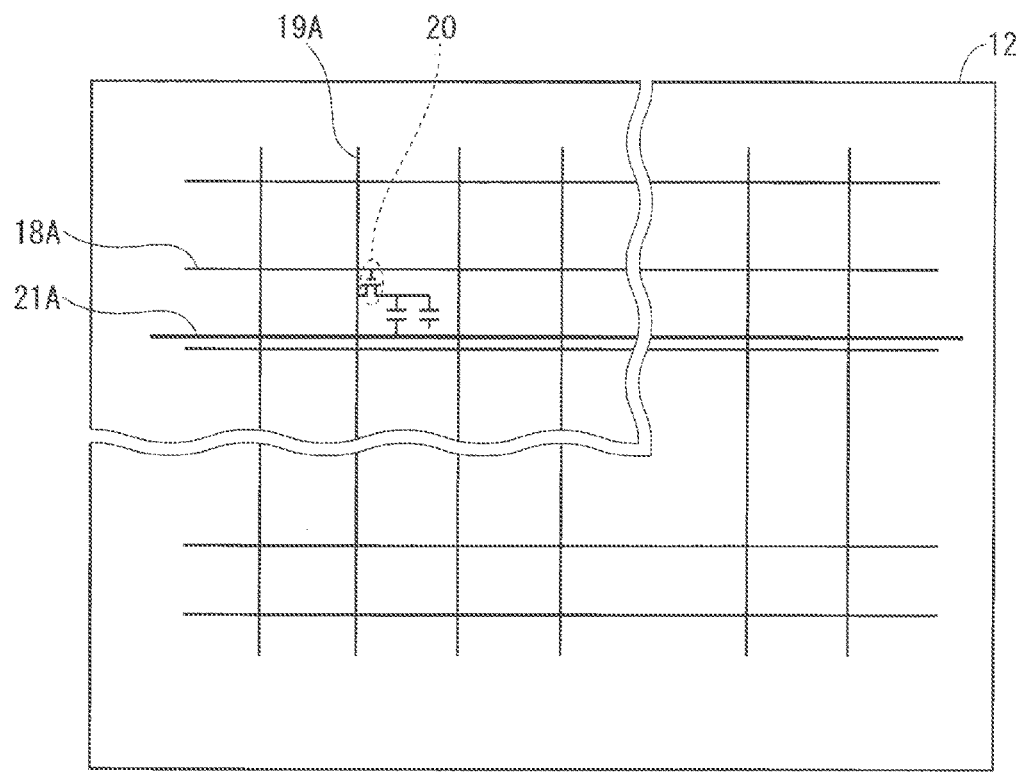
FIG. 2 is a top view showing a configuration of a pixel array pattern.

<A. First Preferred Embodiment>
<A-1. Configuration>

FIG. 1 is a cross-sectional view exemplifying a configuration of a display apparatus 101 according to a first preferred embodiment. The display apparatus 101 includes a backlight unit 1, an optical film 2 located on a top surface of the backlight unit 1, a liquid crystal cell 3 located on the optical film 2, a frame 4 housing the backlight unit 1, the optical film 2, and the liquid crystal cell 3, and a protective glass 6 bonded to a display surface of the liquid crystal cell 3 with an adhesive 5 for protection.

The backlight unit 1 has a means of emitting light including a fluorescent tube, an LED, or an EL as a light source, and may have a light guide plate (not shown) as necessary.

The optical film 2 is a member having functions of improving a viewing angle. Light emitted from the backlight unit 1 passes through the optical film 2 and the liquid crystal cell 3 and is converted to light suitable for display. Then, the light is emitted from a top surface (display surface) of a liquid crystal module to become display light. In this specification, a structure combining the backlight unit 1, the optical film 2, and the liquid crystal cell 3 may be referred to as the liquid crystal module.

The liquid crystal cell 3 is exposed from an opening of the frame 4, and the exposed portion of the liquid crystal cell 3 is bonded to the protective glass 6 with the adhesive 5. In other words, both of the liquid crystal cell 3 and the frame 4 are bonded to the protective glass 6 with the adhesive 5. Thus, this structure allows the protective glass 6 to protect the liquid crystal cell 3.

FIG. 1 shows that the protective glass 6 is bonded to the liquid crystal module across the frame 4 and the liquid crystal cell 3. However, the bonding of the protective glass 6 is not limited to this and may be appropriately selected according to the use. For example, the protective glass 6 may be bonded to only a specific region of the frame 4 or to only a specific region of the liquid crystal cell 3.

Next, the liquid crystal cell 3 is described in detail. The liquid crystal cell 3 includes a polarizing film 11, a pixel array substrate 7, a liquid crystal layer 8, a sealing agent 9, a counter substrate 10, and a polarizing film 17. Liquid crystals are injected between the pixel array substrate 7 and the counter substrate 10 and sealed therebetween with the sealing agent 9, to thereby form the liquid crystal cell 3.

The pixel array substrate 7 is a first insulating substrate that includes a transparent substrate 12 being a transparent insulating substrate. The pixel array substrate 7 includes a pixel array pattern 13 in addition to the transparent substrate 12. The pixel array pattern 13 for driving pixels is located on a side, which contacts the liquid crystal layer 8, of the transparent substrate 12. An alignment film (not shown) is located on a top surface (on the liquid crystal layer 8 side) of the pixel array pattern 13. The polarizing film 11 being a first polarizer is bonded to the pixel array substrate 7 opposite to the surface on which the pixel array pattern 13 is located.

The counter substrate 10 is a second insulating substrate that includes a transparent substrate 15 being a transparent insulating substrate. The counter substrate 10 includes a color filter pattern 14 and a touch sensor pattern 16 in addition to the transparent substrate 15. The color filter pattern 14 is located on a side, which contacts the liquid crystal layer 8, of the transparent substrate 15. An alignment film (not shown) is located on a top surface (on the liquid crystal layer 8 side) of the color filter pattern 14. The touch sensor pattern 16 is located on the transparent substrate 15 opposite to the color filter pattern 14. The polarizing film 17 that has a polarization axis orthogonal to the polarizing film bonded to the pixel array substrate 7 and that is a second polarizer is bonded to a top surface (on the display surface side) of the touch sensor pattern 16.

In addition, the polarization axis of the polarizing film 17 is the twisted nematic (TN) mode, and is orthogonal to a polarization angle of the polarizing film 11 in the normally white type, but this is not restrictive. For example, in the normally black type of the TN mode, parallel axes are set in a case of a lateral electric field (such as an in-plane-switching or a fringe field switching (FFS) mode). In this manner, the relationship between the polarization axes of the polarizing film 11 and the polarizing film 17 may be set according to the liquid crystal mode and the display setting.

FIG. 2 is a top view showing a configuration of the pixel array pattern 13. The pixel array pattern 13 includes gate wiring 18A that selects pixels and extends in a first direction, source wiring 19A that sends signals to the pixels and extends in a second direction, a switching element 20 (TFT) located at the intersection of the gate wiring 18A and the source wiring 19A, and a pixel connected to the switching element 20. The pixel can also be called a region divided by the intersections of the gate wiring 18A and the source wiring 19A.

To improve display characteristics, common wiring 21A extending in the same direction as the extending direction of the gate wiring 18A or the source wiring 19A and a common electrode (not shown) connected to the common wiring 21A are typically located in a layer below the pixels, to thereby form capacitance.

Figure 3:
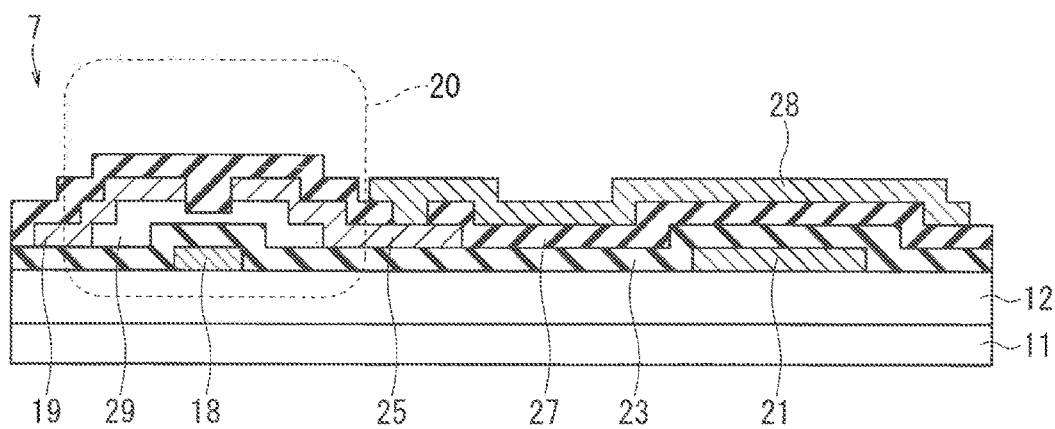
FIG. 3 is a cross-sectional view of a pixel array substrate.

FIG. 3 is a cross-sectional view of the pixel array substrate 7. The pixel array pattern 13 includes, on the transparent substrate 12, a gate electrode wire 18 that includes the gate wiring 18A and a gate electrode 18B and a common electrode wire 21 that includes the common wiring 21A and the common electrode. A semiconductor layer 29 is positioned opposite to the gate electrode wire 18 with a gate insulating film 23 therebetween. A source electrode 19 and a drain electrode 25 branch off from the source wiring 19A that is electrically connected to the semiconductor layer 29.

An interlayer insulating film 27 is located so as to cover the source electrode 19, the semiconductor layer 29, and the drain electrode 25. A pixel electrode 28 is located on the interlayer insulating film 27 and connected to the drain electrode 25 through an opening of the interlayer insulating film 27. Herein, a configuration including the gate electrode wire 18, the gate insulating film 23, the semiconductor layer 29, the source electrode 19, and the drain electrode 25 is the switching element 20 (TFT).

The pixel electrode and the common electrode may have slits and be located close to each other in a planar arrangement as in the lateral electric field mode, depending on a method for driving liquid crystals. Further, as in the fringe field switching (FFS) mode, the common electrode having the slits may be located on the flat pixel electrode with the interlayer insulating film therebetween, or their positions may be reversed and the pixel electrode having the slits may also be located in the layer above the flat common electrode with the interlayer insulating film therebetween.

Figure 4A:
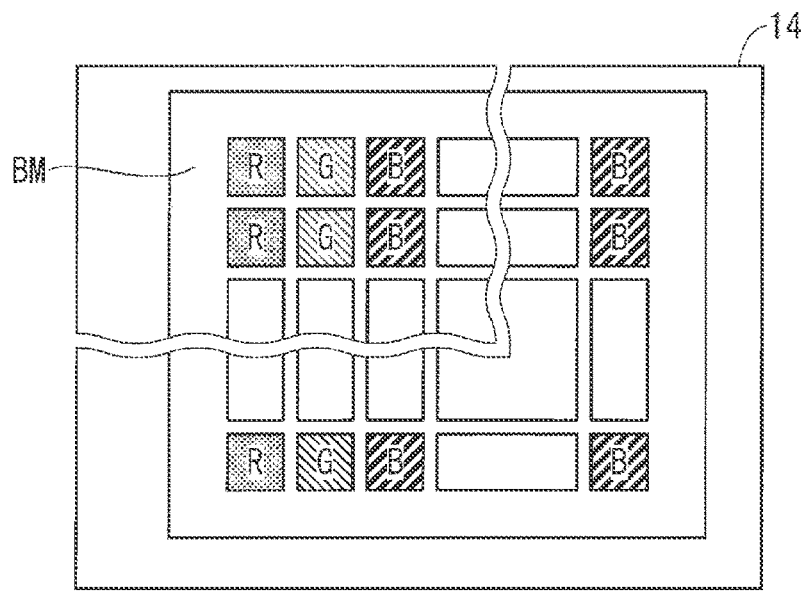
FIGS. 4A, 4B, and 4C are conceptual illustrations of a color filter pattern.
Figure 4B:
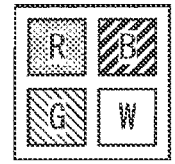
Figure 4C:
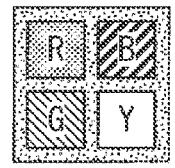

Next, the counter substrate 10 is described below in detail with reference to FIGS. 4A, 4B, and 4C, which are conceptual illustrations of a color filter pattern. The color filter pattern 14 includes a black matrix (BM) for shielding wiring portion of the pixel array pattern 13 from light, as shown in FIG. 4A. Further, color materials in red (R), green (G), and blue (B) overlap a top surface of the BM so as to be located in regions corresponding to the pixels. An overcoat (OC) is located on top surfaces of the color materials, and a transparent conductive film (not shown) is located on a top surface of the OC. The transparent conductive film on the OC functions as a counter electrode.

In addition, the color materials may not be disposed in a black-and-white display or in a case where the backlight has colors. Further, white (W, no color material) or yellow (Y), for example, may be added to the arrangement of RGB to enhance the reproducibility of colors (FIGS. 4B and 4C).

Figure 5:
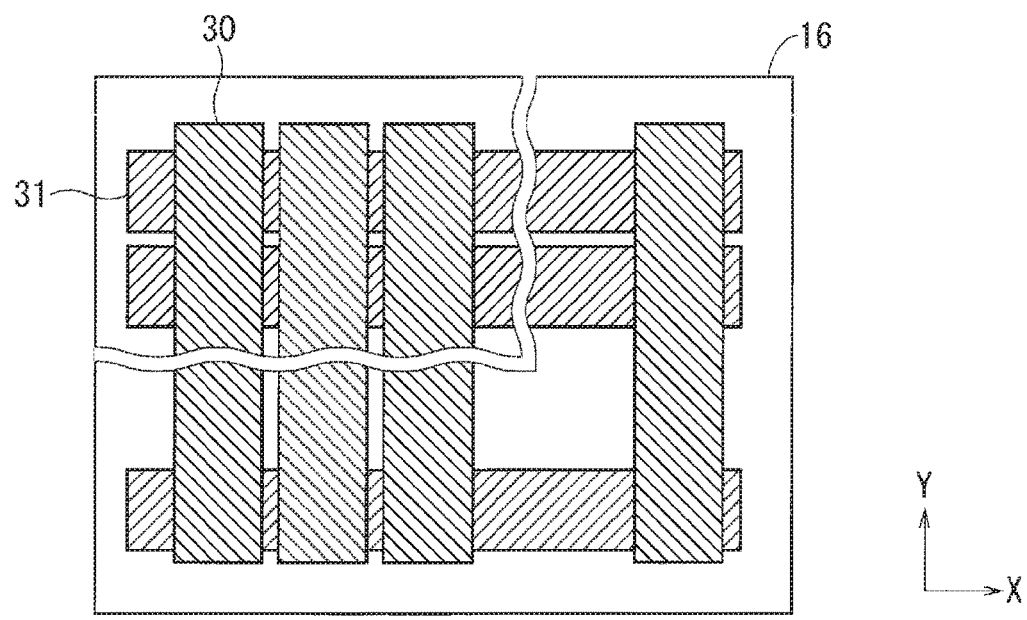
FIGS. 5 and 6 are block diagrams of sensor wiring in a touch sensor pattern.

Next, the touch sensor pattern 16 located in the counter substrate 10 is described in detail with reference to FIG. 5, which is a block diagram of touch sensor wiring in the touch sensor pattern 16. Hereinafter, a region including the touch sensor pattern 16 between the polarizing film 17 and the transparent substrate 15 may be referred to as a sensor portion. The touch sensor pattern 16 includes, as the touch sensor wiring, an X-direction detection wire 30 that extends in a vertical direction (Y direction) of the diagram and has a width of several millimeters and a Y-direction detection wire 31 that extends in a direction (horizontal direction of the diagram, X direction) orthogonal to the X-direction detection wire 30 and has a width of several millimeters. The X-direction detection wire 30 and the Y-direction detection wire 31 respectively include the required number of X-direction detection wires 30 and Y-direction detection wires 31 having required lengths that are repeated in the X direction and the Y direction according to a detection region.

The X-direction detection wires 30 and the Y-direction detection wires 31 have an arrangement pitch selected not to emphasize periodicity based on the relationship between the pitches of the gate wiring 18A and the source wiring 19A located in the pixel array substrate 7. Thus, even when a wiring pattern, as shown in FIG. 5, of the touch sensor includes wiring extending in the same direction as the extending directions of the gate wiring 18A and the source wiring 19A, moiré generated by overlapping the lattice patterns can be reduced.

Figure 6:
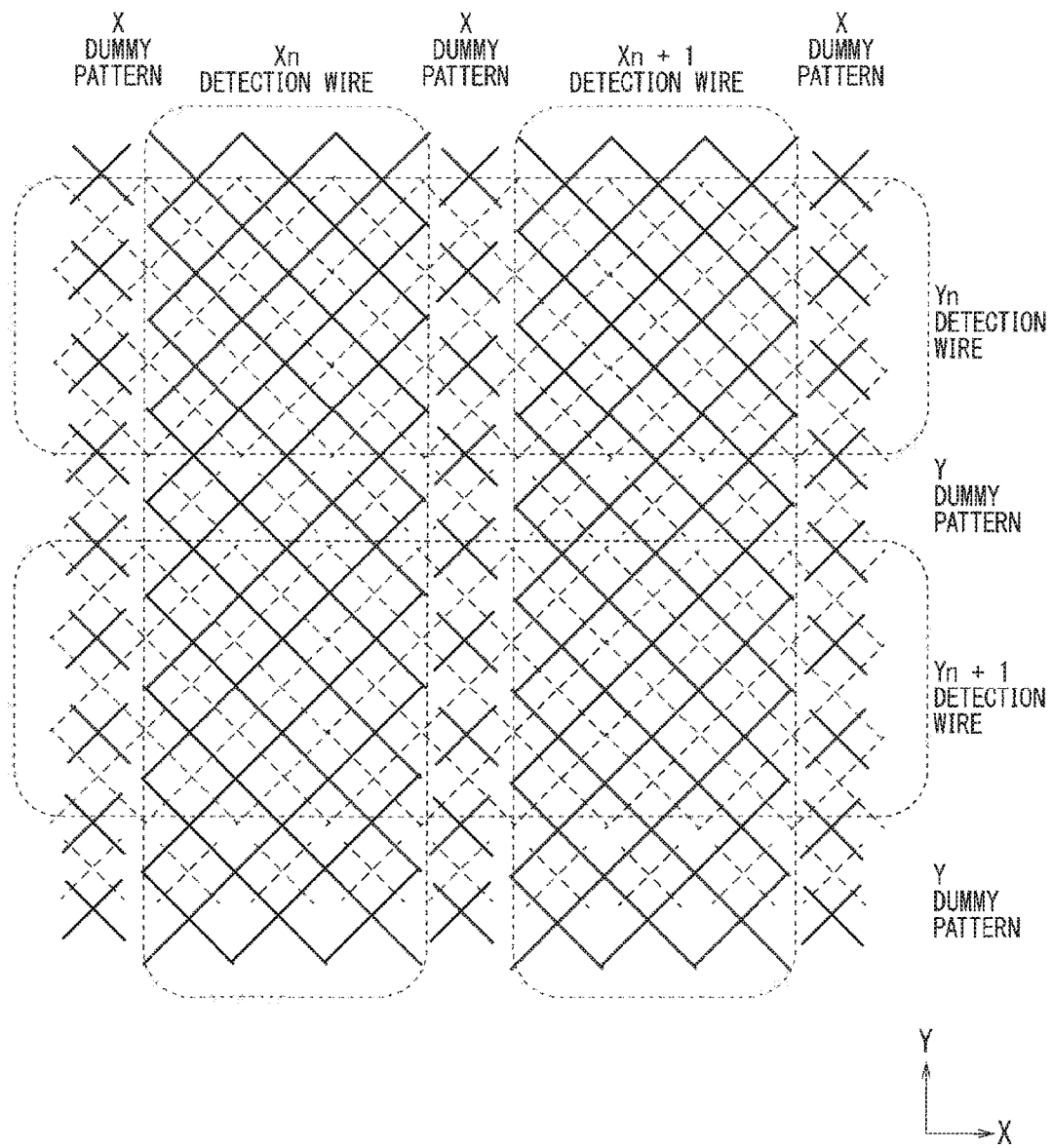

FIG. 6 shows such a wiring pattern. The gate wiring 18A and the source wiring 19A, which are not shown in FIG. 6, are assumed to respectively extend in the X direction and the Y direction in the diagram. The X-direction detection wires 30 and the Y-direction detection wires 31 respectively extend in the X direction and the Y direction also in the wiring pattern shown in FIG. 6, similarly to FIG. 5. However, each of wires forming the X-direction detection wire 30 and the Y-direction detection wire 31 extends diagonally with respect to the gate wiring 18A or the source wiring 19A.

As described above, the X-direction detection wire 30 and the Y-direction detection wire 31 have the combination of the wiring patterns in which the wires extend diagonally with respect to the extending direction of the gate wiring 18A or the source wiring 19A, and thus the visibility of the moiré can be reduced without emphasizing the periodicity.

The wiring pattern of the touch sensor including linear wires causes a phenomenon called a ray system in which a high-intensity light source typified by sunlight is scattered and diffracted at an edge of the wiring, causing reflected light to spread in a direction orthogonal to the wiring. Thus, as one of the techniques for preventing the phenomenon of the ray system, the wiring may include a curve having the effect of spreading the reflected light to all directions. The reason is to achieve the effect of spreading the reflected light at the curved portions to all the directions.

In addition, FIG. 6 shows an image shape that indicates characteristics of each wiring having a diagonal straight line. The actual pattern is appropriately optimized.

The X-direction detection wires 30 or the Y-direction detection wires 31 are lower wiring while the other wires are upper wiring. The lower wiring is formed of a laminated film including, for example, an Al alloy film of 200 nm, a translucent highly-nitrided Al film of 50 nm, and an IZO film of 50 nm laminated in this order from the lowest. The lower wiring is located on the transparent substrate 15. The lower wiring is coated with a laminated film, which includes, for example, a coating insulating film of 700 nm and a $SiO_2$ film of 100 nm laminated in this order from the lowest, as the interlayer insulating film. The upper wiring as a laminated film, which includes, for example, an Al alloy film of 200 nm, a translucent highly-nitrided Al film of 50 nm, and an IZO film of 50 nm laminated in this order from the lowest, is located on the interlayer insulating film. The upper wiring is coated with a laminated film, which includes, for example, a coating insulating film of 700 nm and a $SiO_2$ film of 100 nm laminated in this order from the lowest, as the protective insulating film.

When the X-direction detection wire 30 and the Y-direction detection wire 31 each have the laminated film structure, reflectivity at the surface of the wiring can be reduced and the visibility of the wiring under external light can be suppressed. The laminated structure of the Al alloy, the translucent highly-nitrided Al, and the IZO is assumed as the structural material for the sensor wiring. According to the characteristics needed for the sensor wiring, the structural material for the sensor wiring may be selected from structures including a low-resistance conductive film as a main material, for example, an Al alloy single layer, a structure including an Al alloy as a main material, a structure including a Cu alloy as a main material, and a structure including an Mo alloy as a main material. Further, the laminated film including the coating insulating film and the $SiO_2$ film is assumed as each of the insulating films, which may be made of a single-layer coating insulating film, a multilayer coating insulating film, a single-layer $SiO_2$ film, another inorganic insulating film, or a laminated film including inorganic insulating films. The above-mentioned insulating film preferably has a film configuration that can suppress reflection at an interface between a substrate, an adhesive, or an air layer, and the insulating film.

Figure 7:
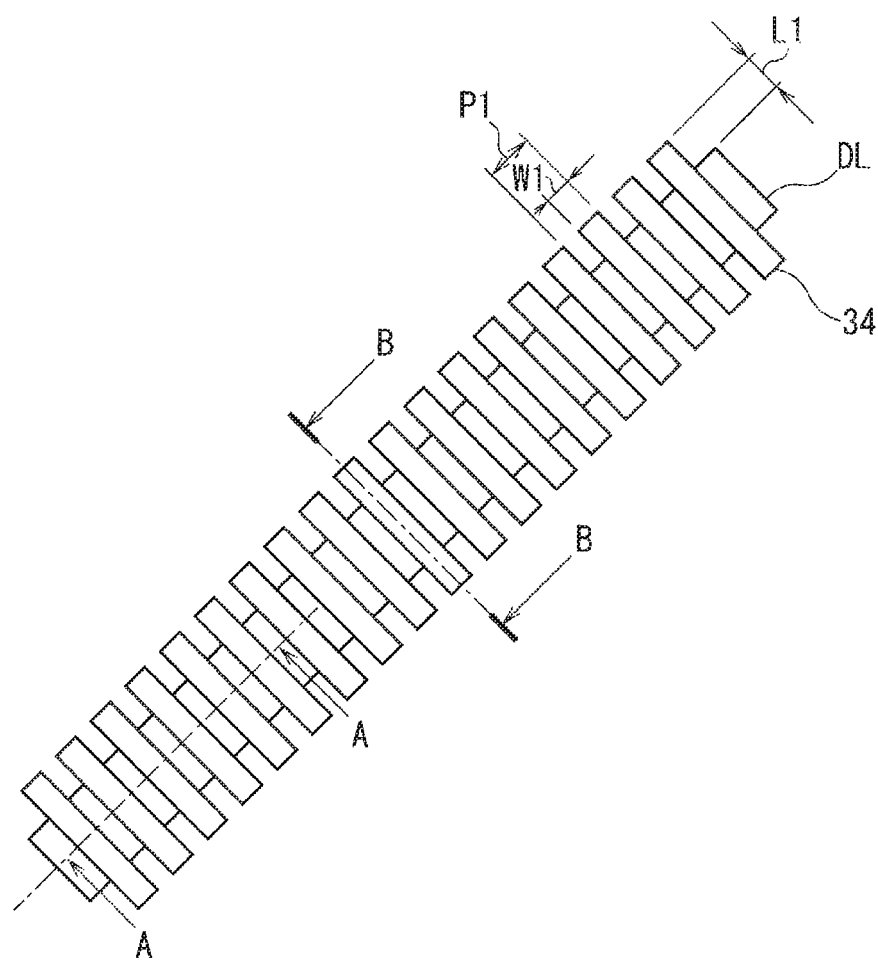
FIG. 7 is a top view of the touch sensor pattern.

Next, the touch sensor pattern 16 is further described with reference to FIGS. 7, 8A, and 8B. FIG. 7 is a top view of the touch sensor pattern 16. FIG. 8A is a cross-sectional view taken along an A-A line in FIG. 7. FIG. 8B is a cross-sectional view taken along a B-B line in FIG. 7. FIG. 8B also shows a dependency graph of intensity of polarized light on a position together with the cross-sectional view, and the details are described below.

As shown in FIGS. 7, 8A, and 8B, an interlayer insulating film 32 is located so as to cover lower wiring DL on the transparent substrate 15, and a fine pattern 34 is located on the interlayer insulating film 32. A protective insulating film 33 is located so as to cover the fine pattern 34. The fine pattern 34 is made of a film in the same layer as upper wiring UL orthogonal to an extending direction of the lower wiring DL. The fine pattern 34 includes narrow rectangular isolated patterns each having a width W1. The isolated patterns are regularly located side by side at a pitch length P1, to thereby form a third polarizer. Herein, the lower wiring DL and the upper wiring UL have a relationship such that one of them includes an individual wire forming the above-described X-direction detection wire 30 and the other includes an individual wire forming the Y-direction detection wire 31.

An extending direction of the lower wiring DL is referred to as a first direction, and a direction orthogonal to the first direction is referred to as a second direction, except where specifically noted.

Next, polarization as a precondition to the present invention is described before FIG. 8B is described. An optical axis of transmitted light incident on the transparent substrate 15 from the backlight unit 1 is aligned in one direction by passing through the polarizing film 11. The one direction of the optical axis of the incident and transmitted light can be vectorially dispersed into the first direction and the second direction.

In FIG. 8B, the light from the backlight unit 1 passes through the transparent substrate 15 and is applied to the lower wiring DL from below. The light having the light intensity in which the polarization axis is aligned in the one direction as described above is applied to a region where the lower wiring DL is not located. This is indicated by the flat area of the dotted portion in the graph of FIG. 8B.

On the other hand, when the light mentioned above passes through the vicinity of the edge of the lower wiring DL, the light in the first direction parallel to the extending direction of the lower wiring DL is absorbed, and only the light in the second direction perpendicular to the extending direction of the lower wiring DL is thus allowed to pass. The intensity of the polarized light is indicated by the declined portions of the solid line and the dotted line in FIG. 8B.

The intensity of the polarized light having an axis perpendicular to the extending direction of the lower wiring DL increases as the light approaches closer to the lower wiring DL, and the intensity of the polarized light decreases with distance farther from the lower wiring DL (solid line). In contrast, the intensity of the polarized light having the polarization axis at the time of the passage through the transparent substrate 15 decreases as the light approaches closer to the lower wiring DL because the light having an axis parallel to the extending direction of the lower wiring DL is absorbed and converted to light having an axis perpendicular to the extending direction of the lower wiring DL (dotted line).

Herein, the term "convert" is used. The term here indicates a change in direction of a polarization axis before and after passage of light due to absorption of the light in a specific direction, which relatively increases intensity of light in other directions. Hereinafter, such an expression may be used.

In addition, FIG. 8B shows that the solid line and the dotted line have the same maximum heights of the vertical axis for the sake of convenience, but the polarized light (solid line) having the axis perpendicular to the extending direction of the lower wiring DL actually have the lower maximum intensity.

Furthermore, when the light passes through the vicinity of the edge of the fine pattern 34 in the upper layer, the light having the optical axis perpendicular to the extending direction of the lower wiring DL is absorbed because the end portion, which protrudes from the lower wiring DL in plan view, of the fine pattern 34 is perpendicular to the extending direction of the lower wiring DL. Therefore, this greatly reduces the light polarized perpendicularly to the extending direction of the lower wiring DL to reach the polarizing film 17. This is described below with reference to FIGS. 11, 12, 18A, 18B, 19 to 21.

As shown in FIG. 7, the fine pattern 34 is orthogonal to the extending direction of the lower wiring DL and includes a plurality of members arranged in the extending direction of the lower wiring DL. The fine pattern 34 has a wiring portion that overlaps the lower wiring DL in plan view and an non-wiring portion that does not overlap the lower wiring DL in plan view. A length of the non-wiring portion, namely, a protrusion amount L1 of the fine pattern 34 protruding from the lower wiring DL is 200 nm. The fine pattern 34 has a pitch P1 of 250 nm in the extending direction of the lower wiring DL and has a width W1 of 100 nm.

The fine pattern 34 has the pattern pitch P1 and the pattern width W1 appropriately set by taking polarization efficiency, a polarized wavelength region, and a processing method into consideration. For example, to enhance the polarization efficiency with a wavelength of 400 nm to 750 nm (380 nm to 780 nm in some documents) in a visible range of light, an interval of wiring needs to be set narrower than a wavelength of a short wavelength. Moreover, to provide a polarization function stable in the visible range of light, a wavelength $\lambda = p \times (n + \sin x)$ causing Rayleigh resonance needs to be set shorter than the wavelength of the short wavelength. Therefore, the wavelength $\lambda$ on the short wavelength side=400 nm and the pitch P1≤266 nm, assuming that a refractive index n of $SiO_2$=approximately 1.5 and an incident angle x≈0° due to the incident light from the array substrate side.

L1 is preferably more than twice as much as W1, and L1 preferably has a length with consideration given to overlapping precision of the lower wiring DL and the fine pattern 34.

In a case where the fine pattern 34 protrudes to the outside of a region where the polarized light having the polarization axis perpendicular to the extending direction of the lower wiring DL is observed, a protruding region is preferably smaller than a region where a curve of the intensity of the polarized light in the direction of the polarization axis at the time of a black display after the passage through the lower wiring DL and a curve of the intensity of the polarized light having the polarization axis perpendicular to the lower wiring DL are the same in height in order to prevent a phenomenon in which light leakage newly occurs due to the polarized light having the polarization axis perpendicular to the extending direction of the fine pattern 34.

When the extending direction of the lower wiring DL forms an angle closer to 0° or 180° with the polarization axis of the polarizing film 17, the light leakage is more reduced because the conversion direction of the polarization axis by the lower wiring DL is made orthogonal to the polarizing film 17. Thus, the protrusion amount L1 of the fine pattern 34 may be reduced. When the extending direction of the lower wiring DL forms an angle closer to 90° with the polarization axis of the polarizing film 17, the light leakage occurs because the conversion direction of the polarization axis by the lower wiring DL is made parallel to the polarizing film 17. Thus, the effect of the fine pattern 34 is needed, and the protrusion amount L1 may be increased.

To reduce (not completely shield) the influence of the projection of the polarization axis polarized at the wiring edge onto another axis, the pitch P1 and W1 may be fixed while a high priority is given to processability of the fine pattern 34.

Figure 9:
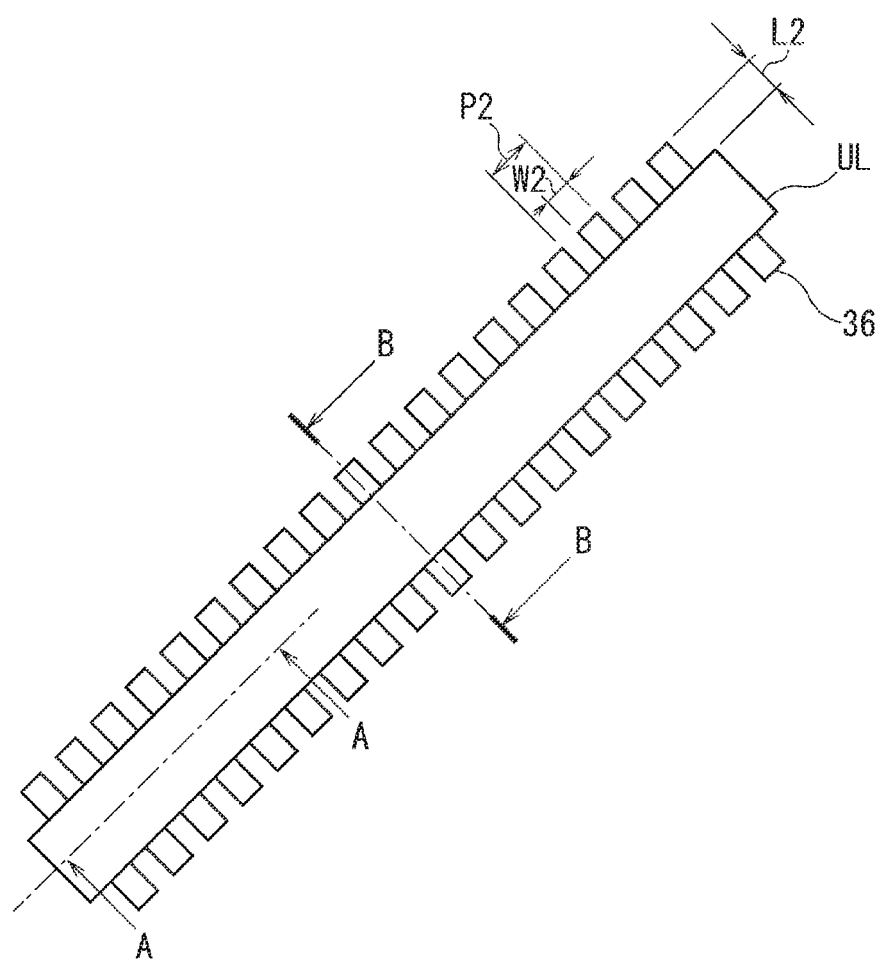
FIG. 9 is a top view of the touch sensor pattern.

The positional relationship between the wiring pattern being a first electrode wiring pattern and the fine pattern forming the third polarizer may be reversed. This state is shown in FIGS. 9, 10A, and 10B. As shown in FIGS. 9, 10A, and 10B, a fine pattern 36 is made of a film in the same layer as the lower wiring DL orthogonal to an extending direction of the upper wiring UL. FIG. 9 is a top view of the upper wiring UL and the fine pattern 36, and FIGS. 10A and 10B are cross-sectional views thereof. FIG. 10A is a cross-sectional view taken along an A-A line in FIG. 9. FIG. 10B is a cross-sectional view taken along a B-B line in FIG. 9.

The fine pattern 36 is orthogonal to the extending direction of the upper wiring UL and includes a plurality of members arranged in the extending direction of the upper wiring UL. The fine pattern 36 has a wiring portion that overlaps the upper wiring UL in plan view and an non-wiring portion that does not overlap the upper wiring UL in plan view. A length of the non-wiring portion, namely, a protrusion amount L2 of the fine pattern 36 protruding from the upper wiring UL is 200 nm. The fine pattern 36 has a pitch P2 of 250 nm in the extending direction of the upper wiring UL and has a width W2 of 100 nm. The fine pattern 36 has the pattern pitch P2 and the pattern width W2 appropriately set by taking polarization efficiency, a polarized wavelength region, and a processing method into consideration. L2 may have at least a width with consideration given to overlapping precision of the upper wiring UL and the fine pattern 36 and include a region greatly affected by the projection of the axis polarized by the upper wiring UL onto another axis. Moreover, L2 is preferably shorter than L2 in which the intensity of the polarized light having the polarization axis of the non-wiring pattern portion is equal to the intensity of the polarized light having the polarization axis parallel to the wiring pattern without the fine pattern 36. FIG. 10B shows a dependency graph of intensity of polarized light on a position, which is the same as FIG. 8B, so that the descriptions are omitted.

The effects described above, which can be obtained by the touch sensor pattern 16, are described with reference to FIGS. 11 and 12. FIG. 11 shows a conventional touch sensor pattern without the fine patterns 34, 36. FIG. 12 shows the touch sensor pattern 16 in the first preferred embodiment.

Both of FIGS. 11 and 12 show how a polarization direction shifts as transmitted light passes through each layer. The shift in each of the layers is indicated in the horizontal direction in the diagram.

A polarization axis of the polarized light converted by the polarizing film 11 faces any direction due to voltage applied to the liquid crystal layer 8 before the light passes through the sensor portion. For this reason, the polarization axis of the light before passing through the sensor portion is collectively indicated by the vertical direction of the diagram, which represents a direction orthogonal to the polarization axis of the polarizing film 17, namely, a direction of the polarization axis at the time of a black display, for the sake of simplicity of description. The intensity of the light is indicated by a length of an arrow.

FIG. 11 shows a difference between with and without the touch sensor pattern 16 at the top and the bottom of the diagram.

FIG. 12 shows, at the top and the bottom of the diagram, comparisons between the case where the fine pattern 34 is located in the upper layer as shown in FIG. 7 and the case where the fine pattern 36 is located in the lower layer as shown in FIG. 9.

As shown in FIG. 11, the polarized light in the vertical direction in the preceding stage of the sensor portion has the intensity of almost zero in the subsequent stage of the polarizing film 17 in the region without the touch sensor pattern. (When light shielding efficiency of the polarizing film 17 is theoretically 100%, the intensity of light after passing through the polarizing film 17 is zero. It is, however, assumed to be "almost" zero herein because the light shielding efficiency of the polarizing film 17 is not actually 100%). This case indicates that there is no excess polarization component. This allows for an excellent black display without the light leakage when a black is intended to be displayed, and thus the contrast can also be improved.

On the other hand, in a case where the touch sensor pattern without the fine pattern is formed, the intensity of light having the polarization components in the horizontal direction remains even after the light passes through the polarizing film 17. Thus, even when a black is intended to be displayed as described above, passage of part of the light prevents the excellent black display. The conceivable cause is that the light when passing through the touch sensor pattern is polarized at the edge of the individual wiring pattern and the polarization components, which are diverted from the direction orthogonal to the polarization axis of the polarizing film 17, are generated. In other words, for the conventional touch sensor pattern without the fine pattern, the light leakage occurs due to the projection of the axis polarized by the wiring pattern onto another axis.

Next, the polarization effects of the touch sensor pattern 16 in this preferred embodiment are described with reference to FIG. 12. As shown at the top of FIG. 12, when the light passes through the fine pattern 36 in the lower layer, the light is converted to the light having the polarization axis orthogonal to the extending direction of the fine pattern 36. The extending direction of the fine pattern 36 is formed in the direction orthogonal to the extending direction of the upper wiring UL, so that the polarization axis of the light after passing through the fine pattern 36 coincides with the extending direction of the upper wiring UL. When the light having the polarization axis changed by the fine pattern 36 passes through the vicinity of the region in which the upper wiring UL is located, the polarization axis is converted by the upper wiring UL. The polarization axis of the light incident from below the upper wiring UL is orthogonal to the conversion direction of the polarization axis by the upper wiring UL. Thus, the incident light is shielded by the polarization effects, and the light does not pass through the vicinity of the region in which the upper wiring UL is located.

As shown at the bottom of FIG. 12, when the light incident from below the lower wiring DL passes through the vicinity of the region in which the lower wiring DL is located, the light is converted to the light having the polarization axis orthogonal to the extending direction of the lower wiring DL. Since the extending direction of the fine pattern 34 in the upper layer is formed in the direction orthogonal to the extending direction of the lower wiring DL, the conversion direction of the polarization axis by the fine pattern 34 is orthogonal to the polarization axis of the light having the polarization axis changed after passing through the vicinity of the region in which the lower wiring DL is located. The light shielding is thus achieved by the polarization effects when the light passes through the fine pattern 34. Therefore, the light does not pass through the vicinity of the region in which the lower wiring DL is located.

As described above, the fine patterns 34, 36 described in this preferred embodiment are located above the lower wiring DL or below the upper wiring UL, so that the projection of the axis polarized at the edge of the wiring pattern of the touch sensor onto another axis is canceled out. Thus, a decrease in contrast can be suppressed.

Figure 13:
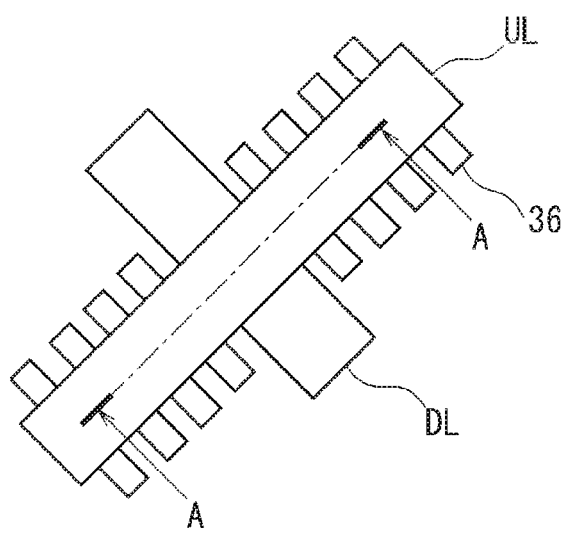
FIG. 13 is a top view showing an intersection of wiring patterns of the touch sensor pattern.

FIG. 13 is a top view showing an intersection (a crossing portion) of the wiring patterns of the touch sensor pattern 16. FIG. 14A is a cross-sectional view taken along an A-A line in FIG. 13. FIG. 14B is a cross-sectional view of a touch sensor pattern, which has no fine pattern, of a comparative example.

In the absence of the fine pattern 36 as shown in FIG. 14B, when the lower wiring DL has a film thickness of d1, a coating film on the lower wiring DL immediately after the application of a planarization film has a film thickness of d2 and a coating film in an non-wiring formation portion has a film thickness of d3=d1+d2. When the rate of change of film thickness by curing (heat curing) is 1, a film thickness after curing on the lower wiring DL is d4=d2×β and a film thickness after curing in the non-wiring formation portion is d5=d3×β=d1×β+d2×β. In other words, the film thickness of the interlayer insulating film 32 on the lower wiring DL is thinner than that in the non-wiring formation portion only by d1×β. Thus, the breakdown voltage of the interlayer insulating film 32 decreases.

On the other hand, for the touch sensor pattern 16 in this preferred embodiment including the fine pattern 36 located below the upper wiring UL as shown in FIG. 14A, the interlayer insulating film 32 at the crossing portion of the lower wiring DL and the upper wiring UL has the film thickness greater than the film thickness in the structure shown in FIG. 14B such that a film thickness d3' during coating>d2 and a film thickness after curing d5'>d4. Thus, the breakdown voltage can increase.

<A-2. Modifications>

Figure 16B:
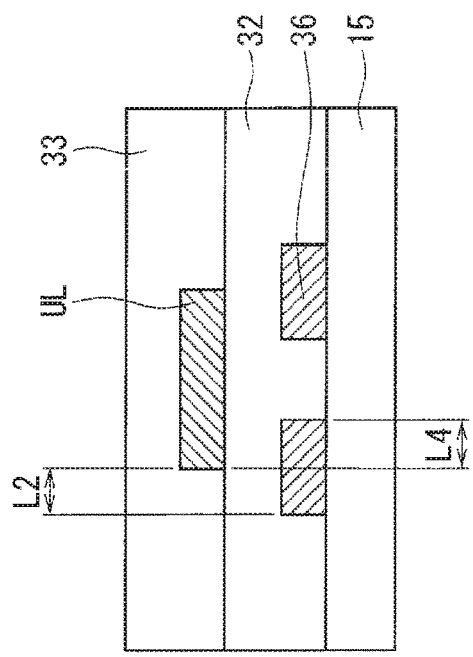
Figure 16A:
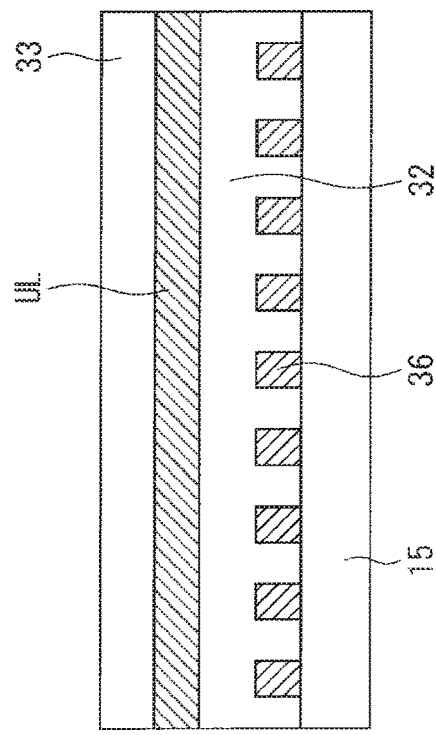

In a case where the individual wiring patterns that form the X-direction detection wire 30 and the Y-direction detection wire 31 have widths sufficiently greater than the widths W1, W2 of the fine patterns, the measures against the polarized light in the wiring patterns are not needed. For this reason, the fine patterns 34, 36 are each divided on the wiring in a first modification. FIGS. 15A and 15B are cross-sectional views of the lower wiring DL and the fine pattern 34 in the first modification of the first preferred embodiment. FIGS. 15A and 15B are the cross-sectional views in the directions corresponding to the directions of FIGS. 8A and 8B, respectively. FIGS. 16A and 16B are cross-sectional views of the upper wiring UL and the fine pattern 36 in the first modification. FIGS. 16A and 16B are the cross-sectional views in the directions corresponding to the directions of FIGS. 8A and 8B, respectively. In the first modification, an overlapping amount L3 (FIG. 15B) between the pattern edge of the lower wiring DL and the fine pattern 34 and an overlapping amount L4 (FIG. 16B) between the pattern edge of the upper wiring UL and the fine pattern 36 may be designed with consideration given to overlapping precision in the pattern formation.

Figure 17:
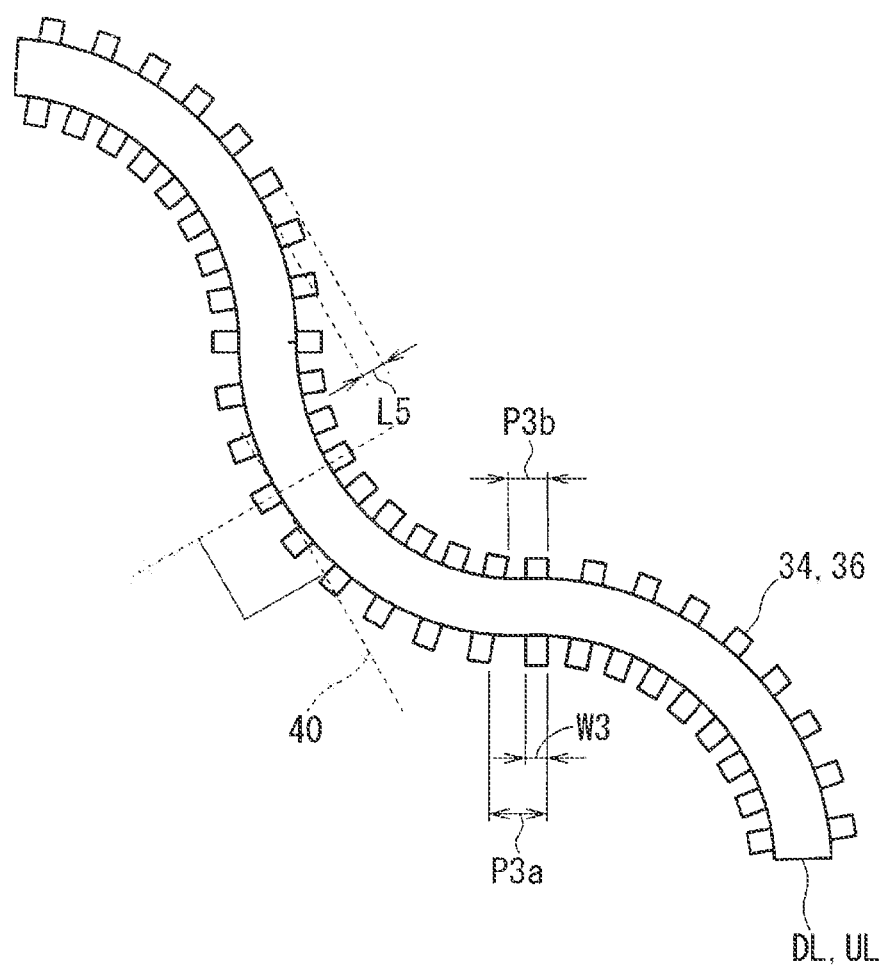
FIG. 17 is a top view of a touch sensor pattern in a second modification of the first preferred embodiment.

FIG. 17 is a top view of a touch sensor pattern in a second modification of the first preferred embodiment. The wiring (the upper wiring UL and the lower wiring DL) has the linear shape in the descriptions above while the wiring has the curved shape as shown in FIG. 17 in the second modification. In this case, the fine patterns 34, 36 are located in the direction orthogonal to the curved upper wiring UL and the curved lower wiring DL. The fine patterns 34, 36 may have a width W3, a protrusion amount L5, an interval P3a, and an interval P3b set to be the same as the widths W1, W2, the protrusion amounts L1, L2, and the interval P1 (P2) as shown in FIGS. 7 and 9.

Figure 18A:
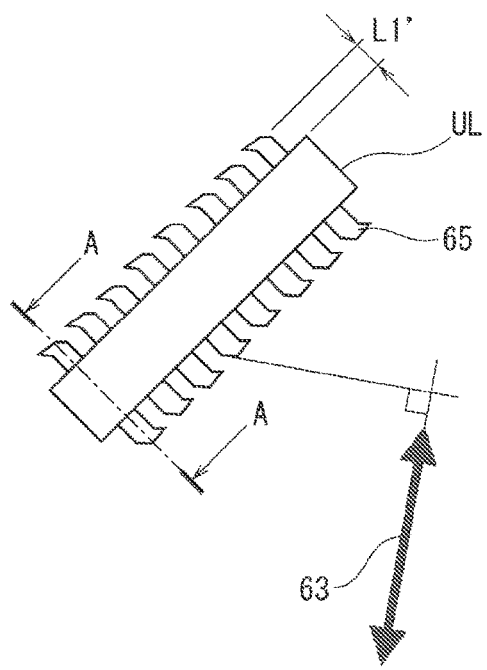
FIGS. 18A and 18B are top views showing fine patterns of touch sensor patterns in a third modification of the first preferred embodiment.
Figure 18B:
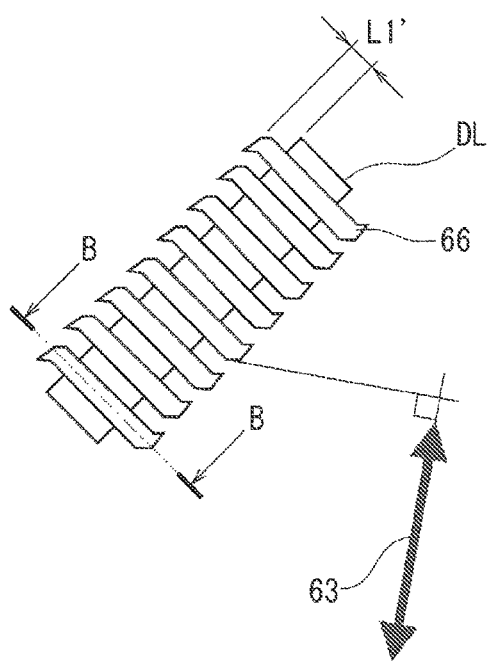

FIGS. 18A and 18B are top views showing fine patterns 65, 66 in a third modification. The fine patterns 34, 36 have the rectangular shape and have the polarization axis in the fixed direction in the descriptions above while the direction of polarization axis of the fine patterns 65, 66 can be changed at tip portions thereof in the third modification. FIG. 18A is a top view showing the upper wiring UL and the fine pattern 65 located below the upper wiring UL. FIG. 18B is a top view showing the lower wiring DL and the fine pattern 66 located above the lower wiring DL.

As shown in FIG. 18A, the fine pattern 65 has the tip portions bent continuously or discontinuously. Thus, the direction of the polarization axis of the fine pattern 65 in a position overlapping the upper wiring UL in plan view is parallel to the wiring direction of the upper wiring UL while the direction of the polarization axis of the fine pattern 65 at the tip portion is parallel to a polarization axis 63 of the polarizing film 17 of the counter substrate 10.

The fine pattern 66 similar to the fine pattern 65 also has the tip portions bent as shown in FIG. 18B. Thus, the direction of the polarization axis of the fine pattern 66 in a position overlapping the lower wiring DL in plan view is parallel to the wiring direction of the lower wiring DL while the direction of the polarization axis of the fine pattern 66 at the tip portion is parallel to the polarization axis 63 of the polarizing film 17 of the counter substrate 10.

Figure 19:
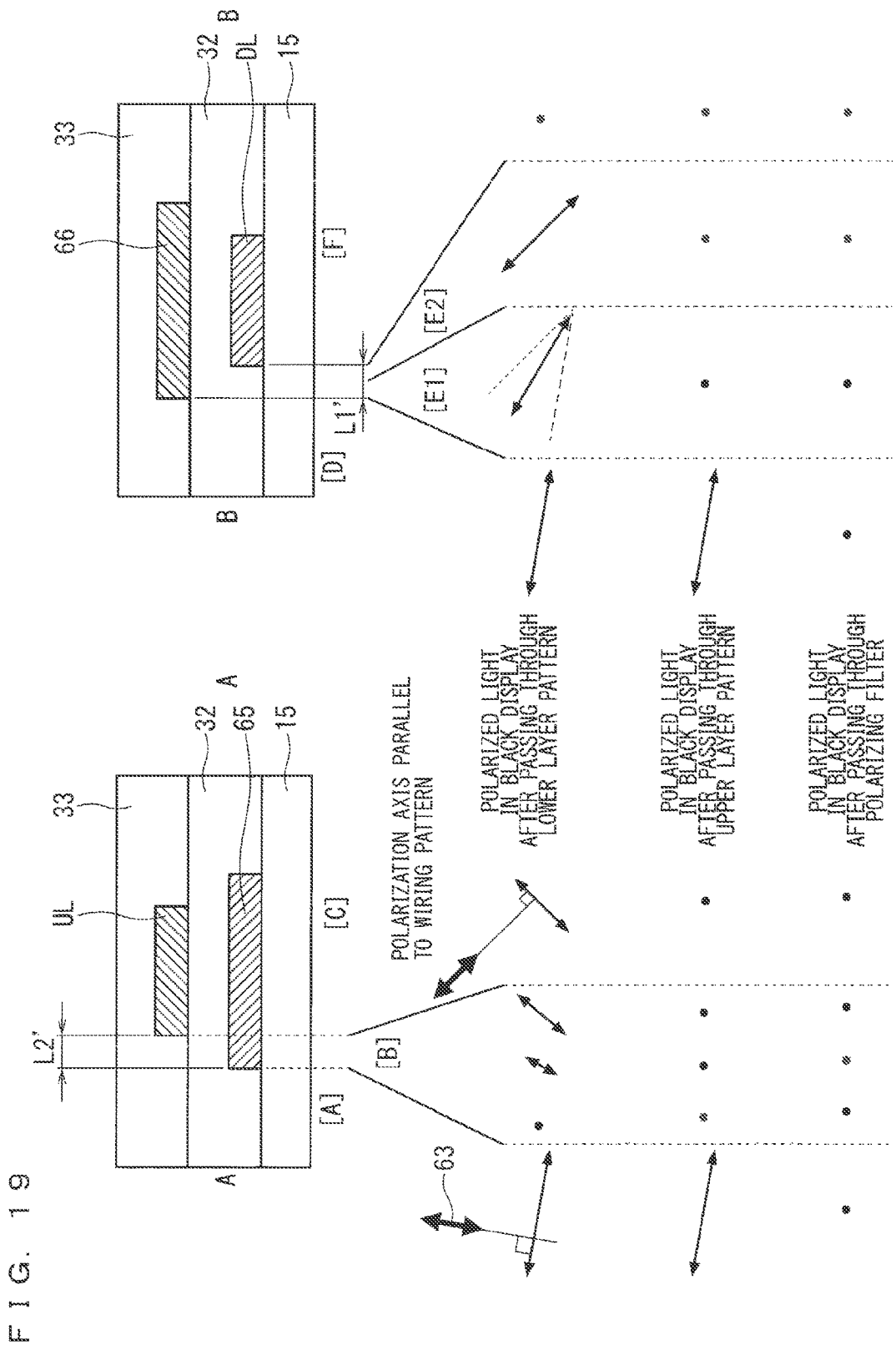
FIG. 19 shows polarization effects of the touch sensor pattern in the third modification of the first preferred embodiment.

FIG. 19 shows polarization effects of the third modification. A left portion of FIG. 19 is a cross-sectional view taken along an A-A line in FIG. 18A and shows the polarization effects of this structure. A right portion of FIG. 19 is a cross-sectional view taken along a B-B line in FIG. 18B and shows the polarization effects of this structure. In the left portion of FIG. 19, a "polarization axis parallel to wiring pattern" represents an axial direction parallel to the extending direction of the upper wiring UL. "Polarized light in a black display after passing through a lower layer pattern" represents light that has a polarization axis at the time of a black display and has passed through a lower layer in the left portion and the right portion of FIG. 19. "Polarized light in a black display after passing through an upper layer pattern" represents light that has passed through an upper layer after having passed through the lower layer in the left portion and the right portion of FIG. 19. "Polarized light in a black display after passing through a polarizing filter" represents light that has passed through the polarizing film 17 of the counter substrate 10 after having passed through the upper layer in the left portion and the right portion of FIG. 19.

In the left portion of FIG. 19, a region [A] represents a region that does not include the fine pattern 65 in the lower layer. A region [B] represents a region where the polarization axis of the light after passing through the lower layer does not coincide with the direction perpendicular to the extending direction of the upper wiring UL, in the region including the fine pattern 65 in the lower layer. A region [C] represents a region where the polarization axis of the light after passing through the lower layer coincides with the direction perpendicular to the extending direction of the upper wiring UL.

In the right portion of FIG. 19, a region [D] represents a region that does not include the fine pattern 66 in the upper layer. A region [E1] represents a region where the polarization axis of the light after passing through the lower layer is in the state between the state of the region [D] described above and a state of a region [E2] described below. The region [E2] represents a region where the light after passing through the lower layer is converted to the light having the polarization axis perpendicular to the extending direction of the lower wiring DL. A region [F] represents a region below the lower wiring DL.

In the left portion of FIG. 19, since the region [A] does not include the fine pattern 65, the polarization axis and the intensity of the light are not changed by the passage through the lower layer. The tip region of the fine pattern 65 at the left of the diagram in the region [B] extends in the direction perpendicular to the polarization axis of the polarizing film 17 of the counter substrate 10, so that the conversion direction of the polarization axis is the same as the polarizing film 17. Therefore, the light is shielded by the polarization effects of the fine pattern 65. Since the fine pattern 65 has the pattern orthogonal to the extending direction of the upper wiring UL from the left to the right of the diagram in the region [B], the direction of the axis changes orthogonally to the extending direction of the upper wiring UL after the light passes through the fine pattern 65 while the intensity of the light increases. In the region [C], the light after passing through the fine pattern 65 is converted to the light having the optical axis orthogonal to the extending direction of the upper wiring UL by the fine pattern 65.

Since the region [A] does not include the upper wiring UL, the polarization axis and the intensity of the light are not changed by the passage through the upper layer. In the region [B], a proportion of the influence by the conversion of the polarization axis of the light increases from the left to the right of the diagram, and the light is shielded by the polarization effects in the direction exactly orthogonal to the polarization axis of the light after passing through the lower layer. Since the light is converted to the light having the polarization axis orthogonal to the extending direction of the upper wiring UL in the vicinity of the upper wiring UL in the region [C], the light is shielded by the polarization effects, and the light in the portion of the upper wiring UL is shielded by the upper wiring UL.

In the region [A], the light orthogonal to the polarization axis of the polarizing film 17 is incident on the polarizing film 17, and the light is shielded by the polarization effects of the polarizing film 17. The regions [B], [C] are already in the light shielding state, and thus the light does not change by passing through the polarizing film 17.

The actions of the lower layer in the right portion of FIG. 19 are described. Since the region [D] does not include the lower wiring DL, the polarization axis and the intensity of the light do not change. In the region [E1], the polarization axis is converted by the lower wiring DL, and the direction of the converted polarization axis changes from the direction of the polarization axis at the time of the black display to the axial direction perpendicular to the extending direction of the lower wiring DL from the left to the right of the diagram. In the region [E2], the light is converted to the light having the polarization axis perpendicular to the extending direction of the lower wiring DL. In the region [F], the light is shielded by the lower wiring DL.

Next, the actions of the upper layer in the right portion of FIG. 19 are described. Since the region [D] does not include the fine pattern 66 in the upper layer, the polarization axis and the intensity of the light do not change. In the region [E1], the tip portion of the fine pattern 66 at the left of the diagram extends in the direction perpendicular to the polarization axis of the polarizing film 17 of the counter substrate 10, so that the conversion direction of the polarization axis is the same as the polarizing film 17. Therefore, the light having the polarization axis in the same direction as that of the polarization axis in the black display is shielded by the polarization effects. The polarization axis of the fine pattern 66 is converted from the axis parallel to the polarization axis of the polarizing film 17 to the axis parallel to the extending direction of the lower wiring DL from the left to the right of the diagram in the region [E1], so that the light is shielded by the polarization effects in the direction exactly orthogonal to the polarization axis of the light after passing through the lower layer. The region [F] is already in the light shielding state, and thus there is no change.

Next, the actions of the polarizing film 17 are described in the right portion of FIG. 19. The light orthogonal to the polarization axis of the polarizing film 17 enters the region [D], thereby being shielded by the polarization effects. The regions [E1], [E2], [F] are already in the light shielding state, and thus there is no change.

In addition, the fine patterns 65, 66 may have bent portions at a plurality of tips and have polarization axes changed discontinuously. The fine patterns 65, 66 may have curved tips and have polarization axes changed continuously. These configurations can suppress a decrease in intensity of black in a wide region near wiring, and also have a processing margin due to the elimination of the need to limit an upper limit on protrusion amounts L1', L2'.

Figure 20:
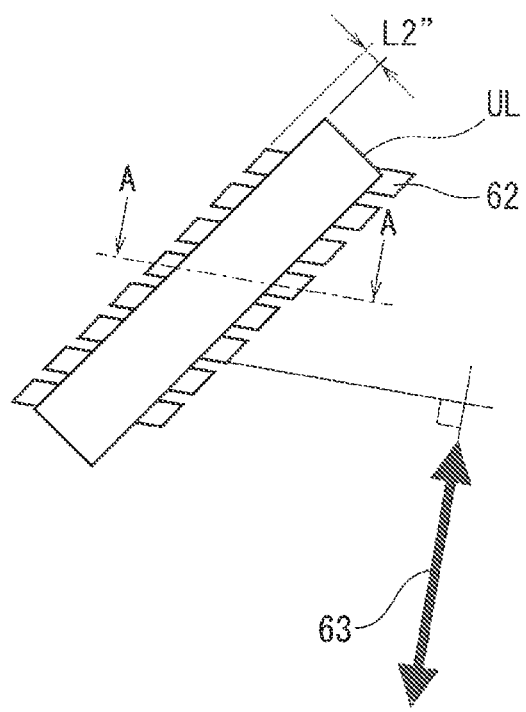
FIG. 20 shows a fine pattern of a touch sensor pattern in a fourth modification of the first preferred embodiment.

FIG. 20 is a top view showing a fine pattern according to a fourth modification. A fine pattern above the lower wiring DL in the fourth modification is the same as that in the third modification shown in FIG. 18B while the fine pattern below the upper wiring UL in the fourth modification is different from that in the third modification. As shown in FIG. 20, a polarization axis of a polarizer formed by a fine pattern 62 in the lower layer is set to be parallel to the polarization axis 63 of the polarizing film 17 of the counter substrate 10 (polarization axis orthogonal to polarized light incident on the color filter pattern 14 at the time of a black display) in the fourth modification.

Figure 21:
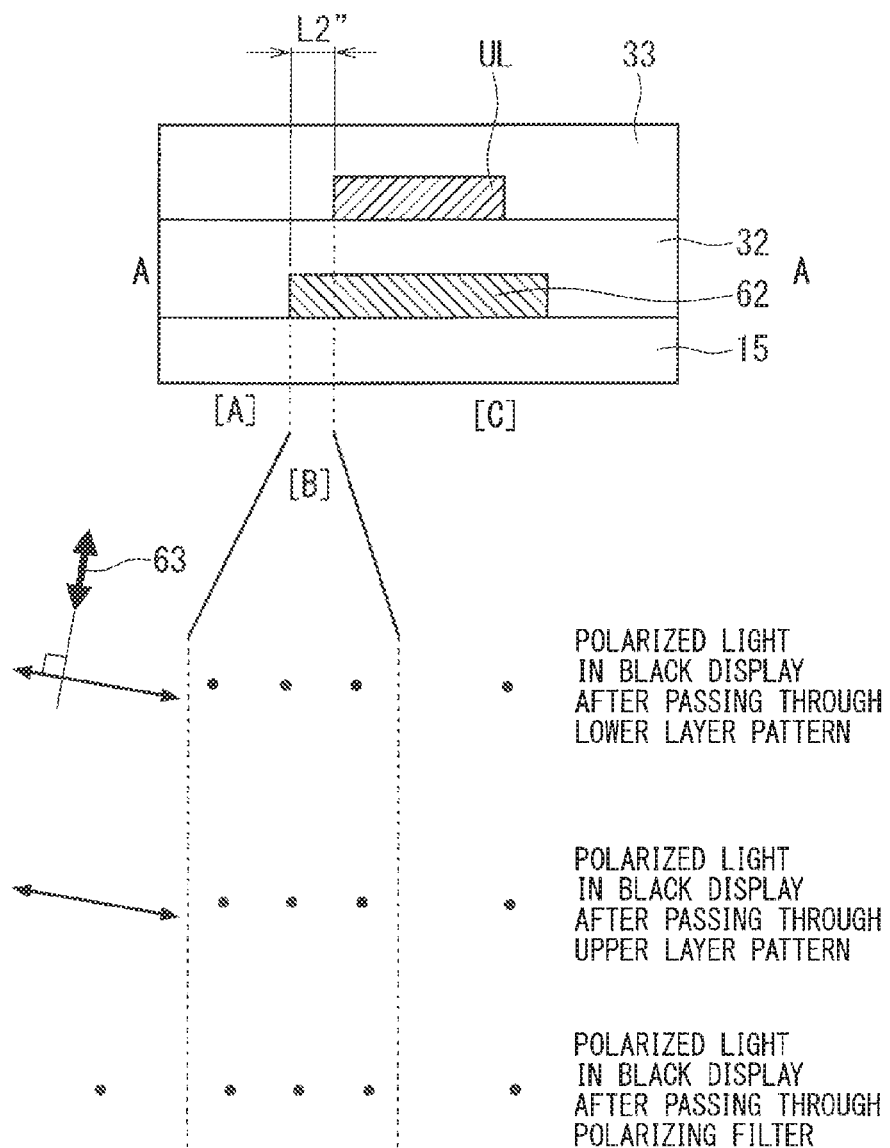
FIG. 21 shows polarization effects of the touch sensor pattern in the fourth modification of the first preferred embodiment.

FIG. 21 shows polarization effects of the fourth modification. FIG. 21 is a cross-sectional view taken along an A-A line in FIG. 20 and shows the polarization effects of this structure.

In FIG. 21, "polarized light in a black display after passing through a lower layer pattern" represents light that has a polarization axis at the time of a black display and has passed through the lower layer in FIG. 20. In FIG. 21, "polarized light in a black display after passing through an upper layer pattern" represents light that has passed through the upper layer after having passed through the lower layer in FIG. 20. In FIG. 21, "polarized light in a black display after passing through a polarizing filter" represents light that has passed through the polarizing film 17 of the counter substrate 10 after having passed through the upper layer in FIG. 20.

In FIG. 21, a region [A] represents a region that does not include the fine pattern 62 in the lower layer. A region [B] represents a region, which does not include the upper wiring UL, of the region including the fine pattern 62 in the lower layer. A region [C] represents a region including the fine pattern 62 and the upper wiring UL.

Next, the action of the lower layer are described. Since the region [A] does not include the fine pattern 62, the polarization axis and the intensity of the light do not change by the lower layer. Since the fine pattern 62 extends in the direction perpendicular to the polarization axis of the polarizing film 17 of the counter substrate 10 in the regions [B], [C], the conversion direction of the polarization axis is the same as the polarization film 17. Thus, the light is shielded by the polarization effects.

Next, the actions of the upper layer are described. Since the region [A] does not include the upper wiring UL, the polarization and the intensity of the light do not change. There is no change in the regions [B] and [C], which are already in the light shielding state.

Next, the actions of the polarizing film 17 are described. In the region [A], the light orthogonal to the polarization axis of the polarizing film 17 is incident on the polarizing film 17, so that the light is shielded by the polarization effects. There is no change in the regions [B] and [C], which are already in the light shielding state.

This configuration allows a width of a protrusion amount L2" protruding from the upper wiring UL to be greater than or equal to a width with consideration given to overlapping precision. This configuration can have a processing margin due to the elimination of the need to limit an upper limit on the protrusion amount L2".

<A-3. Effects>

The display apparatus 101 according to the first preferred embodiment of the present invention includes the polarizing film 11 (first polarizer), the pixel array substrate 7 (first insulating substrate), the counter substrate 10 (second insulating substrate), and the polarizing film 17 (second polarizer) that are located in the stated order in the light path from the light source toward the display surface. The second polarizer has the polarization axis parallel or perpendicular to the polarization axis of the first polarizer. The first insulating substrate and the second insulating substrate include the transparent substrates 12, 15 having insulating properties. At least the first insulating substrate or the second insulating substrate includes: the lower wiring DL (first electrode wiring pattern) that is located on the transparent substrates 12, 15 and is opaque; and the fine pattern 34 (third polarizer) that is located in the preceding stage or the subsequent stage of the first electrode wiring pattern in the light path and is opposed to the first electrode wiring pattern with the transparent insulating film therebetween. At least the third polarizer located in the subsequent stage of the first electrode wiring pattern has the polarization axis parallel to the extending direction of the edge of the first electrode wiring pattern. Therefore, the third polarizer cancels out a change of the polarization axis due to the wiring pattern. Thus, the light leakage can be suppressed, and the contrast can increase.

At least the third polarizer located in the subsequent stage of the first electrode wiring pattern has the long axis in the direction substantially perpendicular to the extending direction of the edge of the first electrode wiring pattern, and has the plurality of isolated patterns that overlap the edge and that do not allow the visible light beam to pass therethrough. Therefore, the isolated patterns cancel out a change of the polarization axis due to the wiring pattern. Thus, the light leakage can be suppressed, and the contrast can increase.

The isolated patterns each have the average pitch length of less than or equal to 266 nm in the short-axis direction, allowing for the stable polarization function in the visible range of light.

The isolated patterns may be metal patterns or conductive particles. This configuration can also suppress the light leakage and increase the contrast.

The third polarizer located in the subsequent stage of the first electrode wiring pattern has part of the polarization axis parallel to the polarization axis of the second polarizer. Thus, the protrusion amount of the third polarizer protruding from the lower wiring DL may be greater than or equal to a dimension with consideration given to the overlapping precision. This configuration eliminates the need to limit the upper limit on the protrusion amount, thereby having the processing margin.

The third polarizer located in the subsequent stage of the first electrode wiring pattern has the polarization axis parallel to the polarization axis of the second polarizer at the tip toward the side where the first electrode wiring pattern is not located. Thus, the protrusion amount of the third polarizer protruding from the lower wiring DL may be greater than or equal to a dimension with consideration given to the overlapping precision. This configuration eliminates the need to limit the upper limit on the protrusion amount, thereby having the processing margin.

The third polarizer located in the preceding stage of the first electrode wiring pattern has at least part of the polarization axis parallel to the polarization axis of the second polarizer. Thus, the protrusion amount of the third polarizer from the upper wiring UL may be greater than or equal to a dimension with consideration given to the overlapping precision. This configuration eliminates the need to limit the upper limit on the protrusion amount, thereby having the processing margin.

The display apparatus 101 further includes the liquid crystal layer sealed between the first insulating substrate and the second insulating substrate. The first insulating substrate further includes the pixel array layer located on the transparent substrate. The second insulating substrate further includes the touch panel layer located on the transparent substrate. The touch panel layer includes the first electrode wiring pattern as the touch sensor wiring and includes the third polarizer. Therefore, the third polarizer cancels out a change of the polarization axis due to the touch sensor wiring. Thus, the light leakage can be suppressed, and the contrast can increase.

The first electrode wiring pattern includes the curve. Thus, the phenomenon of the ray system in the first electrode wiring pattern can be suppressed.

The length in the long-axis direction of the region, which does not overlap the first electrode wiring pattern, of each of the isolated patterns is more than twice as much as the length of the short axis of each of the isolated patterns. Thus, the light leakage can be suppressed, and the contrast can increase.

<B. Second Preferred Embodiment>

<B-1. Configuration>

In the first preferred embodiment, the fine pattern for preventing the influence of the projection of the polarization axis onto another axis is located in the film in the same layer as the lower wiring DL located on the upper wiring UL with the insulating film therebetween, and is located in the film in the same layer as the upper wiring UL located on the lower wiring DL with the insulating film therebetween. In the second preferred embodiment, however, the fine pattern is located in the different layer from the lower wiring DL or the upper wiring UL.

Figure 22:
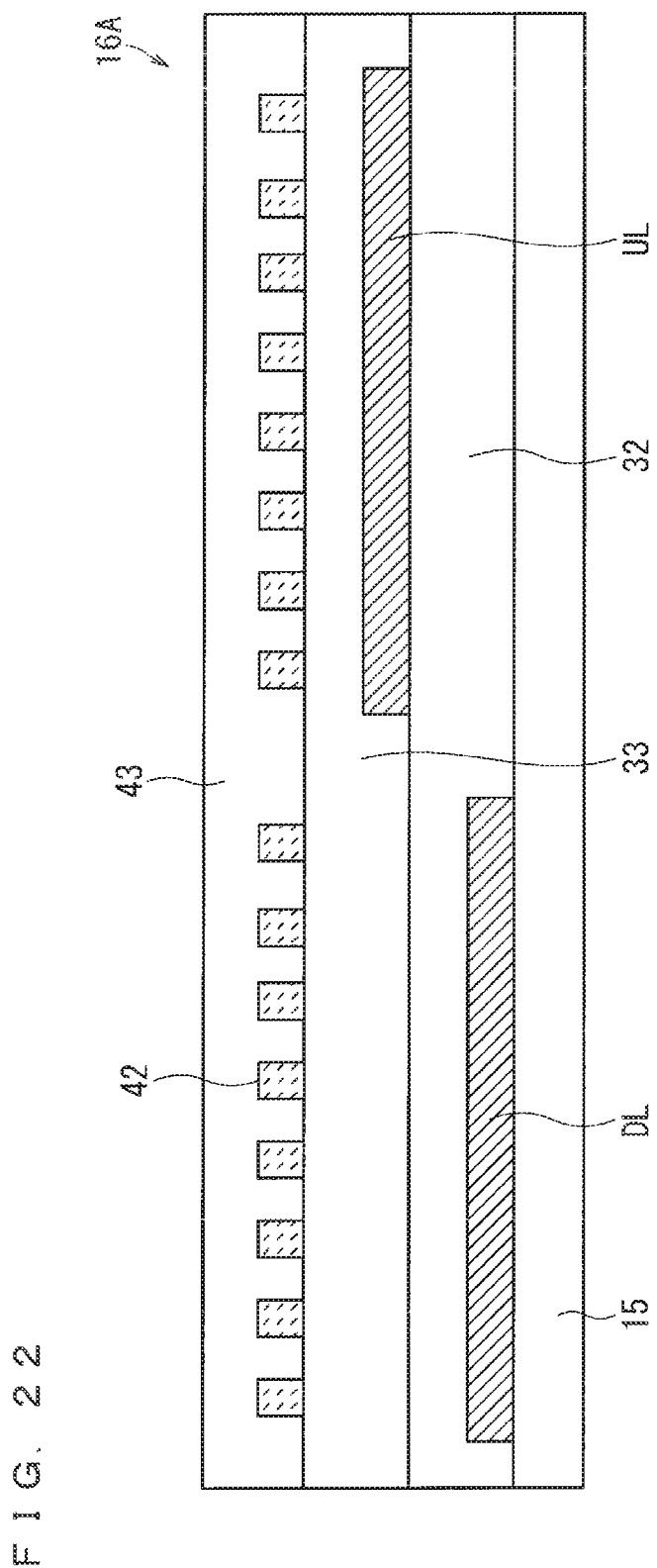
FIG. 22 is a cross-sectional view showing a configuration of a touch sensor pattern in a second preferred embodiment.

FIG. 22 is a cross-sectional view showing a configuration of a touch sensor pattern 16A in the second preferred embodiment. The touch sensor pattern 16A includes lower wiring DL being a first electrode wiring pattern located on a transparent substrate 15, an interlayer insulating film 32 covering the lower wiring DL, upper wiring UL being a second electrode wiring pattern located on the interlayer insulating film 32, a protective insulating film 33 covering the upper wiring UL, a fine pattern 42 being a third polarizer located on the protective insulating film 33, and a protective film 43 covering the fine pattern 42.

This structure eliminates the need to simultaneously form the fine pattern 42 and the lower wiring DL or the upper wiring UL. Thus, the structure is applicable in a case where a dimension or precision needed for patterning the fine pattern is finer or higher than a dimension or precision needed for patterning the wiring pattern. For example, in patterning the lower wiring DL and the upper wiring UL, an appropriate degree of precision can be obtained by patterning a resist by exposure using gh-line or i-line and by forming a pattern by wet etching.

The fine pattern 42 is orthogonal to an extending direction of the lower wiring DL above the lower wiring DL and orthogonal to an extending direction of the upper wiring UL above the upper wiring UL, to thereby serve as the third polarizer. The fine pattern 42 is made of an Al alloy having, for example, a film thickness of 200 nm such that the Al alloy has the same pattern pitch, pattern width, and protrusion amount protruding from the end of the wiring as those described in the first preferred embodiment. The fine pattern 42 is patterned with a high degree of precision by electronic drawing or dry etching with a high-resolution resist, and thus the fine pattern 42 having a desirable polarization function can be obtained.

FIG. 23 is a diagram for describing polarization effects of the touch sensor pattern 16A in the second preferred embodiment. The touch sensor pattern 16A includes the fine pattern 42 located in the upper portion of the sensor pattern. The fine pattern 42 has the polarization action perpendicular to the polarization axis, which has been converted by the sensor pattern, so that the light can be shielded by the fine pattern 42. Therefore, light leakage can be suppressed, and thus a decrease in contrast can be suppressed, similarly to the first preferred embodiment.

In the second preferred embodiment, the fine pattern 42 is located in the different layer from the layer of the lower wiring DL or the upper wiring UL, resulting in one more step of patterning than the first preferred embodiment. Instead, however, a low-cost formation process other than the processing of the fine pattern 42 can be introduced for the processing of the lower wiring DL and the upper wiring UL. Therefore, the manufacturing cost can be reduced.

<B-2. Modifications>

Figure 24:
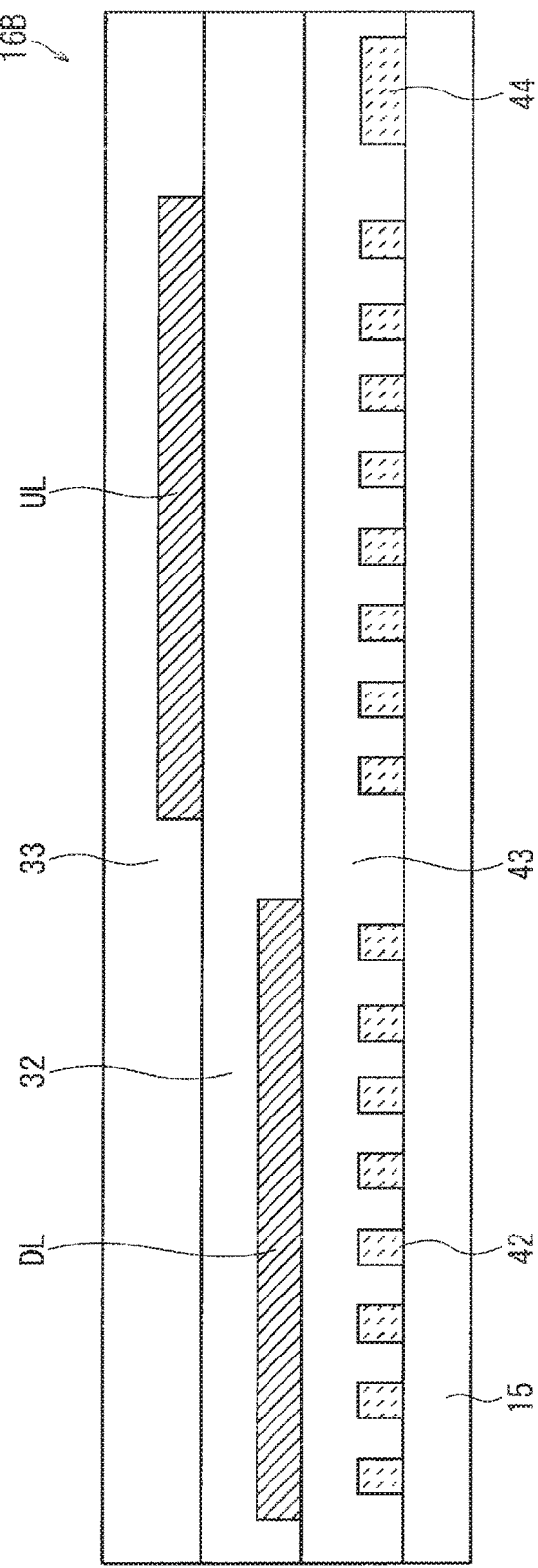
FIG. 24 is a cross-sectional view showing a configuration of a touch sensor pattern in a first modification of the second preferred embodiment.

FIG. 22 shows the fine pattern 42 located above the protective insulating film 33. However, the fine pattern 42 is located in the layer below the lower wiring DL in a first modification. FIG. 24 is a cross-sectional view showing a configuration of a touch sensor pattern 16B according to the first modification of the second preferred embodiment. The touch sensor pattern 16B includes the fine pattern 42 serving as the third polarizer on the transparent substrate 15 and a mark 44 for alignment in the same layer as the fine pattern 42. The fine pattern 42 and the mark 44 are covered with the protective film 43 having insulating properties. The lower wiring DL is located on the protective film 43 with reference to the mark 44 and covered with the interlayer insulating film 32. The upper wiring UL is located on the interlayer insulating film 32 with reference to the mark 44 and covered with the protective insulating film 33.

Figure 25:
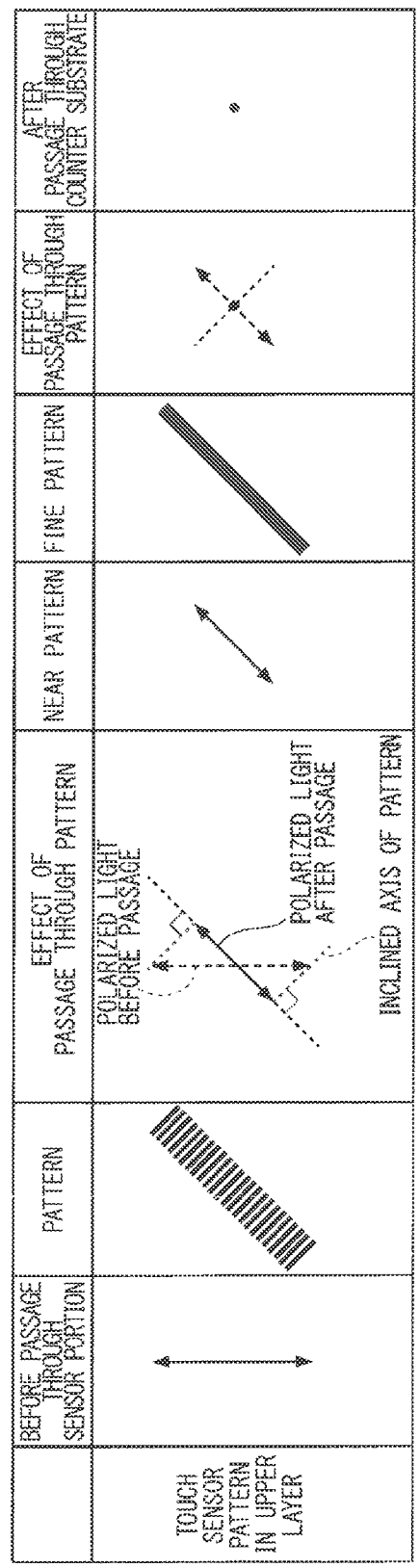
FIG. 25 is a diagram for describing polarization effects of the touch sensor pattern in the first modification of the second preferred embodiment.

FIG. 25 is a diagram for describing polarization effects of the touch sensor pattern 16B in the first modification of the second preferred embodiment. The touch sensor pattern 16B includes the fine pattern 42 located in the lower portion of the sensor pattern. Consequently, the change of the polarization axis by the fine pattern 42 and the change of the polarization axis by the sensor pattern cancel each other out. Thus, the light leakage can be suppressed, and the decrease in contrast can be suppressed.

The third modification of the first preferred embodiment is also applicable to this preferred embodiment. In other words, the direction of the polarization axis may be changed, at the protruding portion of the fine pattern 42 protruding from the sensor pattern, so as to be parallel to the polarization axis of the polarizing film 17 of the counter substrate 10 from the region of the wiring pattern toward the tip of the protruding portion.

The fourth modification of the first preferred embodiment is also applicable to the configuration of the first modification of this preferred embodiment. In other words, the polarization axis of the fine pattern 42 may be parallel to the polarization axis of the polarizing film 17 of the counter substrate 10.

<C. Third Preferred Embodiment>
<C-1. Configuration>

Figure 26:
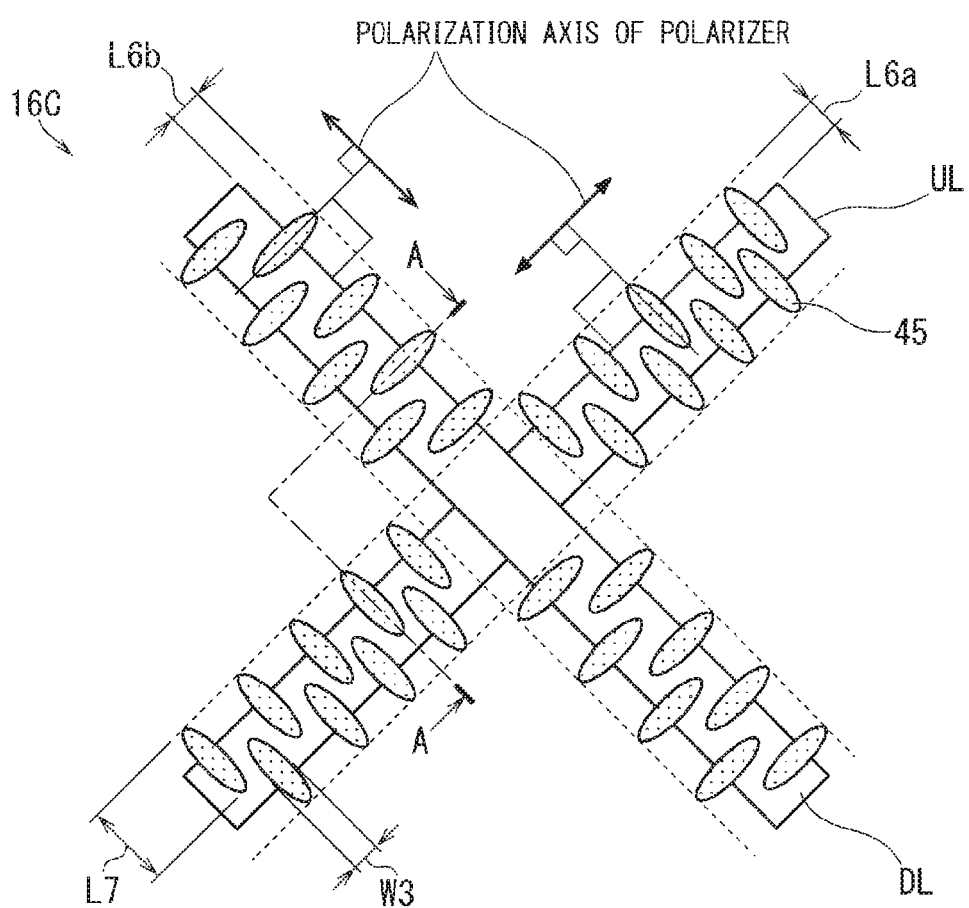
FIG. 26 is a top view of a touch sensor pattern in a third preferred embodiment.
Figure 27:
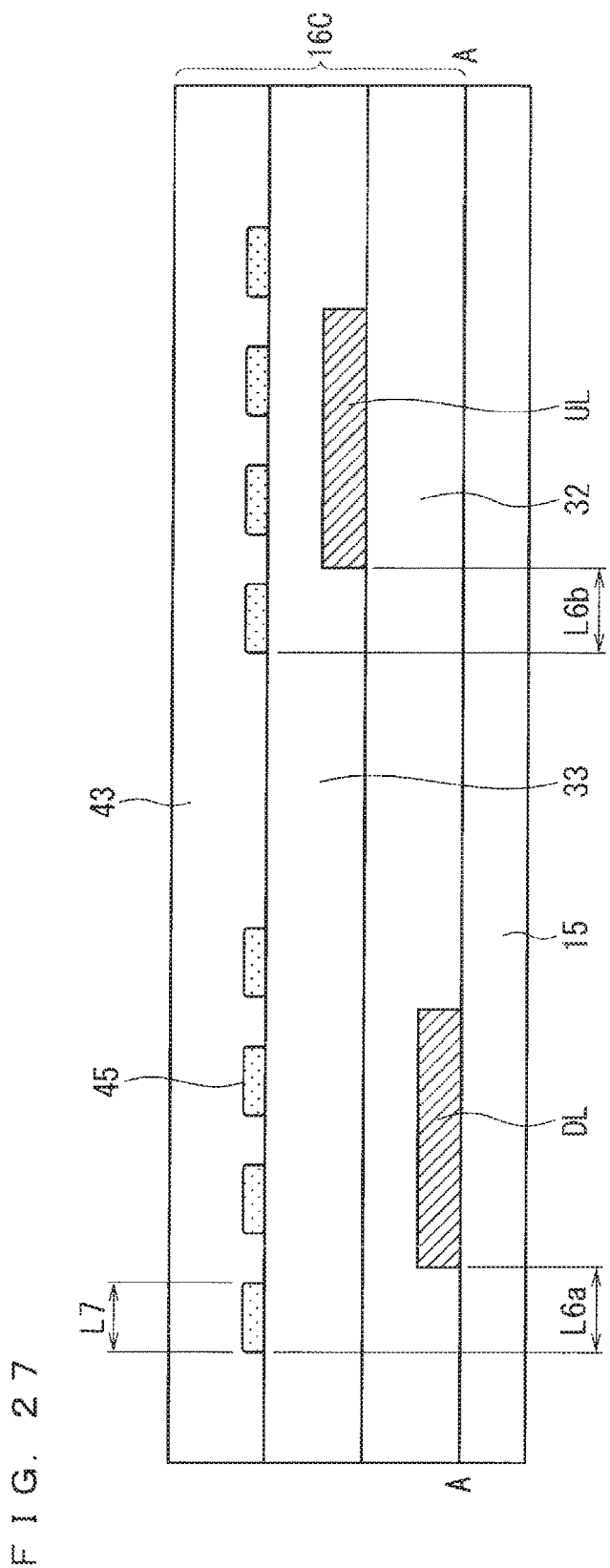
FIG. 27 is a cross-sectional view of the touch sensor pattern in the third preferred embodiment.

FIG. 26 is a top view of a touch sensor pattern 16C in a third preferred embodiment. FIG. 27 is a cross-sectional view of the touch sensor pattern 16C. The touch sensor pattern 16C includes conductive particulates 45 instead of the fine pattern 42 in the configuration of the touch sensor pattern 16A in the second preferred embodiment, and the other configurations are the same.

The conductive particulate 45 above the lower wiring DL being the first electrode wiring pattern has a long axis orthogonal to the extending direction of the lower wiring DL. The conductive particulate 45 above the upper wiring UL being the second electrode wiring pattern has a long axis orthogonal to the extending direction of the upper wiring UL. Thus, the conductive particulate 45 above the lower wiring DL functions as a polarizer (third polarizer) having a polarization axis parallel to the extending direction of the lower wiring DL while the conductive particulate 45 above the upper wiring UL functions as a polarizer (fourth polarizer) having a polarization axis parallel to the extending direction of the upper wiring UL.

The conductive particulates 45 are made of a silver compound, for example. The conductive particulates 45 preferably have a length L7 of 100 to 500 nm and a width W3 of less than or equal to ½ of the length L7 and less than or equal to 50 nm. The conductive particulates 45 are located in the arrangement region at a density of approximately 5 wt %. The conductive particulates 45 are located across the region, which is extended outward by only L6a from the end of the lower wiring DL and by only L6b from the end of the upper wiring UL. In addition, L6a and L6b may be set from the same viewpoint of L1 in the first preferred embodiment.

In the configuration described above similar to those in the first and second preferred embodiments, the conductive particulates 45 cancels out the change of the polarization axis due to the wiring pattern, so that the light leakage can be suppressed, and the contrast can increase.

The material for the conductive particulates 45 is assumed to be the silver compound in the description above, but a conductive material, such as copper, suitable for processing and formation may be selected instead. A conductive material having a high aspect ratio, such as conductive nanofibers, and quenching particles or quenching fibers having a high aspect ratio may be dispersed so as to have a long axis orthogonal to the extending direction of each wiring, similarly to the conductive particulates. Herein, "quenching" indicates inability to pass light in a direction perpendicular to a polarization axis (absorption and reflection due to oscillation of electrons). Further, a conductive polymer, a quenching polymer (for example, a dye polymer), and a quenching compound (for example, an iodine compound) that have a high aspect ratio may be selected.

A method for positioning a long axis of a polarizer in a direction orthogonal to an extending direction of a wiring pattern is described with reference to FIGS. 28 and 29. As shown in FIG. 28, a current passes through sensor wiring to generate a magnetic field orthogonal to the sensor wiring, and thus a long-axis direction of a material for a polarizer, such as a polymer having polarity, can be positioned in a direction orthogonal to the wiring. A region in the vicinity of the wiring in such a state is fixed, and the material for the polarizer in a region except for the vicinity of the wiring (outside a region indicated by a distance L8a and a distance L8b in FIG. 32A described below) is also removed, to thereby form a desirable polarizer pattern (a polarization functioning region). Further, control of the current controls a range affected by the magnetic field, and a region including the arrangement of the material for the polarizer having the polarity can be limited.

As shown in FIG. 29, in a case where a shrinkage by heat generated in the wiring portion is greater than a shrinkage by heat generated in the non-wiring portion, providing a heat cycle can position the long-axis direction of the material for the polarizer, such as particulates, gradually in the direction orthogonal to the wiring in the region having the great difference in shrinkage (at the edge of the wiring region). The region in such a state is fixed. A degree of alignment of particulates and a range of alignment of particulates from wiring can be adjusted by a difference between raising temperature and lowering temperature and the number of cycles. Although the material for the polarizer in the method shown in FIG. 28 is limited to the material having the polarity, the method shown in FIG. 29 does not have the limitation and allows the material for the polarizer to be selected from a wide variety of materials.

<C-2. Modifications>

Figure 30:
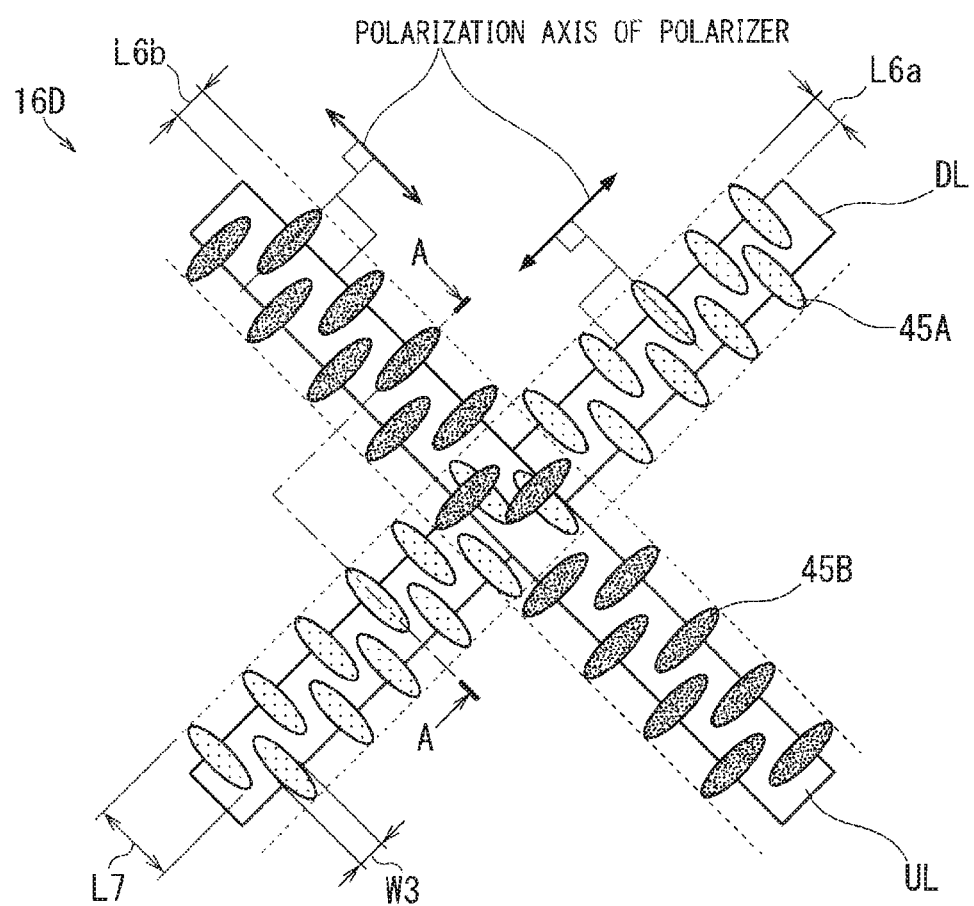
FIG. 30 is a top view of a touch sensor pattern in a first modification of the third preferred embodiment.
Figure 31:
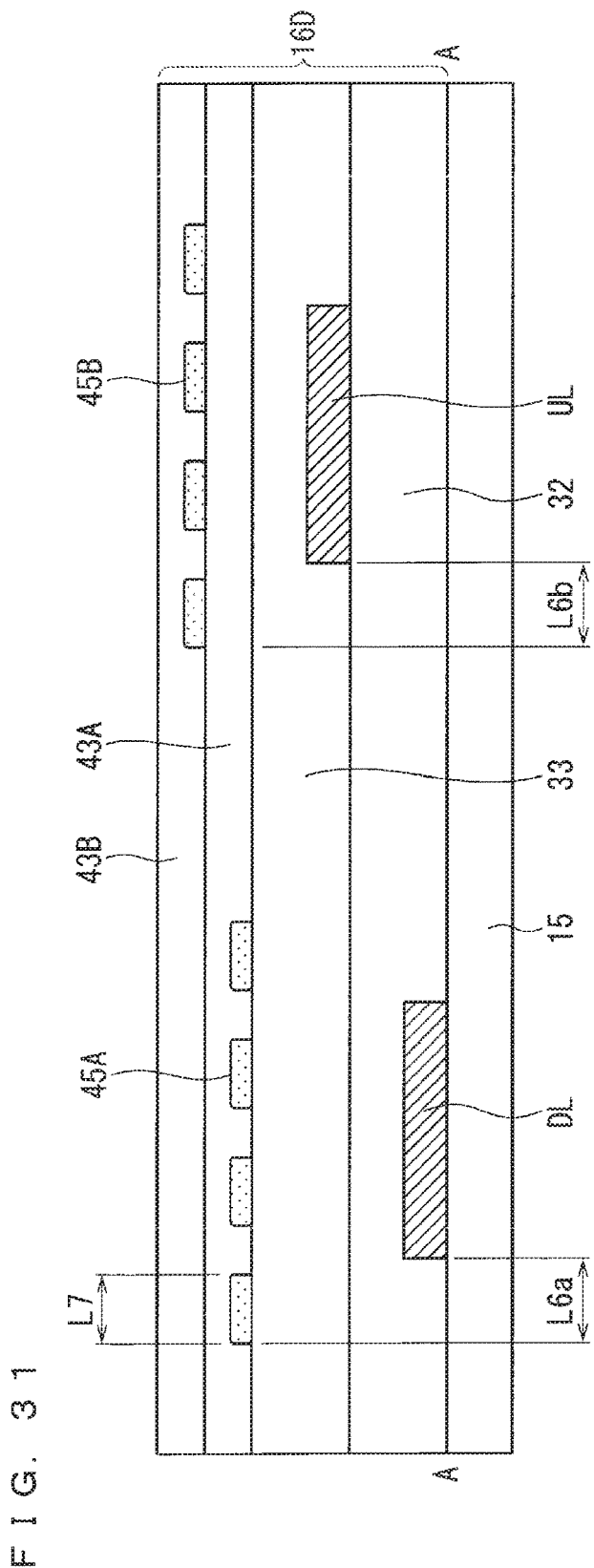
FIG. 31 is a cross-sectional view of the touch sensor pattern in the first modification of the third preferred embodiment.

FIG. 30 is a top view of a touch sensor pattern 16D in a first modification of the third preferred embodiment. FIG. 31 is a cross-sectional view taken along an A-A line in FIG. 30. In the touch sensor pattern 16C, the conductive particulates 45 in the region above the lower wiring DL and the conductive particulates 45 in the region above the upper wiring UL are located in the same layer. In contrast, the touch sensor pattern 16D includes conductive particulates separated in different layers with a protective film 43A having insulating properties therebetween.

As shown in FIG. 31, conductive particulates 45A are located on the protective insulating film 33 covering the upper wiring UL and are covered with the protective film 43A. Conductive particulates 45B are located on the protective film 43A and covered with a protective film 43B. The other configurations are the same as those of the touch sensor pattern 16C. Herein, the conductive particulates 45A and the conductive particulates 45B are respectively located below and above the protective film 43A, and their positions may be reversed.

Figure 32B:
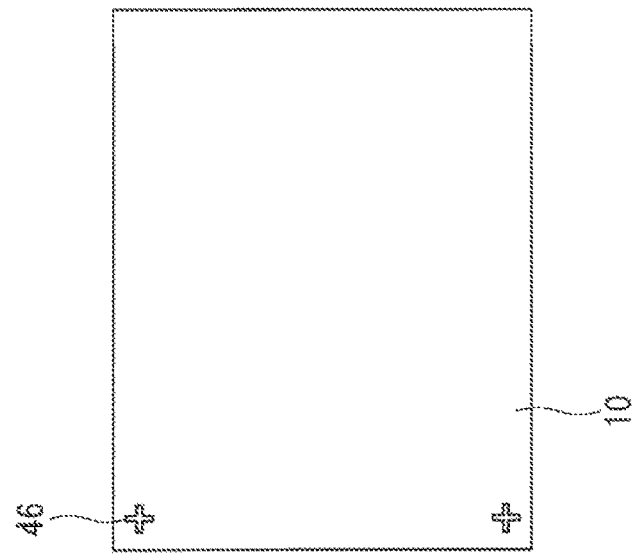
FIGS. 32A and 32B are block diagrams of a touch sensor pattern in a second modification of the third preferred embodiment.
Figure 32A:
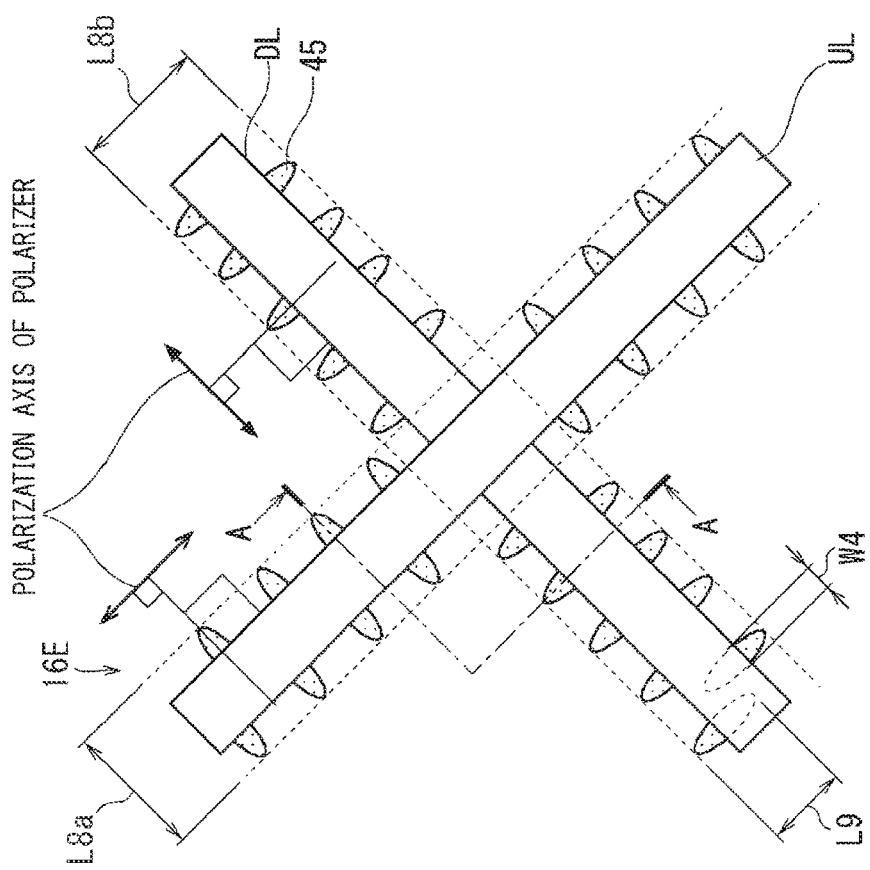
Figure 33:
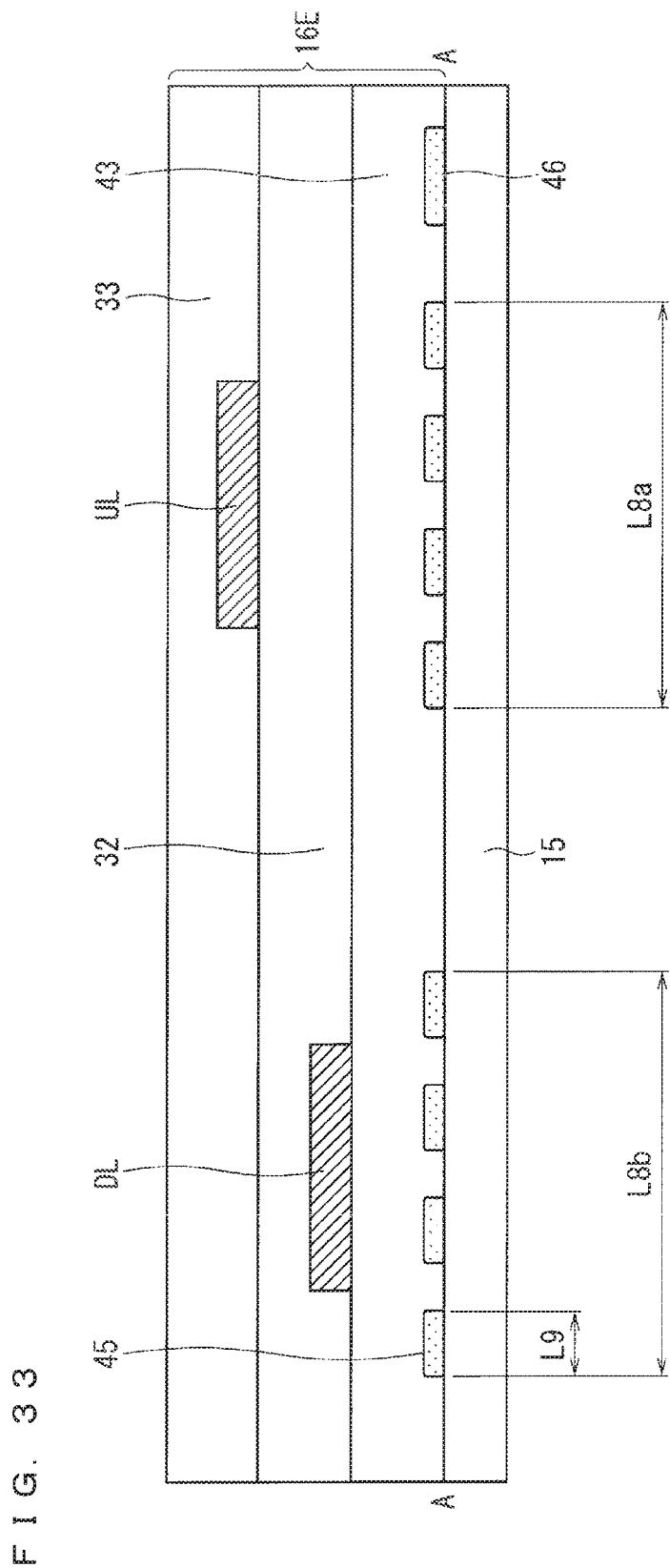
FIG. 33 is a cross-sectional view of the touch sensor pattern in the second modification of the third preferred embodiment.

FIGS. 32A and 32B are block diagrams of a touch sensor pattern 16E in a second modification of the third preferred embodiment. FIG. 32A is a top view of the touch sensor pattern 16E. FIG. 32B is a top view of the counter substrate 10. FIG. 33 is a cross-sectional view taken along an A-A line in FIG. 32A. The touch sensor pattern 16E includes the conductive particulates 45 located in a layer below the lower wiring DL. In other words, the conductive particulates 45 are located on the transparent substrate 15, and a mark 46 is located in the same layer as the conductive particulates 45. The conductive particulates 45 and the mark 46 are covered with the protective film 43 having the insulating properties. The lower wiring DI, is located on the protective film 43 with reference to the mark 46 and covered with the interlayer insulating film 32. The upper wiring UL is located on the interlayer insulating film 32 with reference to the mark 46 and covered with the protective insulating film 33.

A length L9 and a width W4 of the conductive particulate 45 in the second modification are set to be the same as the length L7 and the width W3 shown in FIG. 26. In other words, the conductive particulate 45 preferably has the length L9 of 100 to 500 nm and the width W4 of less than or equal to ½ of the length L7 and less than or equal to 50 nm. A distance L8a from an end portion of a conductive particulate 45 protruding from one side of the upper wiring UL to an end portion of another conductive particulate 45 protruding from the other side of the upper wiring UL may be an area that L2 described in the first preferred embodiment is added to both sides of the wiring width of the upper wiring UL. A distance L8b from an end portion of a conductive particulate 45 protruding from one side of the lower wiring DL to an end portion of another conductive particulate 45 protruding from the other side of the lower wiring DL may be an area that L2 described in the first preferred embodiment is added to both sides of the wiring width of the lower wiring DL.

Figure 34B:
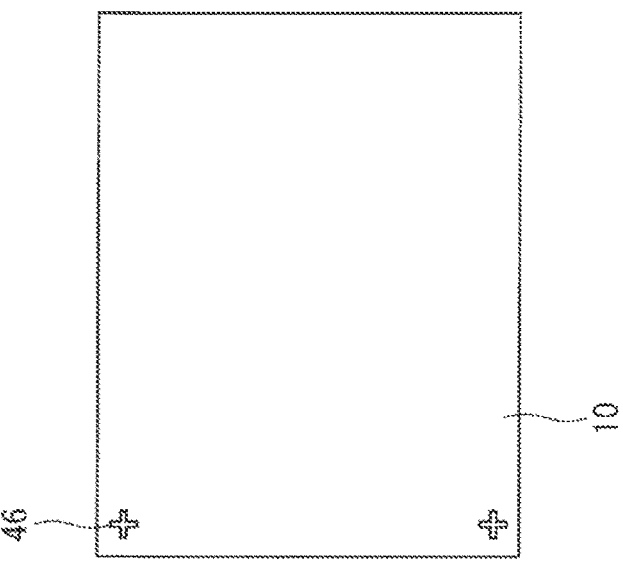
FIGS. 34A and 34B are block diagrams of a touch sensor pattern in a third modification of the third preferred embodiment.
Figure 34A:
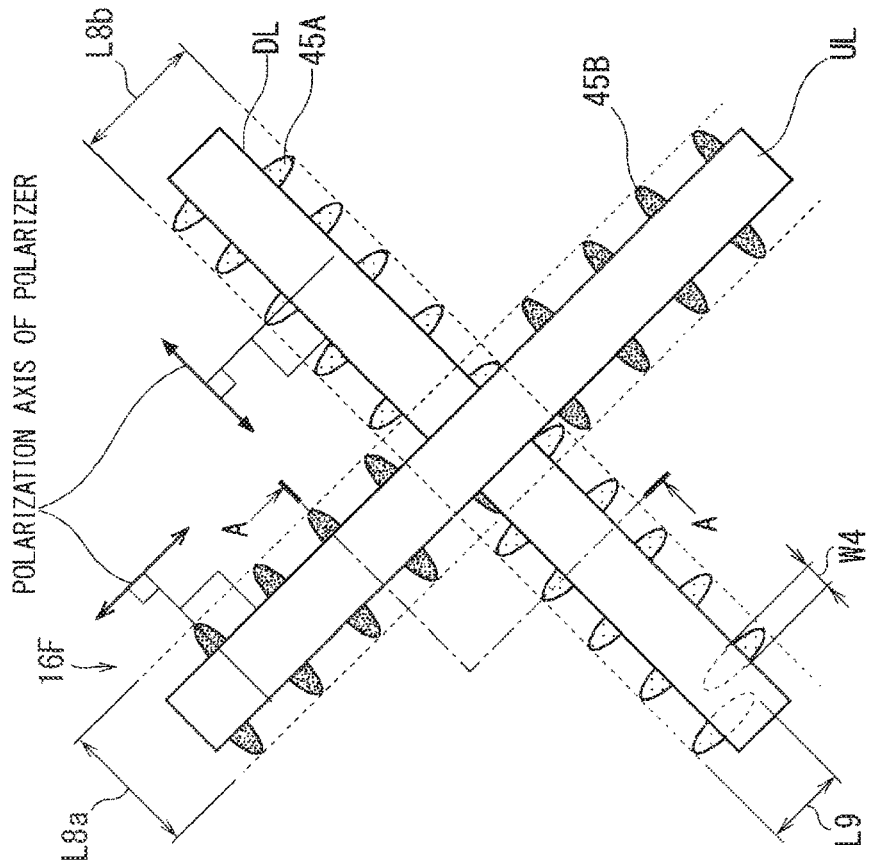
Figure 35:
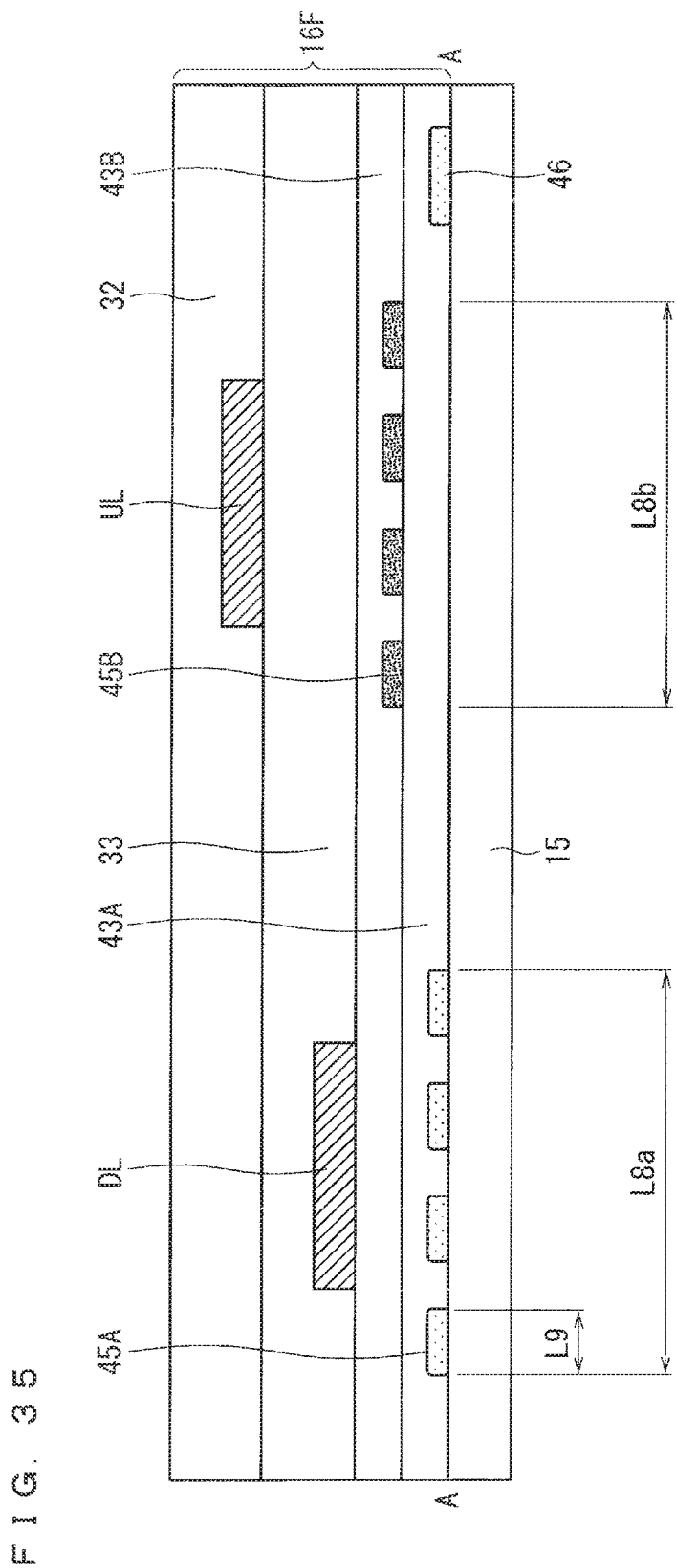
FIG. 35 is a cross-sectional view of the touch sensor pattern in the third modification of the third preferred embodiment.

FIGS. 34A and 34B are block diagrams of a touch sensor pattern 16F in a third modification of the third preferred embodiment. FIG. 34A is a top view of the touch sensor pattern 16F. FIG. 34B is a top view of the counter substrate 10. FIG. 35 is a cross-sectional view taken along an A-A line in FIG. 34A. The touch sensor pattern 16F similar to the touch sensor pattern 16E includes the conductive particulates 45 in the layer below the lower wiring DL. However, the difference is that the conductive particulates 45A in the region below the lower wiring DL and the conductive particulates 45B in the region below the upper wiring UL are separated in different layers with the protective film 43A therebetween. In other words, the conductive particulates 45A are located on the transparent substrate 15, and the mark 46 is located in the same layer as the conductive particulates 45A. The conductive particulates 45A and the mark 46 are covered with the protective film 43A, and the conductive particulates 45B are located on the protective film 43A with reference to the mark 46. The conductive particulates 45B are covered with the protective film 43B having the insulating properties. The configuration above the protective film 43B is the same as that of the touch sensor pattern 16E. Herein, the conductive particulates 45A are located in the layer below the conductive particulates 45B, and their positions may be reversed.

The third modification of the first preferred embodiment is also applicable to the third preferred embodiment and the modifications thereof. In other words, the direction of the polarization axis is changed so as to be parallel to the polarization axis of the polarizing film 17 of the counter substrate 10 from the region of the wiring pattern toward the end of the formation region of the polarizer.

Figure 36:
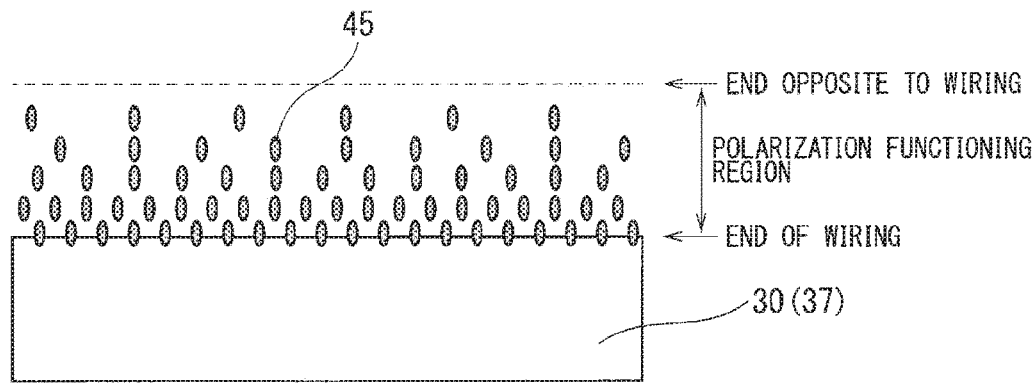
FIGS. 36 to 38 are top views of wiring patterns of the touch sensor pattern.
Figure 37:
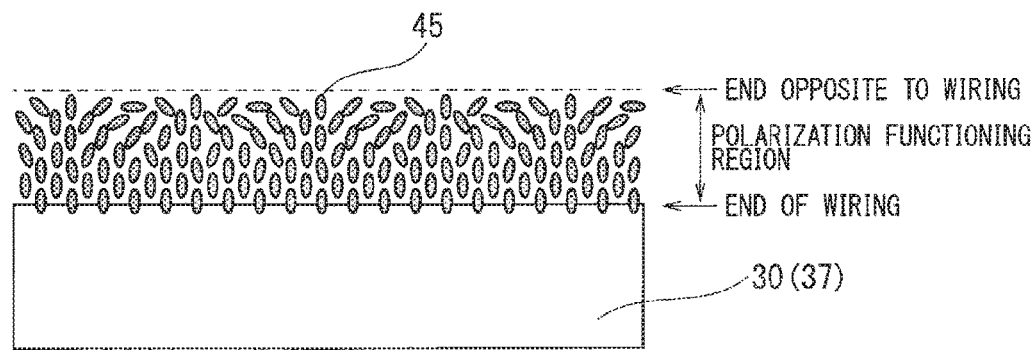
Figure 38:
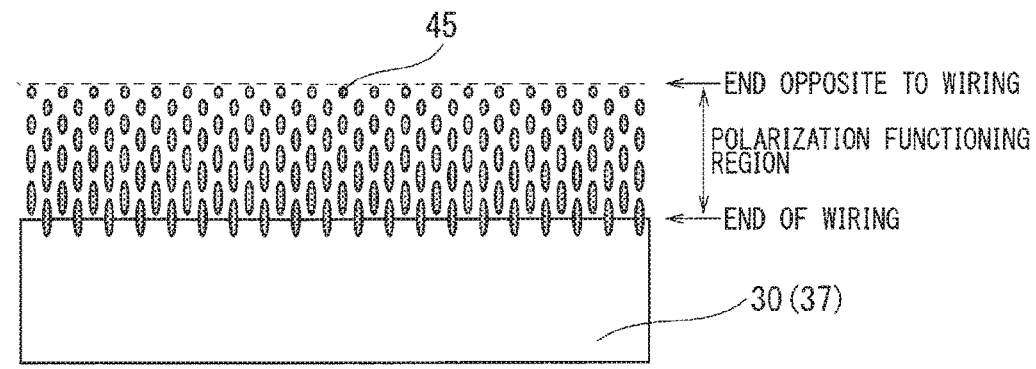

Furthermore, a degree of polarization may be changed instead of the polarization axis, that is to say, transmittances in the direction of the polarization axis and the direction orthogonal to the polarization axis may be changed. A method for changing a transmittance is described with reference to FIGS. 36 to 38. FIGS. 36 to 38 are top views of wiring patterns of the touch sensor pattern, and show that materials for polarizers for forming a polarization functioning region are located side by side in an edge portion of the wiring pattern.

As the method for changing a transmittance, in a polarization functioning region in which the conductive particulates 45 function as polarizers, a density of arrangement of the conductive particulates 45 may decrease from an end portion of the upper wiring UL (lower wiring DL) toward an end portion of the polarization functioning region opposite to the wiring (FIG. 36). Alternatively, a degree of arrangement of the conductive particulates 45 may decrease from the end portion of the upper wiring UL (lower wiring DL) toward the end portion of the polarization functioning region opposite to the wiring (FIG. 37). Alternatively, an aspect ratio of the conductive particulates 45 may decrease to 1 from the end portion of the upper wiring UL (lower wiring DL) toward the end portion of the polarization functioning region opposite to the wiring (FIG. 38), and another method may be used. A "high degree of arrangement" represents a high proportion of the conductive particulates 45 facing the same direction. A "low degree of arrangement" represents a high proportion of the conductive particulates 45 facing different directions. In FIG. 36, the end portion of the polarization functioning region opposite to the wiring is referred to as an end opposite to wiring.

The fourth modification of the first preferred embodiment is also applicable to the configurations of the second and third modifications of this preferred embodiment. In other words, the polarization axis of the polarizer being the conductive particulate 45 may be parallel to the polarization axis of the polarizing film 17 of the counter substrate 10.

<C-3. Effects>

In the display apparatus according to the third preferred embodiment of the present invention, the density of arrangement of the conductive particulates, which are located at least in the preceding stage or the subsequent stage of the first electrode wiring pattern and have the high aspect ratio, at the edge of the first electrode wiring pattern may be higher than the density of arrangement of the conductive particulates in the region where the conductive particulates do not overlap the first electrode wiring pattern. This configuration can suppress the decrease in intensity of black in the wide region near the wiring, and also have the processing margin due to the elimination of the need to limit the upper limit on the arrangement distance from the conductive particulates having the high aspect ratio to the first electrode wiring pattern.

The degree of alignment of the long axes of the conductive particulates, which are located at least in the preceding stage or the subsequent stage of the first electrode wiring pattern and have the high aspect ratio, at the edge of the first electrode wiring pattern may be higher than the degree of alignment of the long axes of the conductive particulates in the region where the conductive particulates do not overlap the first electrode wiring pattern. This configuration can suppress the decrease in intensity of black in the wide region near the wiring, and also have the processing margin due to the elimination of the need to limit the upper limit on the arrangement distance from the conductive particulates having the high aspect ratio to the first electrode wiring pattern.

At least the first insulating substrate or the second insulating substrate includes: the upper wiring UL (second electrode wiring pattern) located in the subsequent stage of the lower wiring DL (first electrode wiring pattern) in the light path; and the conductive particulate 45 (fourth polarizer) that is located in the preceding stage or the subsequent stage of the second electrode wiring pattern and is opposed to the second electrode wiring pattern with the transparent insulating film therebetween. At least the fourth polarizer located in the subsequent stage of the second electrode wiring pattern has the polarization axis parallel to the extending direction of the edge of the second electrode wiring pattern. Therefore, the fourth polarizer cancels out the change of the polarization axis due to the second electrode wiring pattern. Thus, the decrease in contrast can be suppressed.

The conductive particulate 45 (fourth polarizer) has the polarization axis parallel to the polarization axis of the second polarizer at the tip toward the side where the second electrode wiring pattern is not located, and thus the protruding amount of the fourth polarizer from the second electrode wiring pattern may be greater than or equal to a dimension with consideration given to the overlapping precision. This configuration eliminates the need to limit the upper limit on the protrusion amount, thereby having the processing margin.

At least the conductive particulate 45 (fourth polarizer) located in the subsequent stage of the second electrode wiring pattern has the long axis in the direction substantially perpendicular to the extending direction of the edge of the second electrode wiring pattern, and has the plurality of isolated patterns that overlap the edge and that do not allow the visible light beam to pass therethrough. Therefore, the isolated patterns cancel out the change of the polarization axis due to the wiring pattern. Thus, the light leakage can be suppressed, and the contrast can increase.

The isolated patterns each have the average pitch length of less than or equal to 266 nm in the short-axis direction, allowing for the stable polarization function in the visible range of light.

<D. Fourth Preferred Embodiment>

Figure 39:
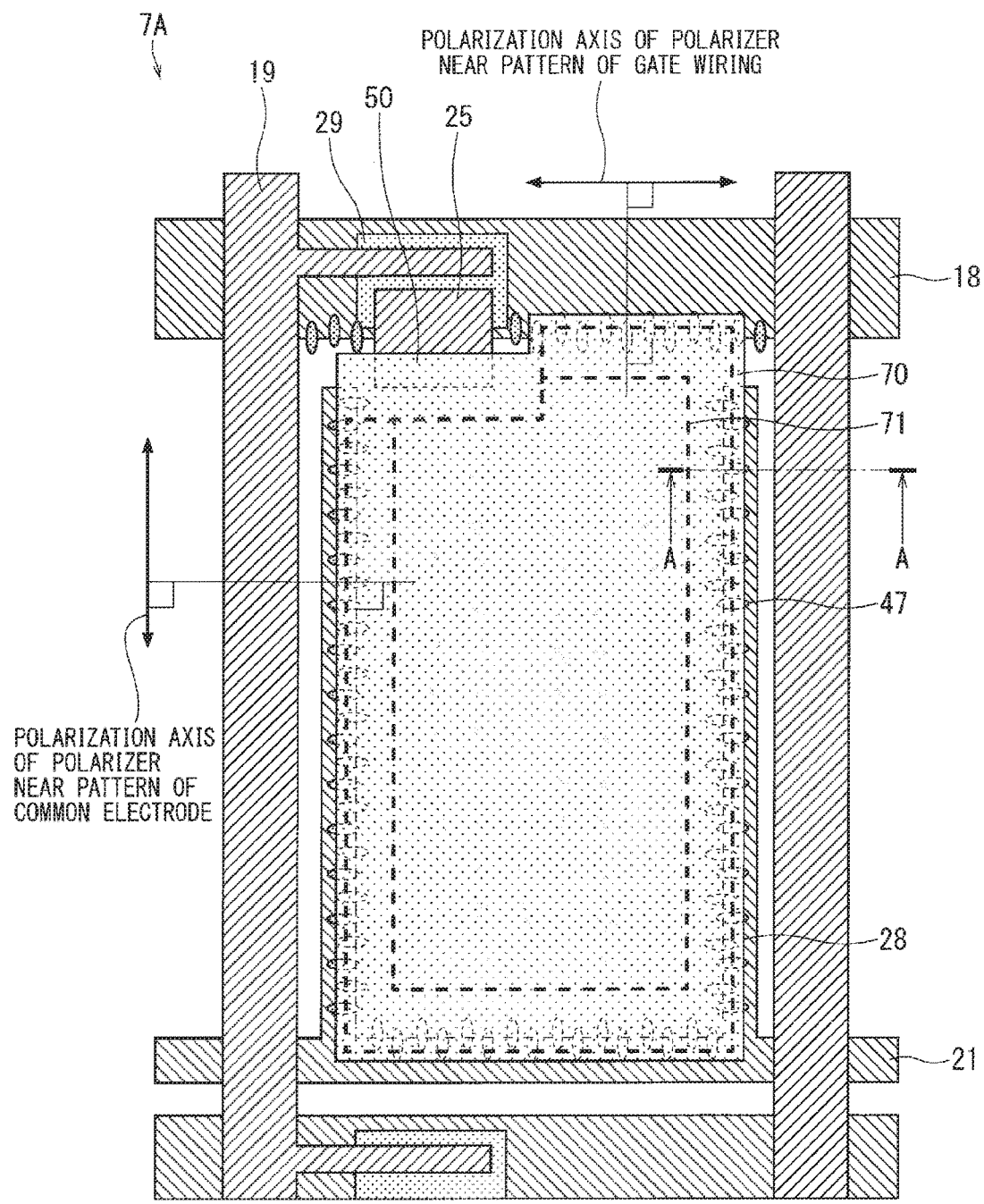
FIG. 39 is a top view showing a pixel array substrate in a fourth preferred embodiment.
Figure 40:
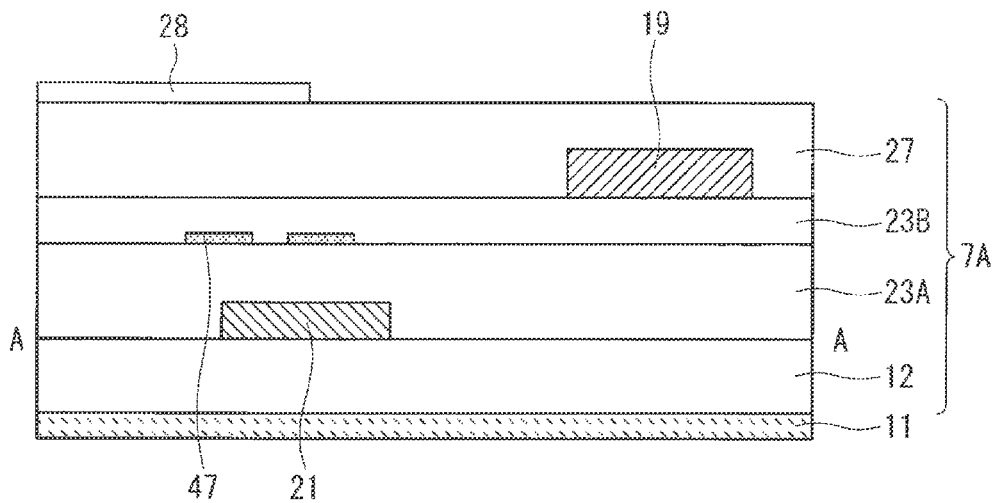
FIG. 40 is a cross-sectional view showing the pixel array substrate in the fourth preferred embodiment.

FIG. 39 is a top view showing a pixel array substrate 7A in a fourth preferred embodiment. FIG. 40 is a cross-sectional view taken along an A-A line in FIG. 39. The first to third preferred embodiments show the measures against the decrease in contrast by the wiring pattern of the touch panel layer in an on-cell PCAP LCD module. However, the phenomenon in which a polarization axis is projected onto another axis due to array wiring similarly occurs in pixel array substrates. As the measure against the phenomenon, it is normally conceivable that a region for a BM located in a color filter pattern is expanded, but, as a result, an aperture ratio decreases more than necessary. An opening of the BM in this case is indicated by a broken line 71 in FIG. 39. In the fourth preferred embodiment, instead of the measures against the BM, the same structure as the polarizer for the wiring pattern of the touch panel layer described in the first to third preferred embodiment is also used on the pixel array substrate side. Thus, a decrease in contrast is suppressed while the opening of the BM is expanded. The opening of the BM in the fourth preferred embodiment is indicated by a broken line 70 in FIG. 39.

<D-1. Configuration>

The pixel array substrate 7A is a TN mode. A transparent substrate 12 is located on a polarizing film 11. A pixel array pattern 13A is located on the transparent substrate 12.

The pixel array pattern 13A includes common wiring (electrode) 21 and gate wiring (electrode) 18 being a first electrode wiring pattern that are located on the transparent substrate 12. The common wiring (electrode) 21 and the gate wiring (electrode) 18 are covered with a gate insulating film 23A. A polarizer 47 (third polarizer) having a polarization axis parallel to an extending direction of each pattern is located in a region, which includes edges of the patterns of at least the gate wiring (electrode) 18 and the common electrode 21 facing an opening of a pixel, on the gate insulating film 23A. The polarizer 47 is covered with a gate insulating film 23B. A structure of a layer above the gate insulating film 23B has a vertical configuration similar to configurations of a normal TN pixel array. In other words, the gate insulating film 23B covers the polarizer 47, and source wiring 19 is located on the gate insulating film 23B. The source wiring 19 is covered with an interlayer insulating film 27, and a pixel electrode 28 is located on the interlayer insulating film 27.

It is sufficient that the polarizer 47 includes the isolated patterns made of the fine pattern described in the second preferred embodiment, conductive particulates, a conductive material having a high aspect ratio, such as conductive nanofibers, quenching particles having a high aspect ratio, quenching fibers having an aspect ratio, a conductive polymer having a high aspect ratio, a quenching polymer (for example, a dye polymer) having a high aspect ratio, or a quenching compound (for example, an iodine compound) having a high aspect ratio.

For the pixel array substrate of the TN mode, the gate wiring (electrode) 18 and the common wiring (electrode) 21 define most of the outline of the opening of the pixel. Therefore, the polarizer 47 can block the influence of the projection of the polarization axis onto another axis at the pattern edge facing the opening of the pixel in the gate wiring layer as described above. Consequently, the light shielding region by the BM is reduced to increase an aperture ratio, and power consumption can be reduced. The aperture ratio can be further increased by locating the polarizer 47 also below an edge portion of a drain electrode 25 located in the same layer as the source wiring 19.

<D-2. Modifications>

Figure 41:
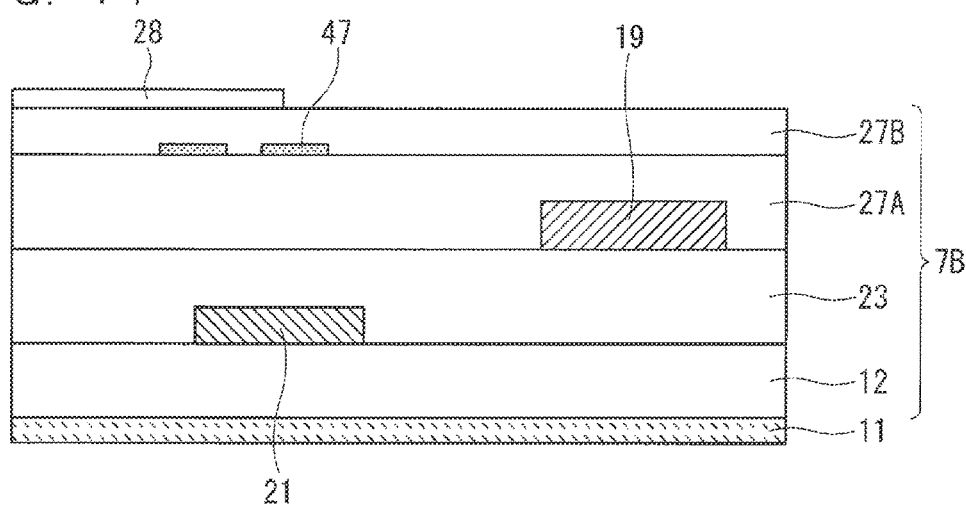
FIG. 41 is a cross-sectional view of a pixel array substrate according to a first modification of the fourth preferred embodiment.

FIG. 41 is a cross-sectional view of a pixel array substrate 7B according to a first modification of the fourth preferred embodiment in the same section as FIG. 40. The pixel array substrate 7A includes the polarizer 47 located in the layer between the common electrode 21 and the source wiring 19. In contrast, the pixel array substrate 7B includes the polarizer 47 in a layer above the source wiring 19. The pixel array substrate 7B includes the common electrode 21 covered with a gate insulating film 23 on which the source wiring 19 is located. The source wiring 19 is covered with an interlayer insulating film 27A on which the polarizer 47 is located. The polarizer 47 is covered with an interlayer insulating film 27B. The pixel electrode 28 is located on the interlayer insulating film 27B.

Figure 42:
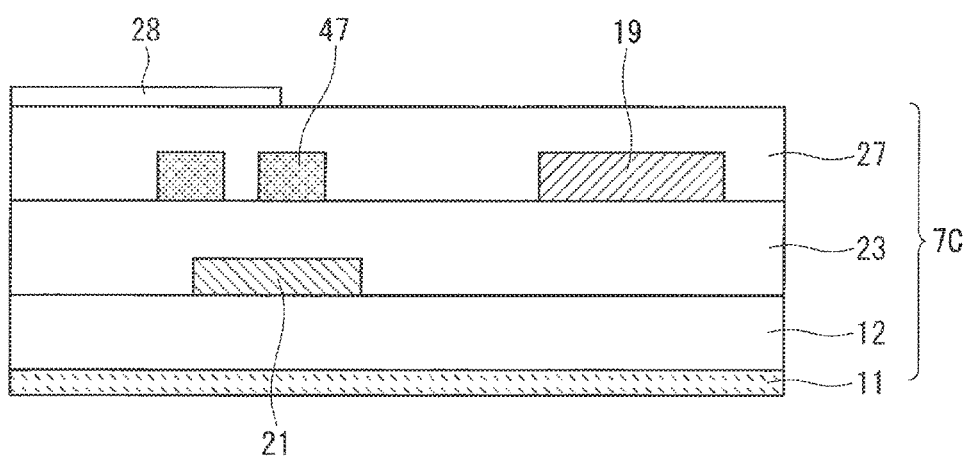
FIG. 42 is a cross-sectional view of a pixel array substrate according to a second modification of the fourth preferred embodiment.

FIG. 42 is a cross-sectional view of a pixel array substrate 7C according to a second modification of the fourth preferred embodiment in the same section as FIG. 40. The pixel array substrate 7C includes the polarizer 47 as a fine pattern that is made of the same material for the source wiring 19 and is located in the same layer as the source wiring 19. In other words, the pixel array substrate 7C includes the source wiring 19 and the polarizer 47 located above the common wiring 21. The interlayer insulating film 27 is located on the source wiring 19 and the polarizer 47. The pixel electrode 28 is located on the interlayer insulating film 27. The second modification preferably uses a processing method that increases patterning precision in a step of forming the source wiring 19.

Figure 43:
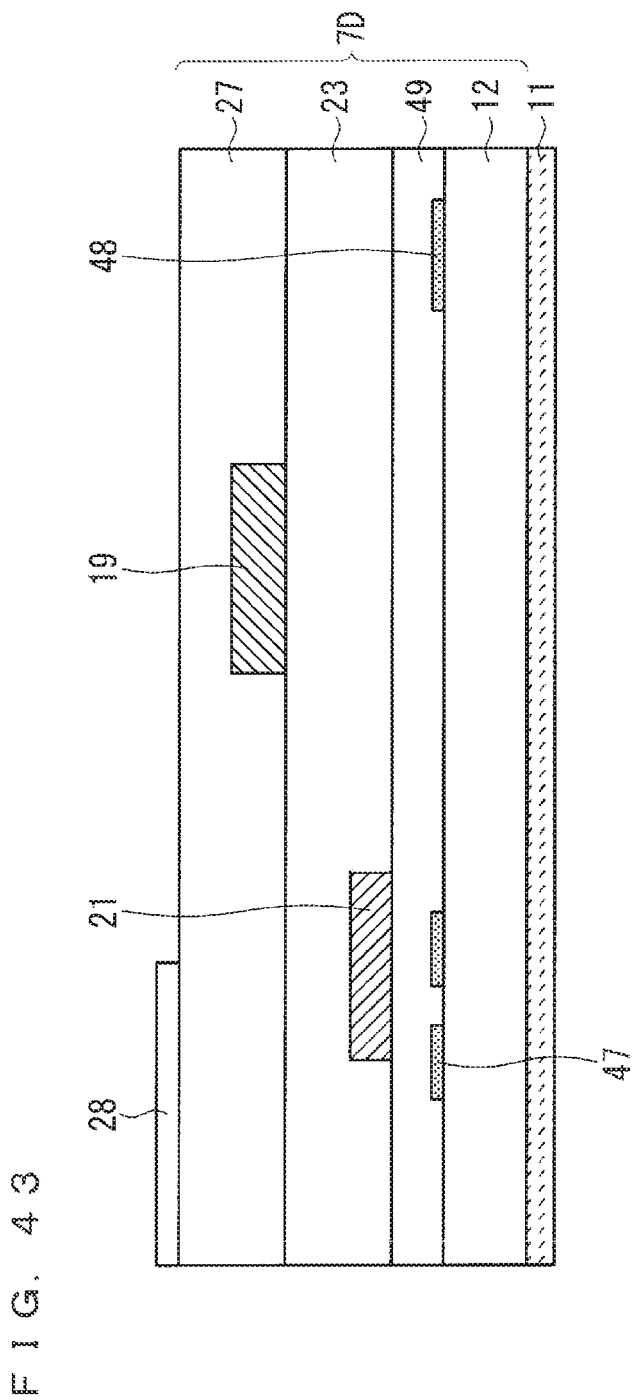
FIG. 43 is a cross-sectional view of a pixel array substrate according to a third modification of the fourth preferred embodiment.

FIG. 43 is a cross-sectional view of a pixel array substrate 7D according to a third modification of the fourth preferred embodiment in the same section as FIG. 40. The pixel array substrate 7D includes the polarizer 47 in the layer below the common electrode 21. In other words, the polarizer 47 and a mark 48 are previously located in the region, which defines the outline of the opening of the pixel, on the transparent substrate 12. The polarizer 47 and the mark 48 are covered with a protective film 49. The configuration subsequent to the gate wiring 18 and the common electrode 21 is located on the protective film 49 with reference to the mark 48.

Figure 44:
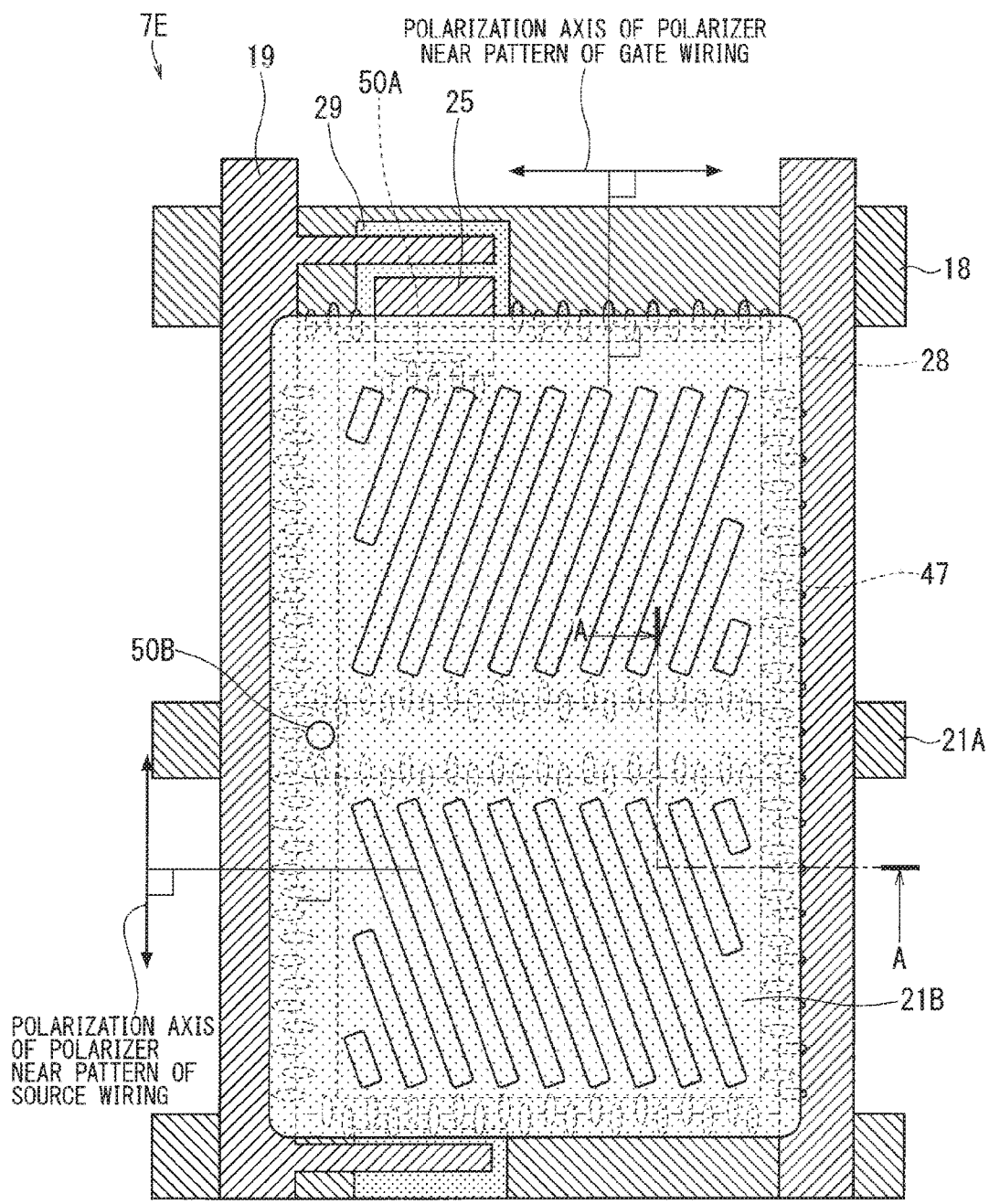
FIG. 44 is a top view of a pixel array substrate according to a fourth modification of the fourth preferred embodiment.
Figure 45:
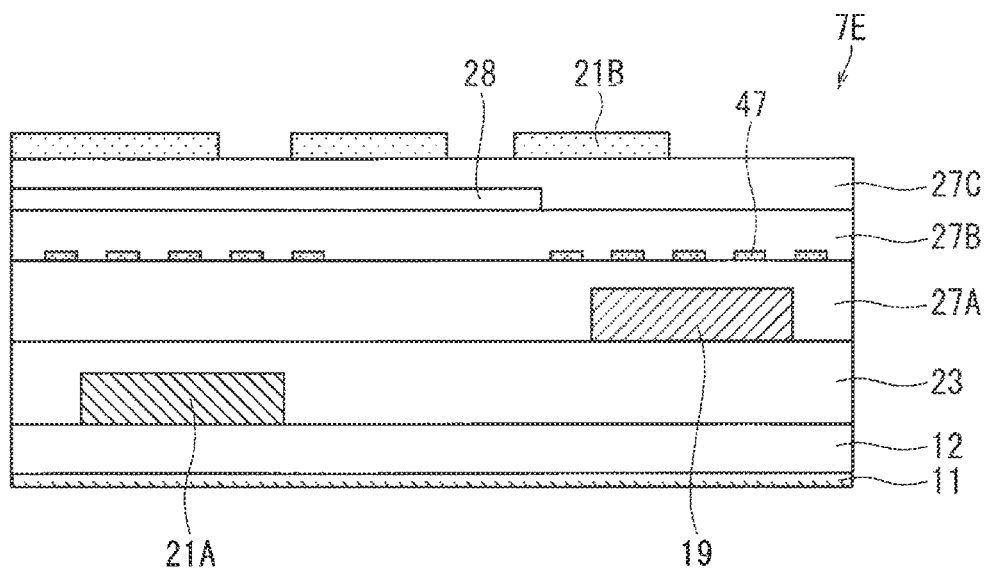
FIG. 45 is a cross-sectional view of a pixel array substrate according to the fourth modification of the fourth preferred embodiment.

The pixel array substrates 7A to 7D described in the fourth preferred embodiment are the pixel array substrates of the TN mode, and the present invention is also applicable to pixel array substrates of an IPS mode or an FFS mode. FIG. 44 is a top view of a pixel array substrate 7E according to a fourth modification of the fourth preferred embodiment. FIG. 45 is a cross-sectional view taken along an A-A line in FIG. 44. The pixel array substrate 7E is the pixel array substrate of the FFS mode. It is shown that the pixel array substrate 7E includes the pixel electrode 28 as a lower layer and a common electrode 21B as an upper layer.

The pixel array substrate 7E includes common wiring 21A located on the transparent substrate 12. The common wiring 21A is covered with the gate insulating film 23. The source wiring 19 is located on the gate insulating film 23 and covered with the interlayer insulating film 27A. Up to this point, the structure is the same as the pixel array substrate of the normal FFS mode. The polarizer 47 having the polarization axis parallel to the extending direction of the pattern is located in a region, which includes edges of the patterns of at least gate wiring (electrode) 18, the common wiring 21A, and the source wiring 19 defining the outline of the opening of the pixel, on the gate insulating film 27A. The polarizer 47 is covered with the interlayer insulating film 27B. The pixel electrode 28 is located on the interlayer insulating film 27B and covered with an interlayer insulating film 27C. A common electrode 21B is located on the interlayer insulating film 27C. A contact hole 50A penetrates the interlayer insulating films 27A, 27B and reaches the drain electrode 25. The pixel electrode 28 electrically connected to the drain electrode 25 through the contact hole 50A is located on the interlayer insulating film 27B. A contact hole 50B penetrates the interlayer insulating films 27A, 27B, 27C and the gate insulating film 23 and reaches the common wiring 21A. The common electrode 21B has slits and is electrically connected to the common wiring 21A through the contact hole 50B. The common electrode 21B may be located below the interlayer insulating film 27C, and the pixel electrode 28 having the slits may be located above the interlayer insulating film 27C.

For the pixel array substrate of the FFS (IPS) mode, the gate wiring (electrode) 22, the common wiring 21, and the source wiring 19 define most of the outline of the opening of the pixel. Therefore, the polarizer 47 can block the influence of the projection of the polarization axis onto another axis at the pattern edge facing the opening of the pixel in the gate wring layer and the source wiring layer.

Consequently, the light shielding region by the BM is reduced to increase an aperture ratio, and power consumption can be reduced.

Figure 46:
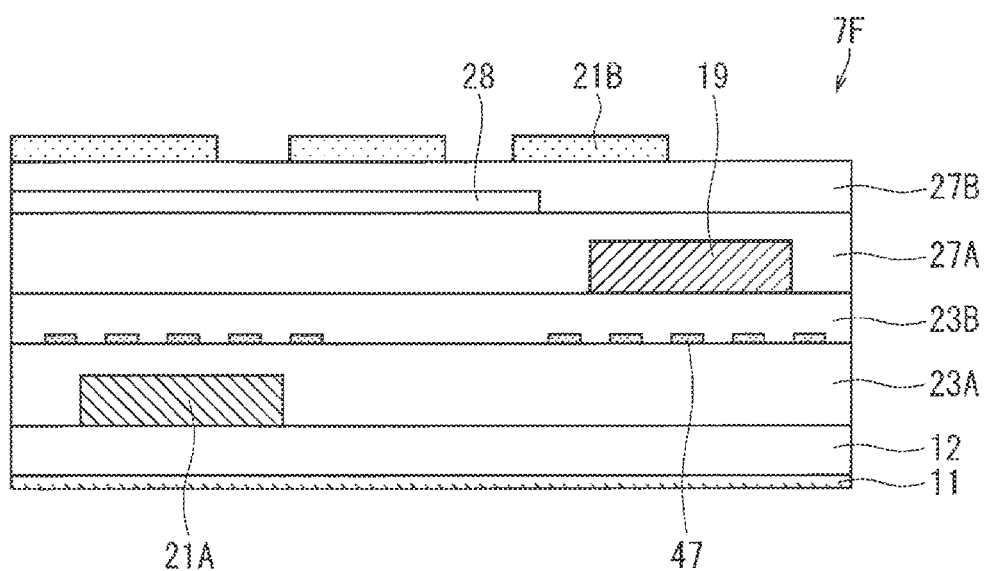
FIG. 46 is a cross-sectional view of a pixel array substrate according to a fifth modification of the fourth preferred embodiment.

Fifth to seventh modifications described below are conceivable for the arrangement of the polarizer 47 in the pixel array substrate 7E. FIG. 46 is a cross-sectional view of a pixel array substrate 7F according to a fifth modification of the fourth preferred embodiment. The pixel array substrate 7F includes the gate insulating film 23A and the gate insulating film 23B in two layers, and the polarizer 47 is located in the layer on the gate insulating film 23A. The polarizer 47 is covered with the gate insulating film 23B. The other configurations are the same as those of the pixel array substrate 7E.

FIG. 47 is a cross-sectional view of a pixel array substrate 7G according to a sixth modification of the fourth preferred embodiment. In the sixth modification, the polarizer has the fine pattern, and the polarizer is made of the same material for the source wiring 19 and the common wiring 21A and located in the same layer as the source wiring 19 and the common wiring 21A. A polarizer 47A made of the same material for the common wiring 21A is located in the same layer as the common wiring 21A. A polarizer 47B made of the same material for the source wiring 19 is located in the same layer as the source wiring 19. The sixth modification preferably uses a processing method that increases patterning precision in steps of forming the gate wiring 18 and forming the source wiring 19. The other configurations are the same as those of the pixel array substrate 7E.

FIG. 48 is a cross-sectional view of a pixel array substrate 7H according to a seventh modification of the fourth preferred embodiment. In the seventh modification, the polarizer 47 is located in the layer below the common wiring 21A. In other words, the polarizer 47 is previously located in the region, which defines the outline of the opening of the pixel, on the transparent substrate 12 while the mark 48 is located. The protective film 49 covering the polarizer 47 and the mark 48 is located, and the configuration subsequent to the gate wiring is located on the protective film 49 with reference to the mark 48.

<D-3. Effects>

The display apparatus according to the fourth preferred embodiment includes the liquid crystal layer 8 sealed between the pixel array substrate 7 (first insulating substrate) and the counter substrate 10 (second insulating substrate). The first insulating substrate includes the pixel array pattern 13 (pixel array layer) located on the transparent substrate 12. The pixel array pattern 13 includes the first electrode wiring pattern and the polarizer 47 (third polarizer). Therefore, the polarizer 47 can cancel out the change of the polarization axis due to the first electrode wiring pattern. Thus, the light leakage can be suppressed, and the contrast can increase.

The pixel array pattern 13 (pixel array layer) includes: the plurality of gate wires 18; the plurality of source wires 19 orthogonal to the gate wires 18; the pixel electrode 28 located in the opening of the pixel that is the region divided by the gate wires 18 and the source wires 19 intersecting each other; and the common electrode wire 21 opposed to the pixel electrode 28 with the interlayer insulating film 27 therebetween. The first electrode wiring pattern is at least any one of the gate wire 18, the source wire 19, and the common electrode wire 21. Therefore, the polarizer 47 can cancel out the change of the polarization axis due to the first electrode wiring pattern. Thus, the light leakage can be suppressed, and the contrast can increase.

<E. Fifth Preferred Embodiment>
<E-1. Configuration>

FIG. 49 is a cross-sectional view showing a configuration of a display apparatus 102 according to a fifth preferred embodiment. The display apparatus 102 includes an on-cell projected capacitive (PCAP) LCD module. The display apparatus 102 eliminates the polarizing film 11 in the layer below the transparent substrate 12 from the pixel array substrate 7 of the configuration of the display apparatus 101 in the first preferred embodiment, and includes a pixel array pattern 13A having a polarization function instead of the pixel array pattern 13. The other configurations of the display apparatus 102 are the same as those of the display apparatus 101.

A polarizer (first polarizer) is located at least in an opening of a pixel in the pixel array pattern 13A. An alignment processing is performed on an alignment film located on an upper surface of the pixel array pattern 13A with reference to a mark indicating a polarization axis of the polarizer or a mark indicating a cross relationship with the polarization axis.

The configuration of the counter substrate 10 described in the first to third preferred embodiments is used, and the polarizer preferably eliminates the influence of the projection of the polarization axis onto another axis at the edge of the sensor wiring in the touch panel layer. In other words, the fine pattern and the conductive particulates are located to form the third polarizer. In this case, the polarization axes of the first polarizer and the second polarizer are parallel or perpendicular to each other according to a liquid crystal driving mode.

Figure 50:
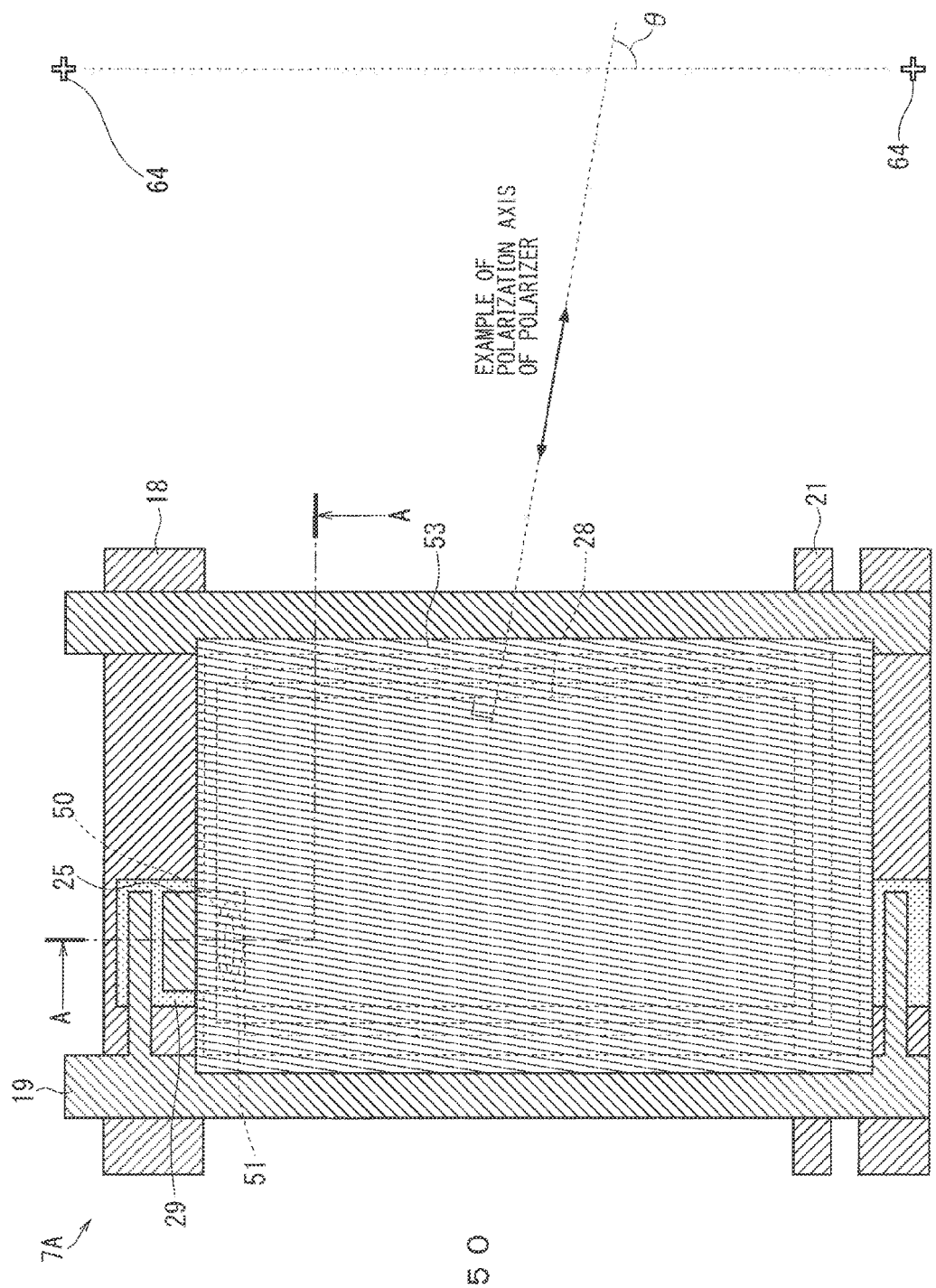
FIG. 50 is a top view showing a pixel array substrate according to the fifth preferred embodiment.
Figure 51:
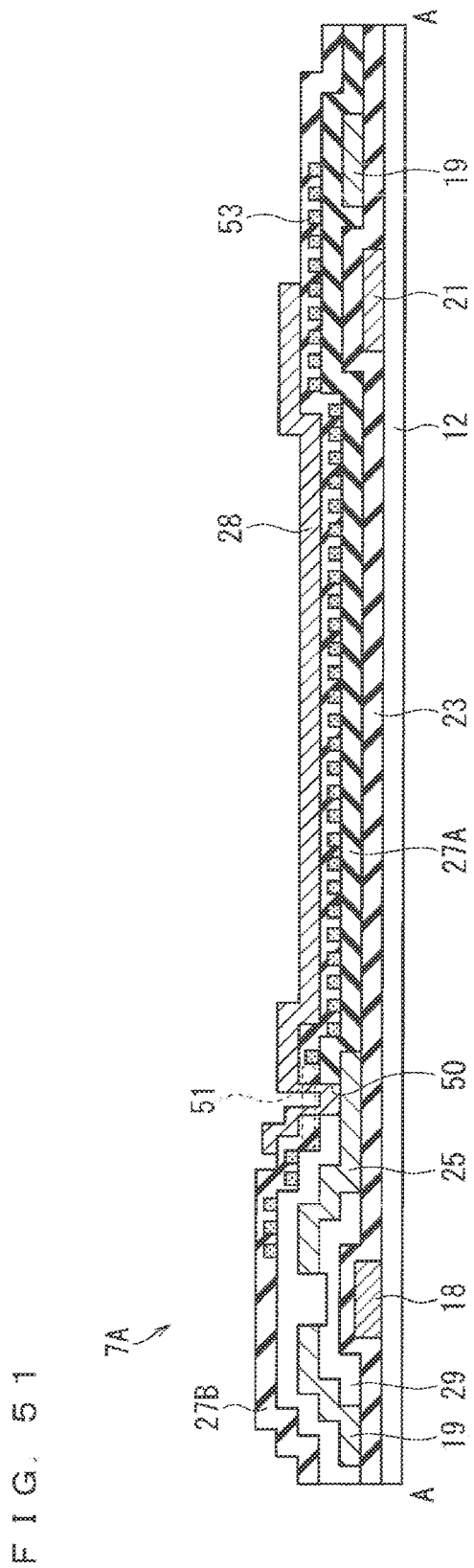

FIG. 50 is a top view showing a pixel array substrate 7A according to the fifth preferred embodiment. FIG. 51 is a cross-sectional view taken along an A-A line in FIG. 50. The pixel array substrate 7A is the TN mode. A pixel array extending to the source wiring 19 is covered with the interlayer insulating film 27A. A pattern of fine wiring 53 having electrical conductivity is located on the interlayer insulating film 27A, to thereby form the first polarizer. The fine wiring 53 extends in the direction orthogonal to the polarization axis in plan view in 150 nm line-and-space (L/S) pattern, for example. The pattern of the fine wiring 53 has a border on the gate wiring 18 and the source wiring 19A and is electrically connected to adjacent fine wiring 53. The pattern of the fine wiring 53 has an opening (hole 51) on the drain electrode 25. The polarizer formed by the pattern of the fine wiring 53 is covered with the interlayer insulating film 27B. A contact hole 50 that penetrates the interlayer insulating films 27A, 27B and reaches the drain electrode 25 is located in the hole 51. The pixel electrode 28 that is electrically connected to the drain electrode 25 through the contact hole 50 is located in a layer on the interlayer insulating film 27B.

The structure described above allows the entry of the polarized light, which is not affected by the projection of the axis polarized by the gate wiring 18 and the source wiring 19 of the pixel array substrate 7A onto another axis, into the liquid crystal layer. Thus, the BM on the color filter side does not need to shield light for preventing light leakage in the vicinity of the wiring, so that an aperture ratio of the BM can increase, and power consumption can decrease.

As a pixel array substrate 7A shown in FIG. 52, when an insulating film located in a layer below the fine wiring 53 has a laminated structure of the inorganic interlayer insulating film 27A and a planarization film 52, flatness of a surface in which the fine wiring 53 is formed increases, to thereby increase precision in processing the pattern.

FIGS. 51 and 52 show the closed pattern of the fine wiring 53 within each pixel, but the pattern of the fine wiring 53 may be continuously formed across the entire display region.

The fine wiring 53 is patterned, with reference to alignment marks 64 for forming the gate wiring 18, such that the polarization axis thereof forms an angle of θ with a straight line connecting between the marks 64. The fine wiring 53 may be patterned by direct drawing such as electronic drawing or by etching such as dry etching with a high-resolution resist.

The fine wiring 53 has a laminated layer including, for example, highly-nitrided Al having a thickness of 50 nm and an Al alloy having a thickness of 200 nm in this order from the display surface side. However, when the film on the display surface side has a low-reflective and conductive structure, the other materials may be used. The display surface side may not need to be low-reflective according to required quality of display, and thus a conductive material having excellent processability such as a single layer of the Al alloy and a Cu alloy may be used. An aspect ratio between a film thickness and a wiring width of the fine wiring 53 is preferably greater than or equal to 1. A wiring pitch and a wiring interval of the pattern of the fine wiring may be set to be the same as those of the fine patterns 34, 36 described in the first preferred embodiment. A wiring width of the fine wiring 53 is preferably less than or equal to ½ of a pitch for the use of transmitted light. The fine wiring 53 has a minimum line width of approximately 10 nm when being processed by electronic drawing, or around 100 nm when being dry-etched, and a line width may thus be determined by taking a processing method and a pitch into consideration. When the Cu alloy is used as a material for the fine wiring 53, the fine wiring 53 may be processed by a damascene method.

As described above, the pattern of the fine wiring 53 forms the polarizer, which may have the structure having the polarization function shown in the second preferred embodiment.

<E-2. Modifications>

Figure 53:
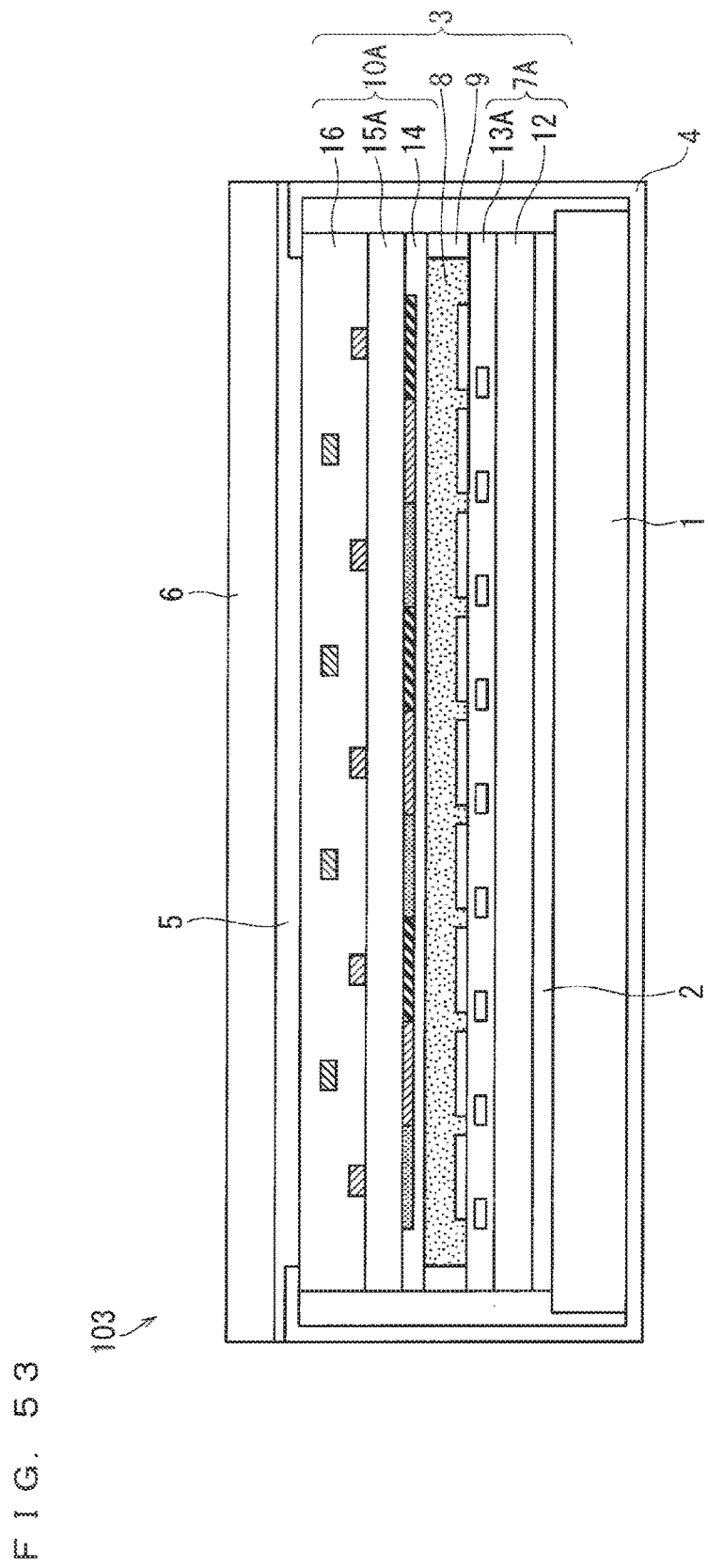
FIG. 53 is a cross-sectional view showing a configuration of a display apparatus according to a first modification of the fifth preferred embodiment.

When the counter substrate 10 does not have the configuration in which the polarizer eliminates the influence of the projection of the axis polarized at the edge of the sensor wiring in the touch panel layer onto another axis, a transparent substrate 15A or a color filter pattern 14A may preferably be provided with the polarization function instead of providing the polarizing film 17. FIG. 53 is a cross-sectional view showing a configuration of a display apparatus 103 according to a first modification of the fifth preferred embodiment that provides the transparent substrate 15A with the polarization function. FIG. 54 is a cross-sectional view showing a configuration of a display apparatus 104 according to a second modification of the fifth preferred embodiment that provides the color filter pattern 14A with the polarization function.

As a display apparatus 105 according to a third modification of the fifth preferred embodiment whose cross-sectional view is shown in FIG. 55, a counter substrate 10C may not include the touch sensor pattern 16, and the polarizing film 17 (second polarizer) may be located on a display surface of the counter substrate 10C.

Figure 56:
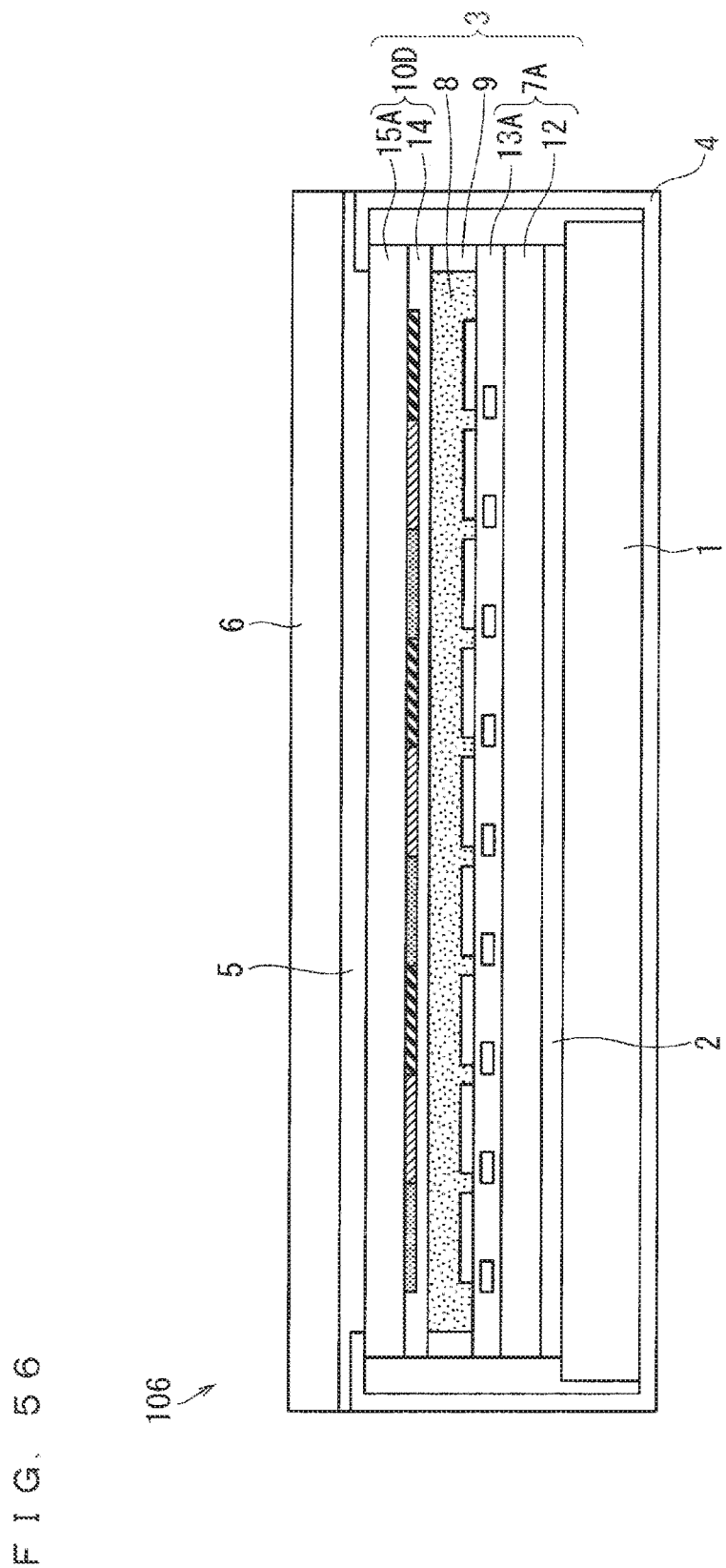
FIG. 56 is a cross-sectional view showing a configuration of a display apparatus according to a fourth modification of the fifth preferred embodiment.

As a display apparatus 106 according to a fourth modification of the fifth preferred embodiment whose cross-sectional view is shown in FIG. 56, a counter substrate 10D may not include the touch sensor pattern 16 and the polarizing film 17, and may include a transparent substrate 15A (second polarizer) having the polarization function instead of the transparent substrate 15.

Figure 57:
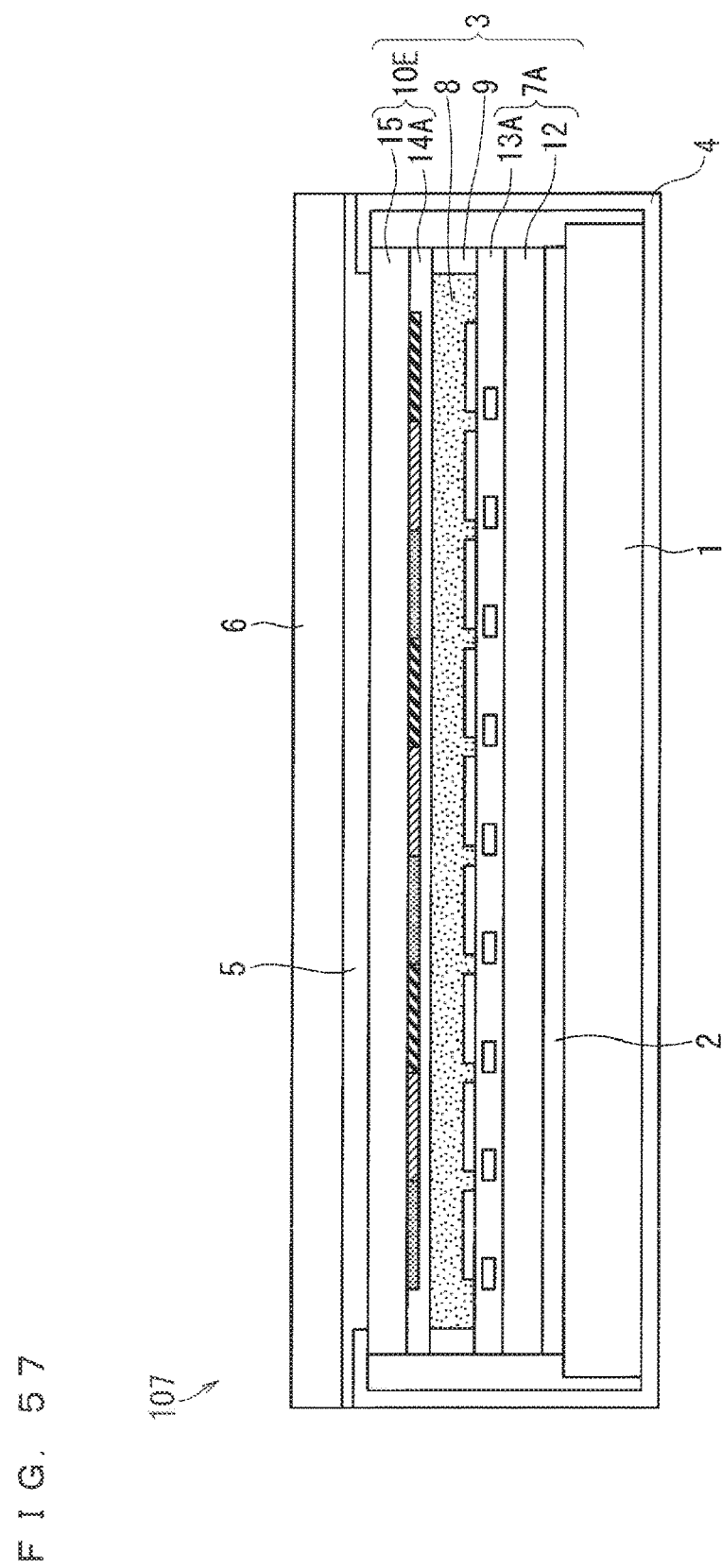
FIG. 57 is a cross-sectional view showing a configuration of a display apparatus according to a fifth modification of the fifth preferred embodiment.

As a display apparatus 107 according to a fifth modification of the fifth preferred embodiment whose cross-sectional view is shown in FIG. 57, a counter substrate 10E may not include the touch sensor pattern 16 and the polarizing film 17, and may include a color filter pattern 14A (second polarizer) having the polarization function instead of the color filter pattern 14.

Figure 58:
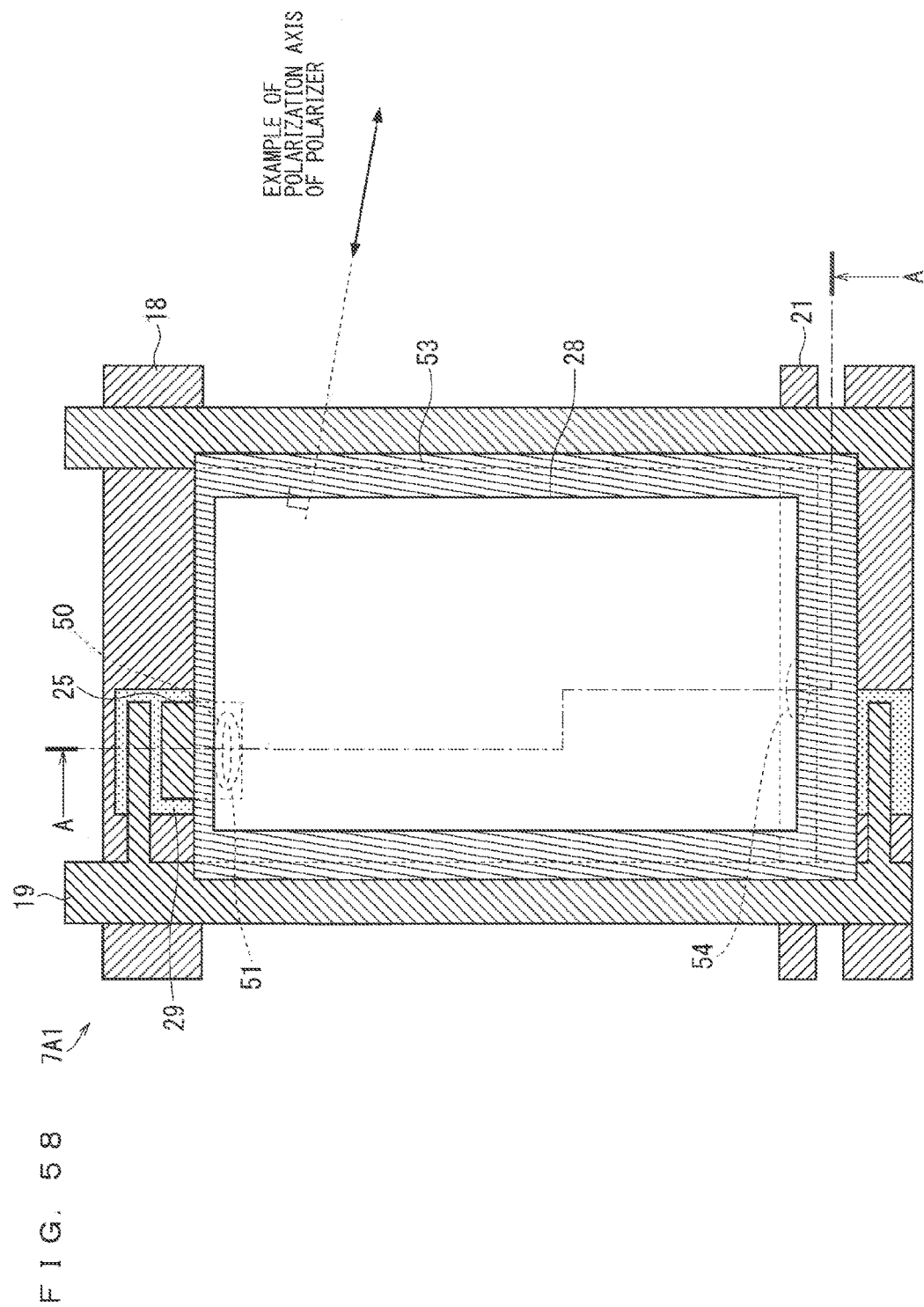
FIG. 58 is a top view of a pixel array substrate in a sixth modification of the fifth preferred embodiment.
Figure 59:
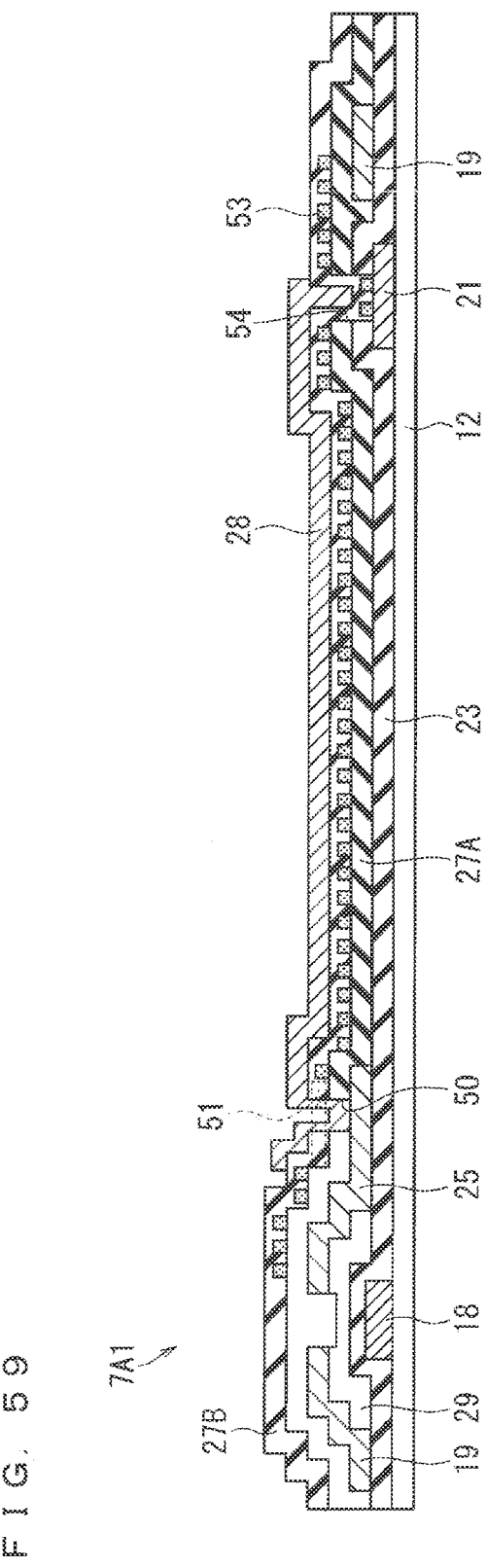
FIGS. 59 and 60 are cross-sectional views of the pixel array substrate in the sixth modification of the fifth preferred embodiment.

FIG. 58 is a top view of a pixel array substrate 7A1 in a sixth modification of the fifth preferred embodiment. FIG. 59 is a cross-sectional view taken along an A-A line in FIG. 58. In the pixel array substrate 7A1, an opening (contact hole 54) that penetrates the gate insulating film 23 and the interlayer insulating film 27A is located above the common wiring 21, and the common wiring 21 and the fine wiring 53 are electrically connected to each other through the contact hole 54, so that the fine wiring 53 serves as a common electrode. Thus, an aperture ratio of the common electrode located in the region along the source wiring 19 can increase.

Figure 60:
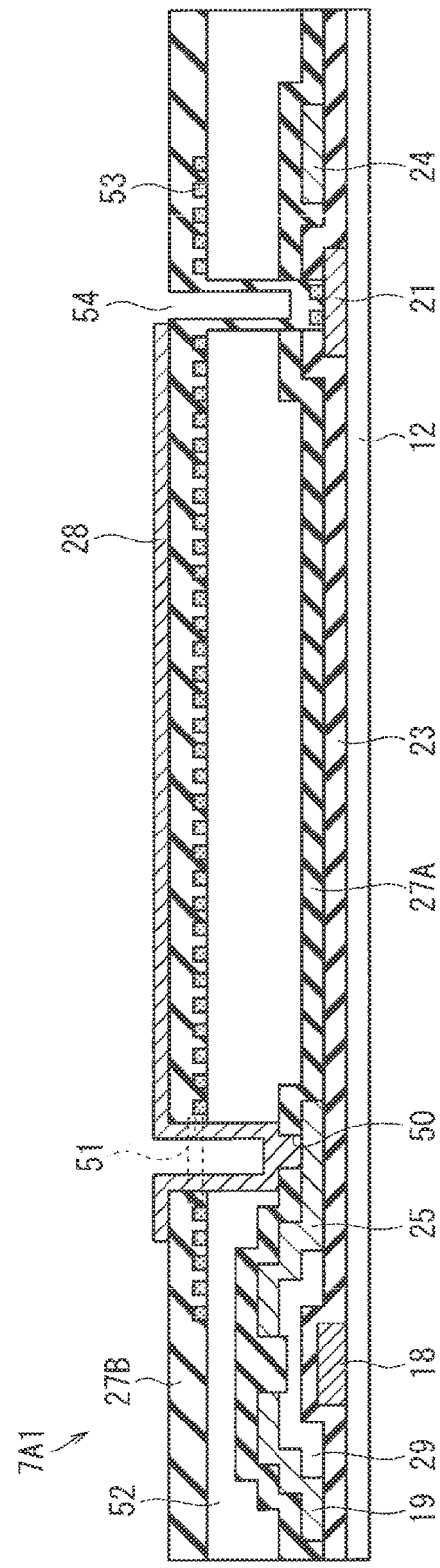

When the film for the common wiring 21 is etched in formation of the pattern of the fine wiring 53, at least a region exposing the common electrode in the contact hole 54 preferably has a solid pattern. Further, patterns of the fine wiring adjacent to each other preferably have a border therebetween on the gate wiring and the source wiring that are electrically connected to the fine wiring. Also in the pixel array substrate 7A1, an insulating film located in a layer below the fine wiring 53 may have a laminated structure of the inorganic interlayer insulating film 27A and the planarization film 52 (FIG. 60).

Figure 61:
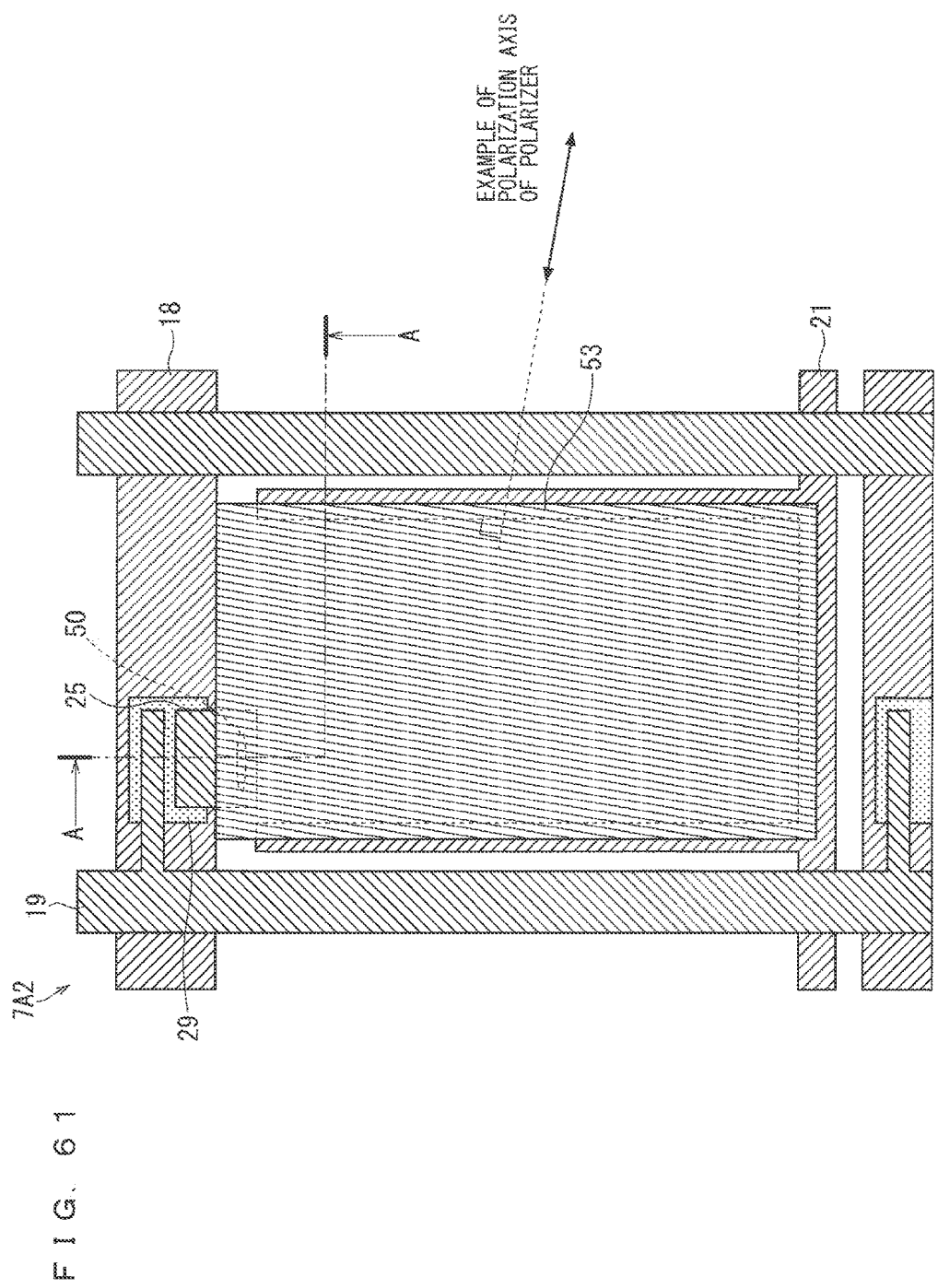
FIG. 61 is a top view of a pixel array substrate in a seventh modification of the fifth preferred embodiment.
Figure 62:
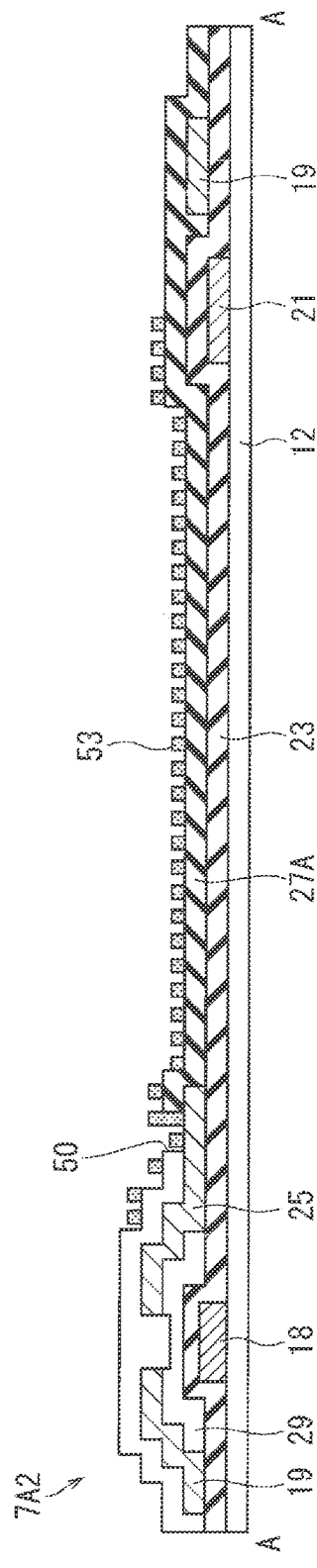
FIGS. 62 and 63 are cross-sectional views of the pixel array substrate in the seventh modification of the fifth preferred embodiment.

FIG. 61 is a top view of a pixel array substrate 7A2 in a seventh modification of the fifth preferred embodiment. FIG. 62 is a cross-sectional view taken along an A-A line in FIG. 61. In the pixel array substrate 7A2, the polarizer formed by the pattern of the conductive fine wiring 53 also serves as a pixel electrode, and the patterns of the fine wiring have a border therebetween on the common electrode 21, for example, and are electrically connected to the common electrode 21. The source wiring 19 is covered with the interlayer insulating film 27A. The contact hole 50 penetrating the interlayer insulating film 27A is located on the drain electrode 25. The fine wiring 53 is electrically connected to the drain electrode 25 through the contact hole 50.

Figure 63:
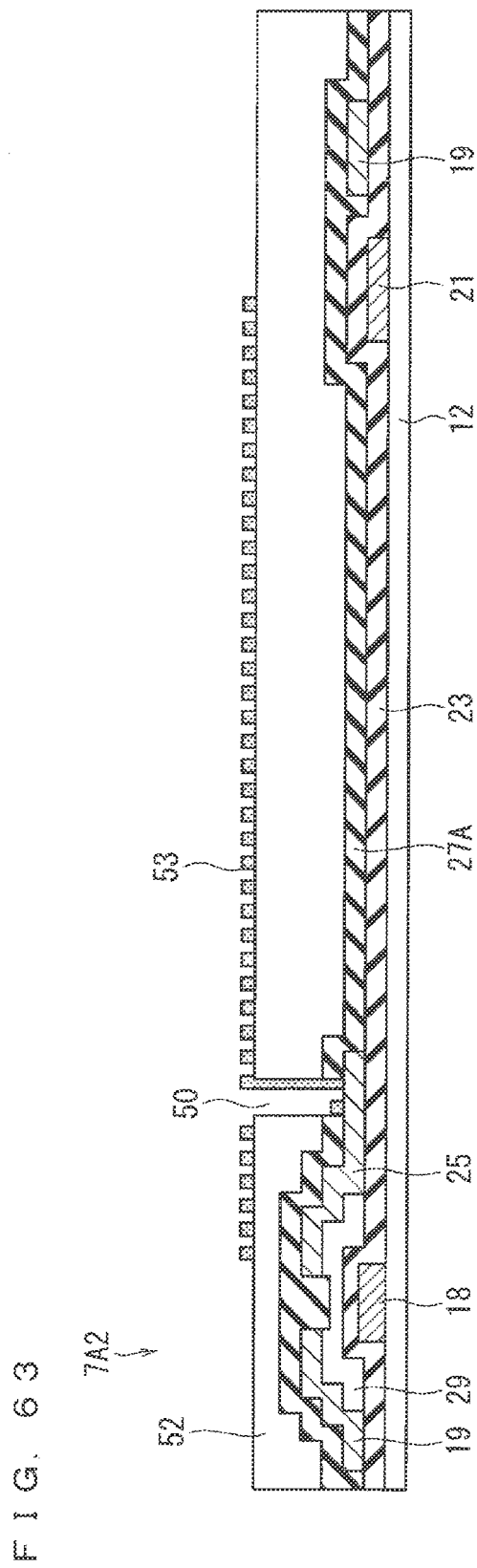

When the film for the drain electrode 25 is etched in formation of the pattern of the fine wiring 53, at least a region exposing the drain electrode 25 in the contact hole 50 preferably has a solid pattern. Also in the pixel array substrate 7A2, an insulating film located in a layer below the fine wiring 53 may have a laminated structure of the inorganic interlayer insulating film 27A and the planarization film 52 (FIG. 63).

The structure described above eliminates the need to form the pixel electrode with the transparent conductive film. Consequently, a decrease in transmittance due to the transparent conductive film can be prevented, allowing for increased intensity or reduced power consumption. An amount of indium consumed can also be reduced.

The fifth preferred embodiment described above gives the descriptions of the present invention applied to the pixel array substrate of the TN mode, but the present invention is also applicable to pixel array substrates of the IPS mode or the FFS mode.

Figure 64:
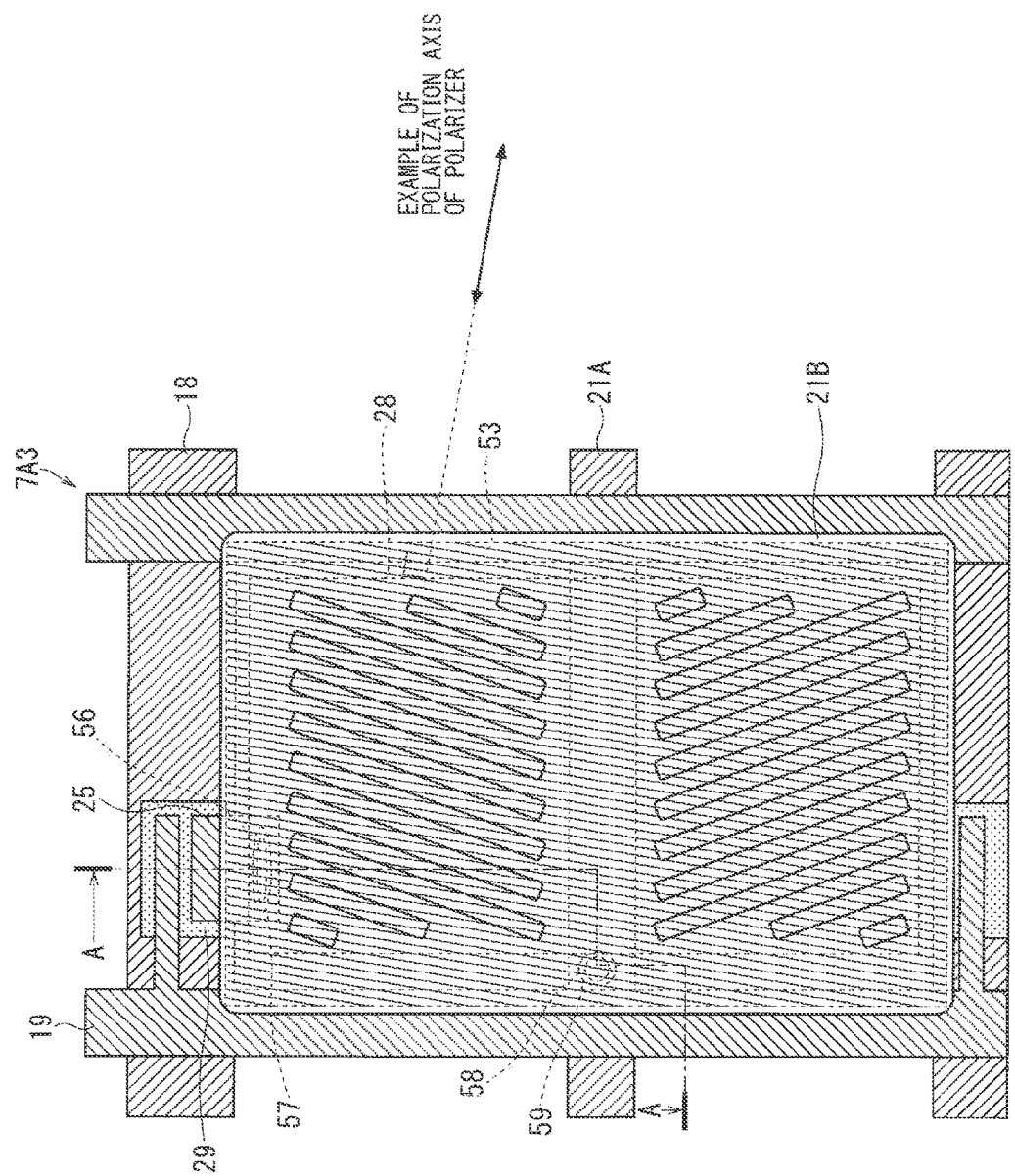
FIG. 64 is a top view of a pixel array substrate in an eighth modification of the fifth preferred embodiment.
Figure 65:
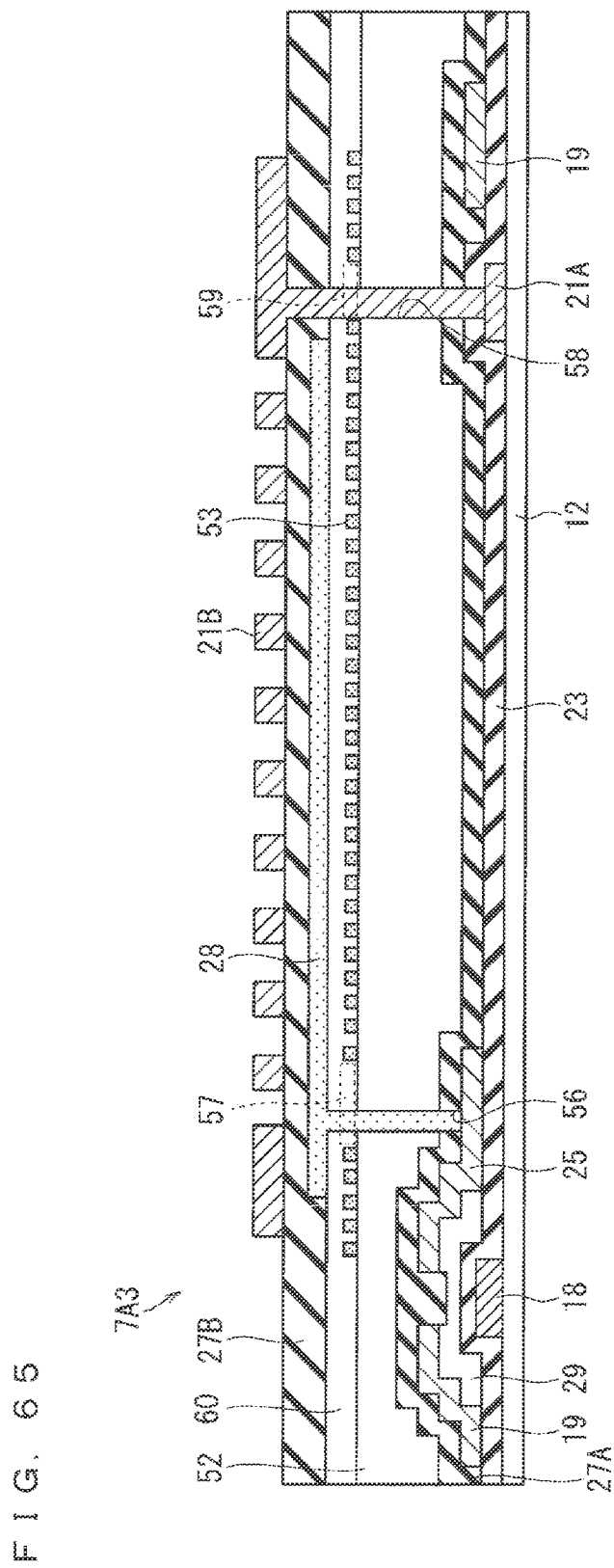
FIGS. 65 and 66 are cross-sectional views of the pixel array substrate in the eighth modification of the fifth preferred embodiment.

FIG. 64 is a top view of a pixel array substrate 7A3 in an eighth modification of the fifth preferred embodiment. FIG. 65 is a cross-sectional view taken along an A-A line in FIG.

64. The pixel array substrate 7A3 is the pixel array substrate of the FFS mode. The pixel array substrate 7A3 includes the gate electrode (wiring) 18 and the common wiring 21A located on the transparent substrate 12, and the gate insulating film 23 covers the gate electrode 18 and the common wiring 21A. A semiconductor layer 29 is positioned opposite to the gate electrode (wiring) 18 with the gate insulating film 23 therebetween. The source electrode (wiring) 19 and the drain electrode (wiring) 25 are located on the semiconductor layer 29. The source wiring 19 is located on the gate insulating film 23. The source electrode (wiring) 19, the drain electrode (wiring) 25, and the semiconductor layer 29 are covered with the interlayer insulating film 27A on which the planarization film 52 is further located. The conductive fine wiring 53 in 150 nm line-and-space pattern, for example, is located on the planarization film 52. The polarizer formed by the pattern of the fine wiring 53 has a pattern extending in a direction orthogonal to the polarization axis in plan view, and also has a border of the pattern on the gate wiring 18 and the source wiring 19 to which the polarizer is electrically connected. The pattern of the fine wiring 53 has an opening (hole 57) above the drain electrode 25 and an opening (hole 59) above the common wiring.

The pattern of the fine wiring 53 is covered with a protective film 60 on which the pixel electrode 28 is located. The pixel electrode 28 is covered with the interlayer insulating film 27B on which the common electrode 21B is located. A contact hole 56 that penetrates the interlayer insulating film 27A, the planarization film 52, and the protective film 60 and reaches the drain electrode 25 is located in the hole 57. The pixel electrode 28 is electrically connected to the drain electrode 25 through the contact hole 56.

A contact hole 58 that penetrates the interlayer insulating film 27B, the protective film 60, the planarization film 52, the interlayer insulating film 27A, and the gate insulating film 23 and reaches the common wiring 21A is located in the hole 59. The common electrode 21B is electrically connected to the common wiring 21A through the contact hole and has slits therein above the pixel electrode 28.

The structure described above allows the entry of the polarized light, which is not affected by the change of the axis polarized by the gate wiring 18 and the source wiring 19 of the pixel array, into the liquid crystal layer 8 also in the pixel array substrate of the FFS mode. Therefore, the BM on the color filter pattern 3 does not need to shield light for preventing the light leakage in the vicinity of the wiring, so that an aperture ratio of the BM can increase, and power consumption can decrease.

In addition, FIG. 65 shows that the insulating film located in the layer below the fine wiring 53 has the laminated structure of the interlayer insulating film 27A and the planarization film 52, but the insulating film may be formed of only the interlayer insulating film 27A. The fine wiring 53 has the closed pattern within each pixel in the description above, but the pattern of the fine wiring 53 may be continuously formed across the entire display region. The patterns of the fine wiring 53 adjacent to each other are electrically connected to each other on the gate wiring 18 or the source wiring 19, for example.

Figure 66:
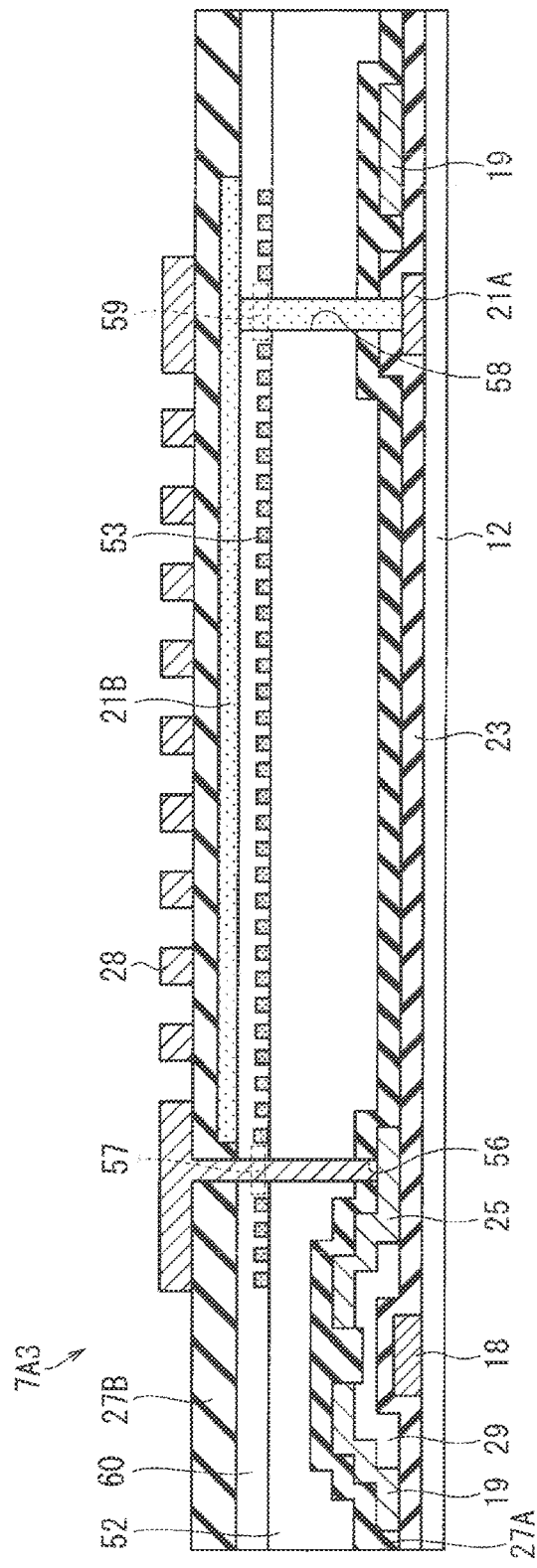

FIG. 65 shows that the common electrode as the upper layer and the pixel electrode as the lower layer, but their positions may be reversed. As shown in FIG. 66, the pixel electrode and the common electrode may be respectively located as the upper layer and the lower layer.

Figure 67:
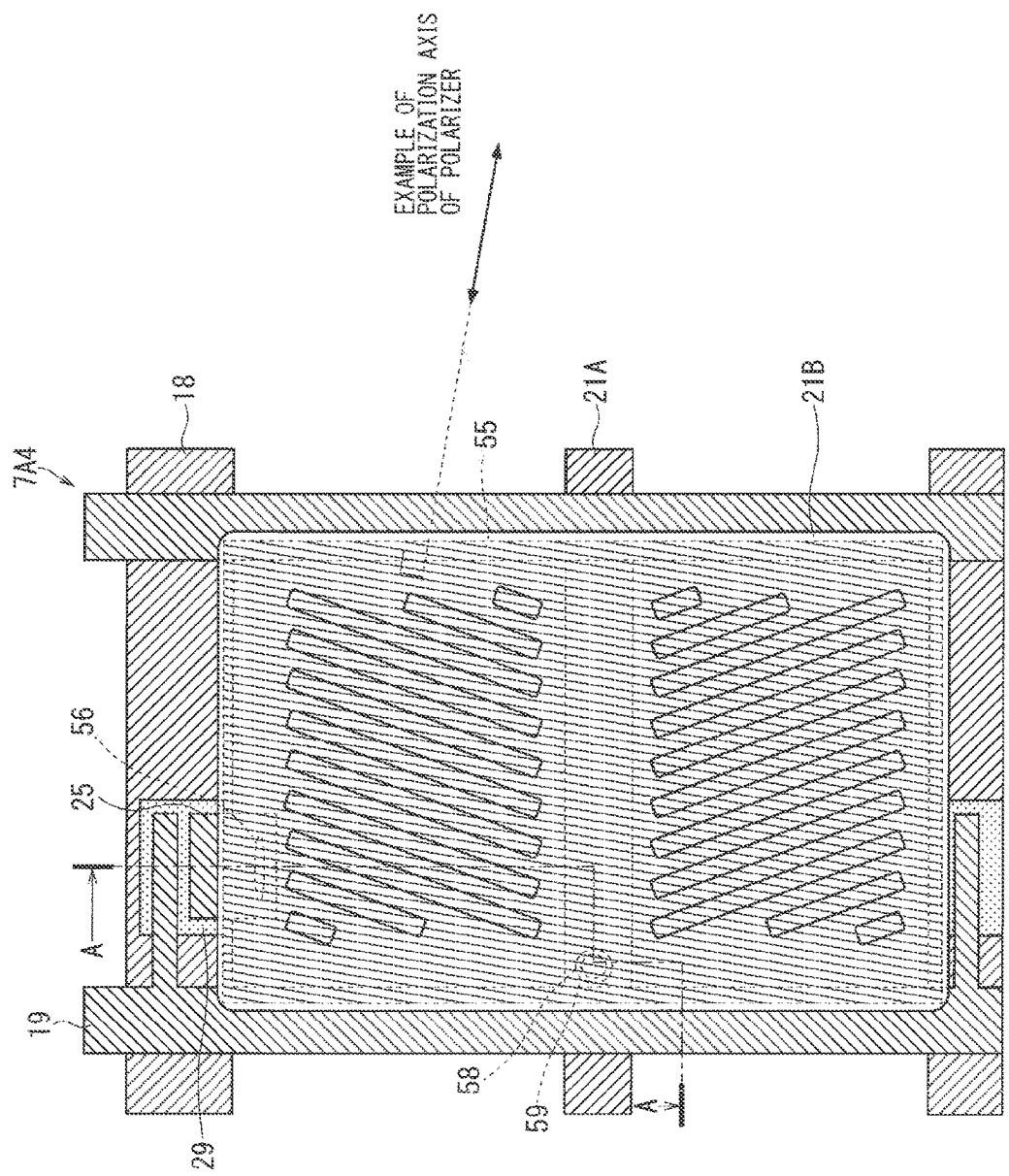
FIG. 67 is a top view of a pixel array substrate in a ninth modification of the fifth preferred embodiment.
Figure 68:
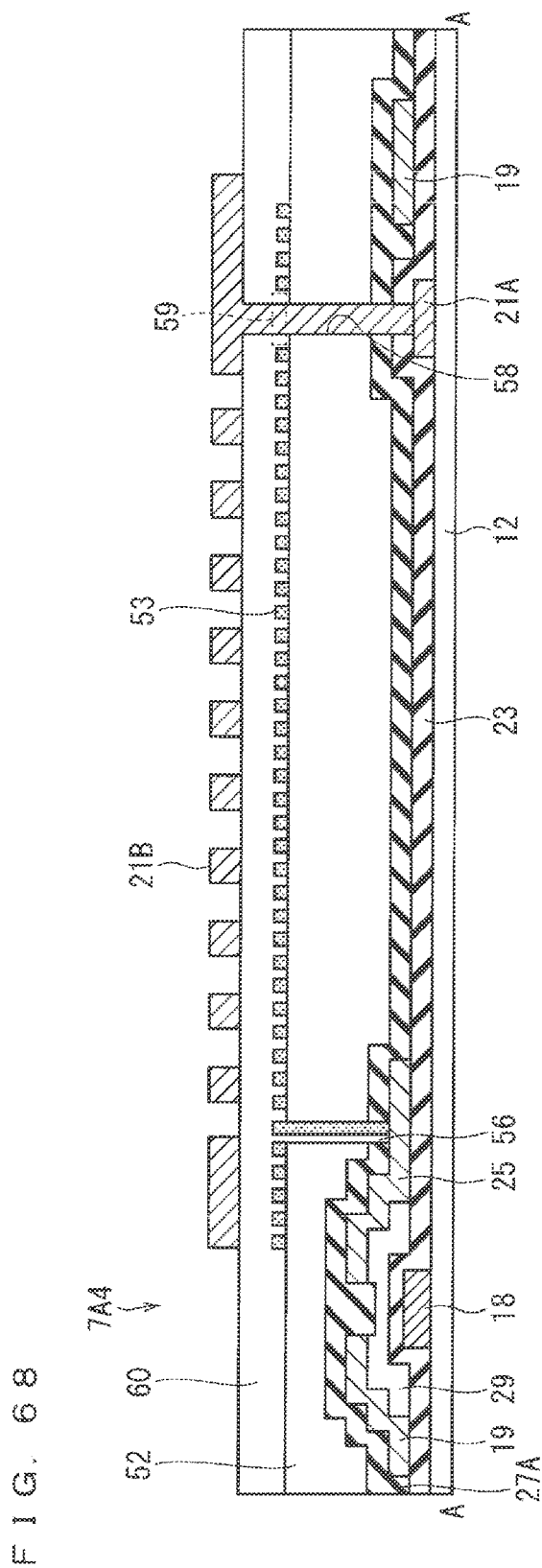
FIGS. 68 and 69 are cross-sectional views of the pixel array substrate in the ninth modification of the fifth preferred embodiment.

FIG. 67 is a top view of a pixel array substrate 7A4 in a ninth modification of the fifth preferred embodiment. FIG. 68 is a cross-sectional view taken along an A-A line in FIG. 67. The pixel array substrate 7A4 is the pixel array substrate of the FFS mode and includes the polarizer formed of the conductive fine wiring 53 as the pixel electrode. The configuration of the pixel array substrate 7A4 eliminates the pixel electrode 28 and the interlayer insulating film 27B of the configuration of the pixel array substrate 7A3 described in FIG. 65. The configuration of the pixel array substrate 7A4 has a contact hole 56 that penetrates the interlayer insulating film 27A and the planarization film 52 located on the drain electrode 25. The pattern of the fine wiring 53 is electrically connected to the drain electrode 25 through the contact hole 56. The patterns of the fine wiring adjacent to each other have an electrical connection therebetween at edges of the pixels, for example. The other configurations are the same as those of the pixel array substrate 7A3.

When the film for the drain electrode 25 is etched in formation of the pattern of the fine wiring 53, at least a region exposing the drain electrode 25 in the contact hole 56 preferably has a solid pattern.

The structure described above eliminates the need to form the pixel electrode with the transparent conductive film. Consequently, a decrease in transmittance due to the transparent conductive film can be prevented, allowing for increased intensity or reduced power consumption. An amount of indium consumed can also be reduced.

Figure 69:
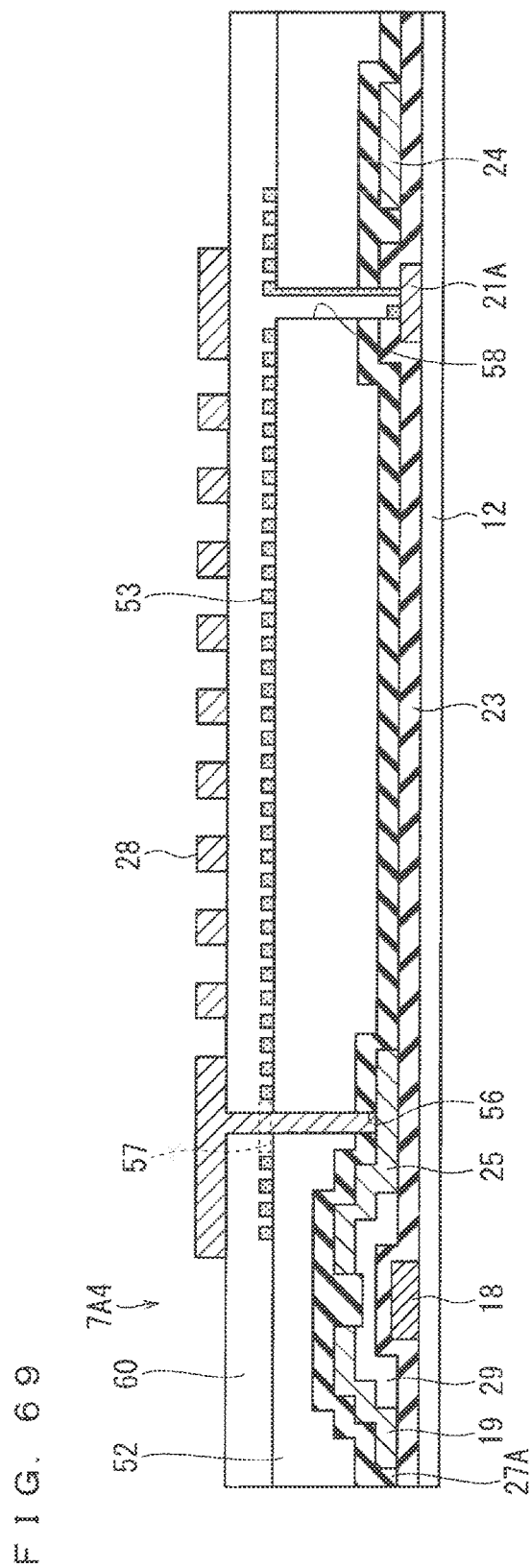

FIG. 68 shows that the common electrode as the upper layer and the pixel electrode as the lower layer, but their positions may be reversed. As shown in FIG. 69, the pixel electrode and the common electrode may be respectively located as the upper layer and the lower layer. In this case, the pattern of the fine wiring 53 is electrically connected to the common wiring 21A through the contact hole 58 and serves as the common electrode. The patterns of the fine wiring 53 adjacent to each other are electrically connected to each other on the gate wiring 18 or the source wiring 19, for example.

The fourth and fifth preferred embodiments show the structure in which the common electrode and the common wiring are directly connected to each other and the drain electrode and the pixel electrode are directly connected to each other, but they may be indirectly connected to each other.

Some diagrams show the transistor of the reverse staggered type and the back channel type as a switching element, but the switching element may have the other structures. The switching element may be made of a material having a switching function such as a-Si, p-Si, oxide semiconductor, and organic semiconductor.

<E-3. Effects>

The display apparatus according to the fifth preferred embodiment includes the pixel array substrate 7A including the first polarizer, the counter substrate 10, and the polarizing film 17 (second polarizer) that are located in the stated order in the light path from the light source toward the display surface. The polarizing film 17 has the polarization axis parallel or perpendicular to the polarization axis of the first polarizer. The pixel array substrate 7A includes: the plurality of gate wires 18; the plurality of source wires 19 orthogonal to the gate wires 18; and the pixel electrode 28 located in the opening of the pixel that is the region divided by the gate wires 18 and the source wires 19 intersecting each other. The first polarizer has the plurality of patterns of the fine wiring 53 that are located in the subsequent stage of at least the gate wires 18 or the source wires 19 in the light path and that overlap at least part of the pixel electrode 28 with the insulating film therebetween. Therefore, the patterns of the fine wiring 53 allow the entry of the polarized light, which is not affected by the projection of the axis polarized by the gate wiring 18 and the source wiring 19 onto another axis, into the subsequent stage of the pixel array substrate 7A. Thus, the light leakage near the wiring can be suppressed, and the contrast can increase.

Alternatively, the first polarizer having the plurality of patterns of the fine wiring 53 may be the pixel electrode. In this case, the pixel electrode does not need to be formed with the transparent conductive film. Consequently, the decrease in transmittance due to the transparent conductive film can be prevented, allowing for the increased intensity and the reduced power consumption.

The fine wiring 53 may have the pitch of less than or equal to 266 nm, allowing for the stable polarization function in the visible range of light.

The fine wiring may have the width of less than or equal to ½ of the pitch of the fine wiring, allowing for the use of transmitted light.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display apparatus, comprising:
   a first polarizer;
   a first insulating substrate;
   a second insulating substrate; and
   a second polarizer, said first polarizer, said first insulating substrate, said second insulating substrate, and said second polarizer being located in the stated order in a light path from a light source toward a display surface, wherein
   said second polarizer has a polarization axis parallel or perpendicular to a polarization axis of said first polarizer,
   said first insulating substrate and said second insulating substrate each include a transparent substrate having insulating properties, and
   at least said first insulating substrate or said second insulating substrate includes:
      a first electrode wiring pattern that is located on said transparent substrate and is opaque; and
      a third polarizer that is located in a preceding stage or a subsequent stage of said first electrode wiring pattern in said light path and is opposed to said first electrode wiring pattern with a transparent insulating film therebetween, and
   at least said third polarizer located in the subsequent stage of said first electrode wiring pattern has a polarization axis parallel to an extending direction of an edge of said first electrode wiring pattern.

2. The display apparatus according to claim 1, wherein at least said third polarizer located in the subsequent stage of said first electrode wiring pattern has a long axis in a direction substantially perpendicular to an extending direction of an edge of said first electrode wiring pattern, and has a plurality of isolated patterns that overlap said edge and that do not allow a visible light beam to pass therethrough.

3. The display apparatus according to claim 2, wherein said isolated patterns each have an average pitch length of less than or equal to 266 nm in a short-axis direction.

4. The display apparatus according to claim 2, wherein said isolated patterns are metal patterns or conductive particles.

5. The display apparatus according to claim 2, wherein said third polarizer located in the subsequent stage of said first electrode wiring pattern has part of a polarization axis parallel to the polarization axis of said second polarizer.

6. The display apparatus according to claim 5, wherein said third polarizer located in the subsequent stage of said first electrode wiring pattern has the polarization axis parallel to the polarization axis of said second polarizer at a tip toward a side where said first electrode wiring pattern is not located.

7. The display apparatus according to claim 2, wherein said third polarizer located in the preceding stage of said first electrode wiring pattern has at least part of a polarization axis parallel to the polarization axis of said second polarizer.

8. The display apparatus according to claim 2, further comprising a liquid crystal layer sealed between said first insulating substrate and said second insulating substrate, wherein
   said first insulating substrate further includes a pixel array layer located on said transparent substrate,
   said second insulating substrate further includes a touch panel layer located on said transparent substrate, and
   said touch panel layer includes:
      said first electrode wiring pattern as touch sensor wiring; and
      said third polarizer.

9. The display apparatus according to claim 2, wherein said first electrode wiring pattern includes a curve.

10. The display apparatus according to claim 2, wherein a length in a long-axis direction of a region, which does not overlap said first electrode wiring pattern, of each of said isolated patterns is more than twice as much as a length of a short axis of each of said isolated patterns.

11. The display apparatus according to claim 2, wherein a density of arrangement of said isolated patterns at an edge of said first electrode wiring pattern is higher than a density of arrangement of said isolated patterns in a region where said isolated patterns do not overlap said first electrode wiring pattern.

12. The display apparatus according to claim 2, wherein a degree of alignment of long axes of said isolated patterns at an edge of said first electrode wiring pattern is higher than a degree of alignment of long axes of said isolated patterns in a region where said isolated patterns do not overlap said first electrode wiring pattern.

13. The display apparatus according to claim 1, wherein at least said first insulating substrate or said second insulating substrate includes:
   a second electrode wiring pattern located in the subsequent stage of said first electrode wiring pattern in said light path; and
   a fourth polarizer that is located in a preceding stage or a subsequent stage of said second electrode wiring pattern and is opposed to said second electrode wiring pattern with a transparent insulating film therebetween.

14. The display apparatus according to claim 13, wherein at least said fourth polarizer located in the subsequent stage of said second electrode wiring pattern has a polarization axis parallel to an extending direction of an edge of said second electrode wiring pattern.

15. The display apparatus according to claim 13, wherein said fourth polarizer located in the subsequent stage of said second electrode wiring pattern has part of a polarization axis parallel to the polarization axis of said second polarizer.

16. The display apparatus according to claim 13, wherein at least said fourth polarizer located in the subsequent stage of said second electrode wiring pattern has a long axis in a direction substantially perpendicular to an extending direction of an edge of said second electrode wiring pattern, and has a plurality of isolated patterns that overlap said edge and that do not allow a visible light beam to pass therethrough.

17. The display apparatus according to claim 16, wherein said isolated patterns each have an average pitch length of less than or equal to 266 nm in a short-axis direction.

18. The display apparatus according to claim 2, further comprising a liquid crystal layer sealed between said first insulating substrate and said second insulating substrate, wherein
   said first insulating substrate further includes a pixel array layer located on said transparent substrate, and
   said pixel array layer includes:
      said first electrode wiring pattern; and
      said third polarizer.

19. The display apparatus according to claim 18, wherein said pixel array layer includes:
   a plurality of gate wires;
   a plurality of source wires orthogonal to said gate wires;
   a pixel electrode located in an opening of a pixel that is a region divided by said gate wires and said source wires intersecting each other; and
   a common electrode wire opposed to said pixel electrode with an interlayer insulating film therebetween, and
   said first electrode wiring pattern is at least any one of said gate wire, said source wire, and said common electrode wire.

20. A display apparatus, comprising:
   a first polarizer;
   a first insulating substrate;
   a second insulating substrate; and
   a second polarizer, said first polarizer, said first insulating substrate, said second insulating substrate, and said second polarizer being located in the stated order in a light path from a light source toward a display surface, wherein
   said second polarizer has a polarization axis parallel or perpendicular to a polarization axis of said first polarizer,
   said first insulating substrate and said second insulating substrate each include a transparent substrate having insulating properties, and
   at least said first insulating substrate or said second insulating substrate includes:
      a first electrode wiring pattern that is located on said transparent substrate and is opaque; and
      a third polarizer located in a preceding stage or a subsequent stage of said first electrode wiring pattern in said light path, opposed to said first electrode wiring pattern with a transparent insulating film therebetween, and having at least one polarization axis with a direction different from a direction of said polarization axis of said first polarizer and a direction of said polarization axis of said second polarizer.

21. A display apparatus, comprising:
   a first polarizer;
   a first insulating substrate;
   a second insulating substrate; and
   a second polarizer, said first polarizer, said first insulating substrate, said second insulating substrate, and said second polarizer being located in the stated order in a light path from a light source toward a display surface, wherein
   said second polarizer has a polarization axis parallel or perpendicular to a polarization axis of said first polarizer,
   said first insulating substrate and said second insulating substrate each include a transparent substrate having insulating properties, and
   at least said first insulating substrate or said second insulating substrate includes:
      a first electrode wiring pattern that is located on said transparent substrate and is opaque; and
      a third polarizer that is located in a preceding stage or a subsequent stage of said first electrode wiring pattern in said light path and is opposed to said first electrode wiring pattern with a transparent insulating film therebetween, said third polarizer operates to cancel out a change of a polarization axis of polarized light, said change resulting from said polarized light in said light path through said first polarizer, said first insulating substrate, said second insulating substrate, and said second polarizer interacting with said first electrode wiring pattern.

* * * * *